(12) United States Patent
Burch, V et al.

(10) Patent No.: US 11,912,325 B2
(45) Date of Patent: Feb. 27, 2024

(54) SYSTEMS AND METHODS FOR IMPROVED AUTOMATIC CHOCKING OF A CARGO DOLLY

(71) Applicant: FEDEX CORPORATE SERVICES, INC., Collierville, TN (US)

(72) Inventors: Reuben F. Burch, V, Columbus, MS (US); Katherine King, Collierville, TN (US); Howard McKinney, Bartlett, TN (US); Aaron Prather, Collierville, TN (US); Kevin Frommelt, Collierville, TN (US); Shaq Khan, Collierville, TN (US)

(73) Assignee: FedEx Corporate Services, Inc., Collierville, TN (US)

( * ) Notice: Subject to any disclaimer, the term of this patent is extended or adjusted under 35 U.S.C. 154(b) by 51 days.

(21) Appl. No.: 17/849,964

(22) Filed: Jun. 27, 2022

(65) Prior Publication Data

US 2022/0324500 A1    Oct. 13, 2022

Related U.S. Application Data

(63) Continuation of application No. 16/531,574, filed on Aug. 5, 2019, now Pat. No. 11,414,120.
(Continued)

(51) Int. Cl.
*B62B 5/04* (2006.01)
*B62B 3/00* (2006.01)
*B62B 5/00* (2006.01)

(52) U.S. Cl.
CPC ............ *B62B 5/0404* (2013.01); *B62B 3/002* (2013.01); *B62B 5/0079* (2013.01); *B62B 5/048* (2013.01);
(Continued)

(58) Field of Classification Search
CPC ........ F16D 63/00; F16D 2121/14; B60T 1/00; B60T 17/00; B60T 3/00; B62B 5/0404;
(Continued)

(56) References Cited

U.S. PATENT DOCUMENTS 3,313,378 A * 4/1967 Jeffery .................. B62D 13/00
                                                      188/29
3,541,694 A    11/1970 Schafer
(Continued)

FOREIGN PATENT DOCUMENTS

CN      111942441 A  * 11/2020
DE    202006004697 U1    8/2007
(Continued)

OTHER PUBLICATIONS

PCT Application No. PCT/US2019/045087 International Search Report and Written Opinion, dated Oct. 10, 2019.

*Primary Examiner* — James A Shriver, II
*Assistant Examiner* — Michael T. Walsh
(74) *Attorney, Agent, or Firm* — WITHERS & KEYS, LLC

(57) ABSTRACT

An improved auto-chocking enabled cargo dolly that is towable by ground support equipment. The dolly has a frame, wheels attached to the frame that support the frame and rotate to allow movement of the frame, a tow bar, a linkage in communication with the tow bar and that actuates when the tow bar is raised, and a wheel engagement chocking system fixed to the dolly frame and disposed to selectively engage at least one of the wheels attached to the dolly frame. The wheel engagement system is responsive to a position of the linkage, where the wheel engagement chocking system applies pressure directly to at least one of the wheels to hold the wheel(s) in place when the linkage is actuated by the tow bar.

55 Claims, 21 Drawing Sheets

Related U.S. Application Data

(60) Provisional application No. 62/714,851, filed on Aug. 6, 2018.

(52) U.S. Cl.
CPC .... *B62B 5/0447* (2013.01); *B62B 2005/0471* (2013.01)

(58) Field of Classification Search
CPC ..... B62B 3/002; B62B 5/0079; B62B 5/0447; B62B 5/048; B62B 2005/0471; B62B 5/0476; B62D 63/06
See application file for complete search history.

(56) References Cited

U.S. PATENT DOCUMENTS

| | | | |
|---|---|---|---|
| 4,063,750 A | | 12/1977 | Mutchler |
| 4,280,595 A | * | 7/1981 | Timms ...................... B62B 5/04 188/69 |
| 4,949,986 A | * | 8/1990 | Gohier ...................... B60D 1/00 296/29 |
| 4,986,596 A | * | 1/1991 | Gohier ...................... B62B 3/00 296/210 |
| 5,709,518 A | | 1/1998 | Alexander et al. |
| 5,794,639 A | * | 8/1998 | Einbinder ................. B62B 5/04 135/912 |
| 7,396,027 B1 | | 7/2008 | Lovmark |
| 7,815,019 B2 | * | 10/2010 | Chen ....................... B62B 9/087 188/328 |
| 9,598,060 B2 | | 3/2017 | Mercure |
| 9,709,969 B2 | | 7/2017 | Anderson et al. |
| 2004/0238290 A1 | | 12/2004 | Brown |
| 2008/0122227 A1 | | 5/2008 | Hammerle |
| 2012/0080866 A1 | | 4/2012 | West |
| 2016/0012707 A1 | | 1/2016 | McKinley et al. |
| 2016/0031357 A1 | | 2/2016 | Collins |
| 2016/0359741 A1 | * | 12/2016 | Cooper ................... H04W 4/44 |
| 2018/0118199 A1 | | 5/2018 | Chaney, Jr. et al. |

FOREIGN PATENT DOCUMENTS

| | | | |
|---|---|---|---|
| DE | 202007017384 U1 | 3/2008 | |
| DE | 102013215689 A1 * | 2/2015 | ................ B60T 7/20 |
| EP | 2216217 A2 * | 8/2010 | ............ B60T 11/046 |
| EP | 3355008 A1 | 8/2018 | |
| FR | 2918330 A1 | 1/2009 | |
| GB | 2554523 A | 4/2018 | |
| IT | 1236847 B | 4/1993 | |
| WO | 2004096617 A2 | 11/2004 | |
| WO | 2005039961 A1 | 5/2005 | |

\* cited by examiner

SYSTEMS AND METHODS FOR IMPROVED AUTOMATIC CHOCKING OF A CARGO DOLLY

PRIORITY APPLICATION

The present application hereby claims the benefit of priority to related U.S. Provisional Patent Application Ser. No. 62/714,851 filed Aug. 6, 2018 and related parent U.S. Non-Provisional patent application Ser. No. 16/531,574 and entitled "Systems and Methods for Improved Remote Cargo Holding Pins for a Cargo Dolly."

FIELD OF THE DISCLOSURE

The present disclosure generally relates to systems, apparatus, and methods in the field of logistics vehicles and, more particularly, to various aspects of systems, apparatus, and methods related to improved designs of cargo tractor dollies using automated chocking systems that lock at least one wheel in place when the cargo tractor dolly is disengaged from the cargo tractor or other ground support equipment.

BACKGROUND

Logistics ground support equipment (GSE) is commonly known to include cargo tractors and dollies, which are used to transport cargo (e.g., packages, containers, palletized material, and the like). When using a cargo dolly, there is a need to secure the cargo dolly in place when not connected to a cargo tractor or some heavy, stationary piece of GSE to help ensure the safety of operators of the GSE as well as to prevent damage to personnel, property, equipment, and cargo should a cargo dolly unintentionally begin moving when in such a disconnected or disengaged state.

Conventionally, a cargo dolly may use a simple wheel brace or lever to prevent such unintentional movement when disconnected or disengaged from a cargo tractor or some heavy, stationary piece of GSE. Typically, such a brace or lever may be configured to press against one of the wheels (e.g., a front tire) when the cargo dolly's tow bar is placed upright in a locked or unused position. However, as the cargo dolly is used, the rubber on the wheels of the cargo dolly may wear down, which has the undesirable effect of reducing the pressure that such a brace or lever can place on the cargo dolly's wheel/tire or, in some instances, remove contact with the wheel/tire. This may leave the cargo dolly able to move, which results in continued safety issues. Possible solutions may have logistics personnel operating GSE, such as a cargo tractor, required to chock all tires of the cargo dolly (or one of the cargo dollies in a train or string of connected cargo dollies). But this solution requires a large number of separate chocks and undesirably increases the chance that one or more of the chocks may be left lying in a logistics area, such as an aircraft gate or on a road or cargo tractor path, each of which being a potential high traffic area. Running over a chock in any vehicle or other GSE is a significant safety risk and may cause damage to personnel, property, equipment, and cargo as a result. Thus, the use of multiple separate chocks with GSE equipment, such as a cargo dolly, is less than desired or ideal.

To address one or more of these types of technical problems, there is a need for a technical solution that may be deployed to enhance ways to prevent a cargo dolly from moving and being a risk and without creating further risk using multiple separate chocks. In particular, what is described are various exemplary types of systems, apparatuses, and methods where a cargo dolly may be designed or retrofit so as to allow for automatically locking at least one wheel in place when disengage from a towing GSE, such as a cargo tractor, in novel and unconventional ways.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

In general, aspects of the disclosure relate to systems, methods, apparatuses, and assemblies of components that automatically lock at least one wheel of a cargo dolly in place when disengaged from a towing GSE, such as a cargo tractor. In general, aspects may detect whether the cargo dolly is connected with a cargo tractor or other GSE. When not linked or engaged or connected, the dolly may automatically and electronically actuate structure to deploy an automatic chocking solution that holds one or more of the tires/wheels in place. In other words, a replacement electro-mechanical system may detect engagement or disengagement with a towing GSE (via sensor on the dolly that detects the connection of the dolly to the GSE) and then automatically deploys the chocking system, and provides feedback (visual, wireless or wired communication notifications or alerts) to signify the dolly status (also can display on console of GSE, handheld/smartphone used by logistics personnel) and to cause or otherwise initiate responsive action to take place. Feedback may also be generated on the cargo dolly in the form of a wireless or wired signal/communication or visual indicator on the dolly that signifies that the cargo dolly is either in a locked state or towable and unlocked state. Chocking systems may use one or more metal pins that may lock into an opening on an existing dolly wheel, or lock into a groove on an outside of the wheel, or use a clamp to compress the wheel and hold the wheel in place.

In more detail, an aspect of the disclosure focuses on an automatically deployed solution that is responsive to raising the tow bar of the cargo dolly. Here, when the tow bar is raised, a set of friction brakes may be actuated and applied to secure one or more of the axles on the cargo dolly.

Another aspect of the disclosure focuses on another type of automatically deployed solution that is responsive to raising the tow bar of the cargo dolly involving a hydraulically actuated skid brake on the cargo dolly undercarriage. Once deployed, the skid brake makes contact with the ground to hold the cargo dolly in place.

A further aspect of the disclosure focuses on a solution that may be deployed using friction forces, but uses a separate metal flywheel instead of applying such frictional braking force to the rubber wheels/tires on the cargo dolly. In one example, this aspect may involve a friction bar component and a wheel hub component where the friction bar component applies pressure to the wheel hub component to secure movement of the wheel (rather than applying friction via a conventional friction bar to rubber on the tire, which will inherently wear out). In another example, there is a component that is bolted onto the wheel hub having geared portions and another that would be bolted onto a conventional friction bar that may engage such geared portions to secure movement of the wheel (rather than applying friction via a conventional friction bar to rubber on the tire).

Yet another aspect of the disclosure focuses on a cargo dolly monitor system for indicating if all dollies on a train of dollies are un-chocked so that a cargo tractor or other GSE towing such a train of dollies may know the status of the train and take responsive action quicker and be initiated to do so in an automated fashion. Tow bar connection pin status may be communicated to the operator of the towing GSE via a user access device (rugged handheld, smartphone, etc.) or to a cargo tractor transceiver and display to verify the state of the train and the dolly connections prior to GSE movement. Feedback can be visual, audible, haptic for the operator and those near (e.g., safety warning of impending movement). As part of such a monitoring system, this aspect may deploy an electronics controller module in each dolly that has sensors to detect connections to and between dollies, a transceiver that communicates wirelessly with the user access device and/or cargo tractor transceiver (itself being a processing based transceiver that receives such sensor status information from the dollies, generates notifications for the operator, generates visual feedback, and may cause or initiate actions such as interrupt cargo tractor operation until all dollies are unlocked (e.g., actuated braking on the cargo tractor that is released only when the train's dollies report being unlocked and unchocked so they can be moved). Using such active electronics onboard an enhanced cargo dolly may also have onboard power storage and charging solutions so that such electronics may use batteries, fuel cells or other power storage units that can be recharged from kinetic motion, solar, or rotational generators deployed on the cargo dolly.

Another aspect may extend such a cargo dolly electronic module with further types of sensors and proactive actuation of auto-chocking pins, which may be based upon detected motion, change in weight of the container on the dolly, change in attachment status of dolly to the GSE (e.g., cargo tractor) or other dollies. Further examples may have the enhanced cargo dolly automatically actuating and deploying auto-chocking solutions based upon a status of cargo tug movement relative to loader (e.g., deploying when the cargo tug is no longer moving towards a container loader or when further sensors indicate alignment of one of the dollies with the cargo container loader). And additional examples may be responsive to a remote auto-chock message from the GSE or other user access device operated by a logistics operator of the GSE (e.g., a rugged handheld, smartphone, and the like).

Still another aspect of the disclosure describes a type of asset tracking system application, such as a dolly tracking system, that manages the chocked status of a fleet of dollies via such feedback provided to a central hub manager or master type of server that may communicate with each dolly and/or indirectly with dollies through a connected GSE towing such dollies. Such a tracking system may have cargo tug operators notified of where chocked dollies are located. Cargo dollies may be outfitted with location circuitry (e.g., as part of cellular communication interfaces and/or GPS chipsets used in onboard electronic control modules) that provide location of the particular cargo dolly along with chocked status. The hub manager may then provide GSE operators with identification and status information on particular dollies (e.g., a specific reference number for the dolly and coordinates for the dolly as well as whether a dolly is part of a train), information on which dollies in the fleet are nearest and available to where needed (e.g., which side of the airport), and the like. Information provided by the hub manager may then initiate responsive action, such as obtaining free and available ones of the cargo dollies closest to where needed; removing cargo dollies from a congested area and relocating/staging available cargo dollies at other locations (e.g., moving and then auto-chocking and then having the cargo dollies report back to the hub manager with an updated status and location).

Additional advantages of these and other aspects of the disclosed embodiments and examples will be set forth in part in the description which follows, and in part will be evident from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

DESCRIPTION OF THE EMBODIMENTS

Reference will now be made in detail to various exemplary embodiments. However, those skilled in the art will appreciate that different embodiments may implement a particular part in different ways according to the needs of the intended deployment and operating environment for the respective embodiments.

The following describes various embodiments of different systems, apparatus, and applied methods that unconventionally deploy various technology involving automated chocking (also referred to as auto-chocking) systems for a cargo dolly that lock at least one wheel in place when the dolly is disengaged from the cargo tractor or other ground support equipment. Those skilled in the art will appreciate that additional embodiments may combine some of these otherwise independent solutions to provide for an even more robust system for automatically chocking a cargo dolly and using such technology as part of further automated logistics systems as described in more detail below.

Figure 1A:
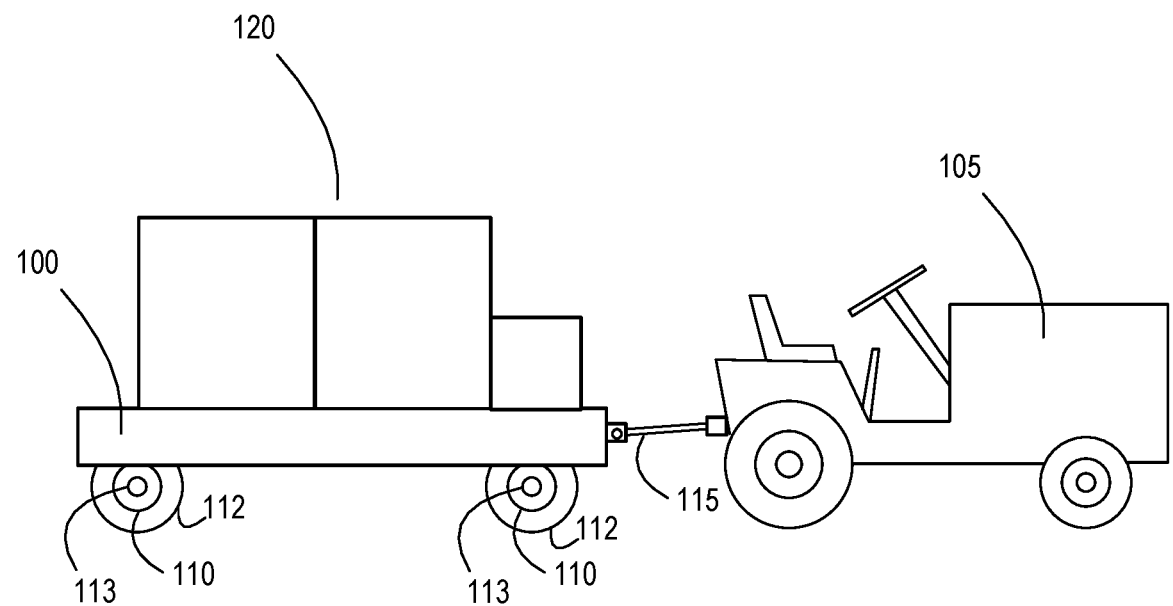
FIG. 1A is a diagram of an exemplary auto-chocking enabled cargo dolly being towed by an exemplary ground support equipment cargo tractor in accordance with an embodiment of the invention.
Figure 1B:
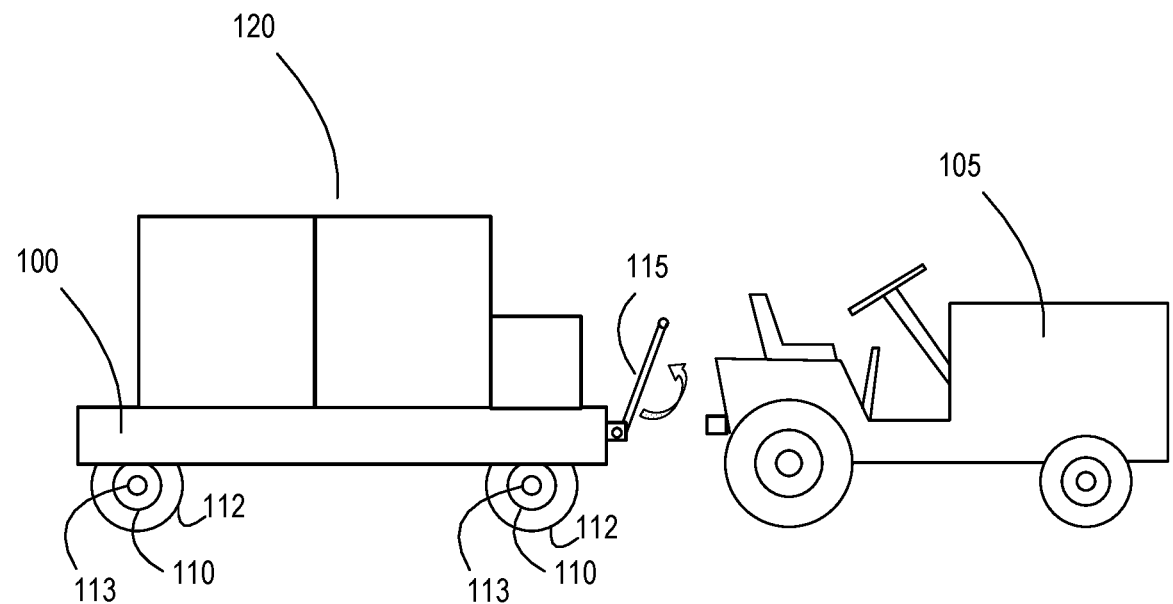
FIG. 1B is a diagram of the exemplary auto-chocking enabled cargo dolly from FIG. 1A after being towed by the exemplary ground support equipment cargo tractor and with auto-chocking of the cargo dolly engaged in accordance with an embodiment of the invention.

As used herein, those skilled in the art will appreciate that the term "cargo tractor" or "tug" refers to a mobile industrial vehicle or ground support equipment (GSE) used in the logistics field for transporting cargo, typically via one or more trailing dollies. A dolly is generally a type of trailer for GSE, where the cargo dolly is typically connected to the tractor via a tow bar (also referenced as a tongue for the dolly), has multiple wheels and a support frame to which the tow bar and wheels are attached (albeit moveably attached). As shown in FIG. 1A, an exemplary auto-chocking enabled cargo dolly 100 is being towed by an exemplary ground support equipment cargo tractor 105 in accordance with an embodiment of the invention. The cargo dolly 100 is shown with wheels 110, tires 112 mounted to the wheels 110, a hub 113 on an axle that couples the wheels 110 to the dolly's frame (e.g., exemplary dolly frame 125 shown in FIG. 2A). Exemplary cargo 120 being transported by exemplary auto-chocking enabled cargo dolly 100 is supported on a working area or deck on top of dolly 100 (e.g., on top of working deck 205 shown in FIG. 2B, which may be implemented with various cross-beam support members and castors/rollers disposed to facilitate movement of cargo onto and off of exemplary auto-chocking enabled cargo dolly 100). As shown in FIG. 1A, exemplary auto-chocking enabled cargo dolly 100 is connected to the tractor 105 via a connection at the end of the tow bar 115 to the tractor 105 (e.g., a hitch and receiver connection, connection pin, and the like). When in the configuration shown in FIG. 1A, exemplary auto-chocking enabled cargo dolly 100 may be moving and may not be in need of chocking for safety purposes. However, when in the configuration shown in FIG. 1B, exemplary auto-chocking enabled cargo dolly 100 may be towed by the exemplary ground support equipment cargo tractor 105, but is no longer being towed. In this configuration with the tow bar 115 raised, an embodiment may be triggered to deploy, engage, actuate, or otherwise activate an exemplary auto-chocking system on the cargo dolly 100 in accordance with an embodiment of the invention.

In some embodiments, the cargo dolly may have mechanical structure onboard to help secure what is loaded onto the dolly's frame for transport (e.g., securing pins, tie downs, webbing, and the like to secure exemplary cargo 120). Further structure onboard an embodiment of exemplary auto-chocking enabled cargo dolly 100 may include electronics (e.g., a control module, sensors, communication interface(s), location circuitry, actuators, and interfacing circuitry that operatively couples such elements and components together as a system onboard the dolly) as described in more detail below. Some embodiments of exemplary auto-chocking enabled cargo dolly 100 are used in a singular manner being towed behind GSE, such as exemplary ground support equipment cargo tractor 105. Other embodiments of an exemplary auto-chocking enabled cargo dolly may have a tow bar on a front end (e.g., exemplary tow bar 115) and a tow receiver on the back end so as to accommodate and connect with another cargo dolly as part of a train of multiple cargo dollies collectively pulled by GSE.

What is described herein are embodiments for designs and technical solutions that allow for automated and actuated onboard chocking systems that help to selectively immobilize a cargo dolly in an improved and enhanced manner that improves logistics operation performance, helps reduce safety risk to logistics personnel involved in loading, transporting, and unloading operations, and helps reduce potential damage to ground support equipment, people, cargo, and logistics facilities in the operating environment of such a cargo dolly. Such embodiments may be in the form of a cargo dolly with enhanced features that allow auto-chocking of the dolly (and automatic systems for accomplishing the same), but other embodiments may take the form of retrofit assemblies that may be added to an existing cargo dolly to improve and enhance how that cargo dolly may be used in a manner as to increase safety as well as ease & speed of logistics operations involving use of the cargo dolly.

Figure 2A:
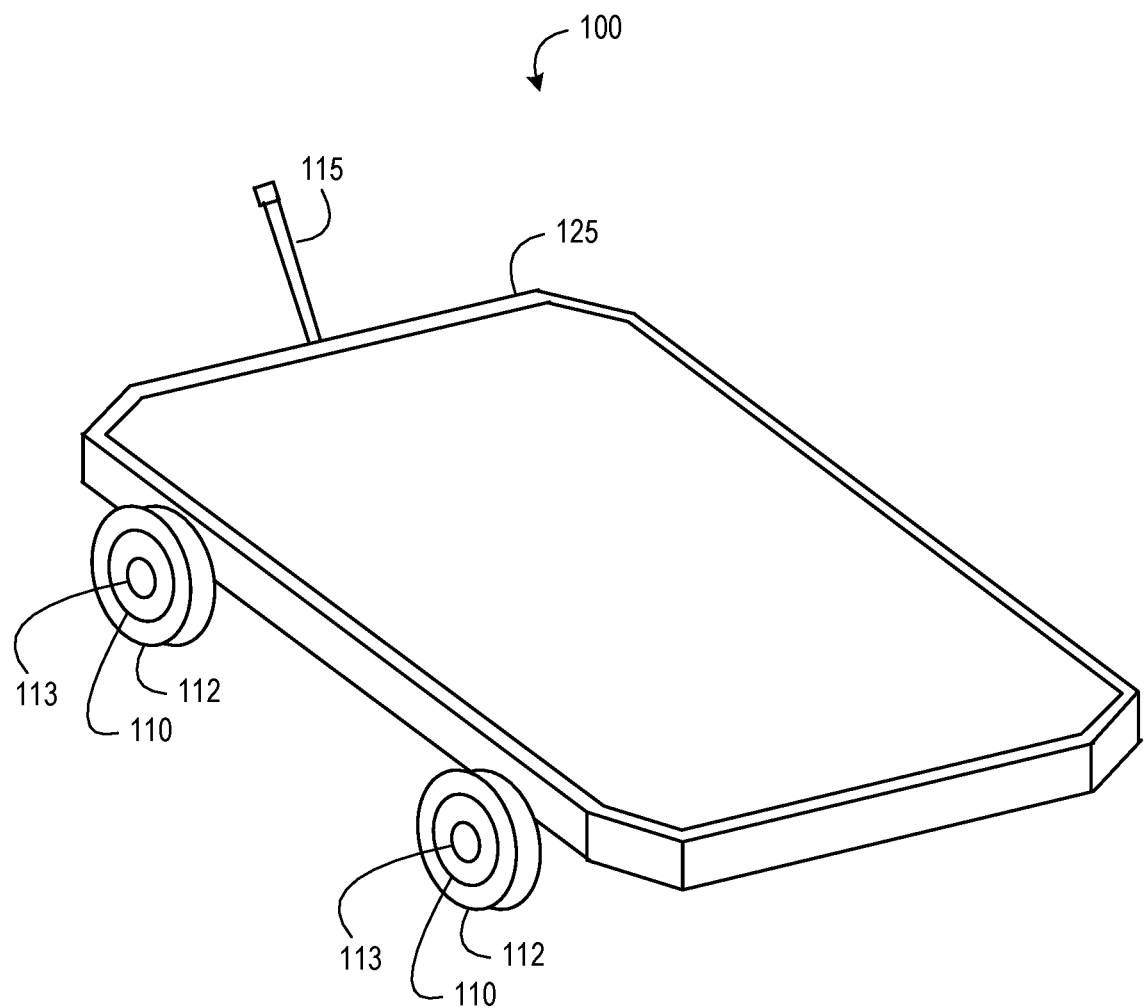
FIG. 2A is a perspective diagram of the exemplary auto-chocking enabled cargo dolly of FIG. 1A in accordance with an embodiment of the invention.
Figure 2B:
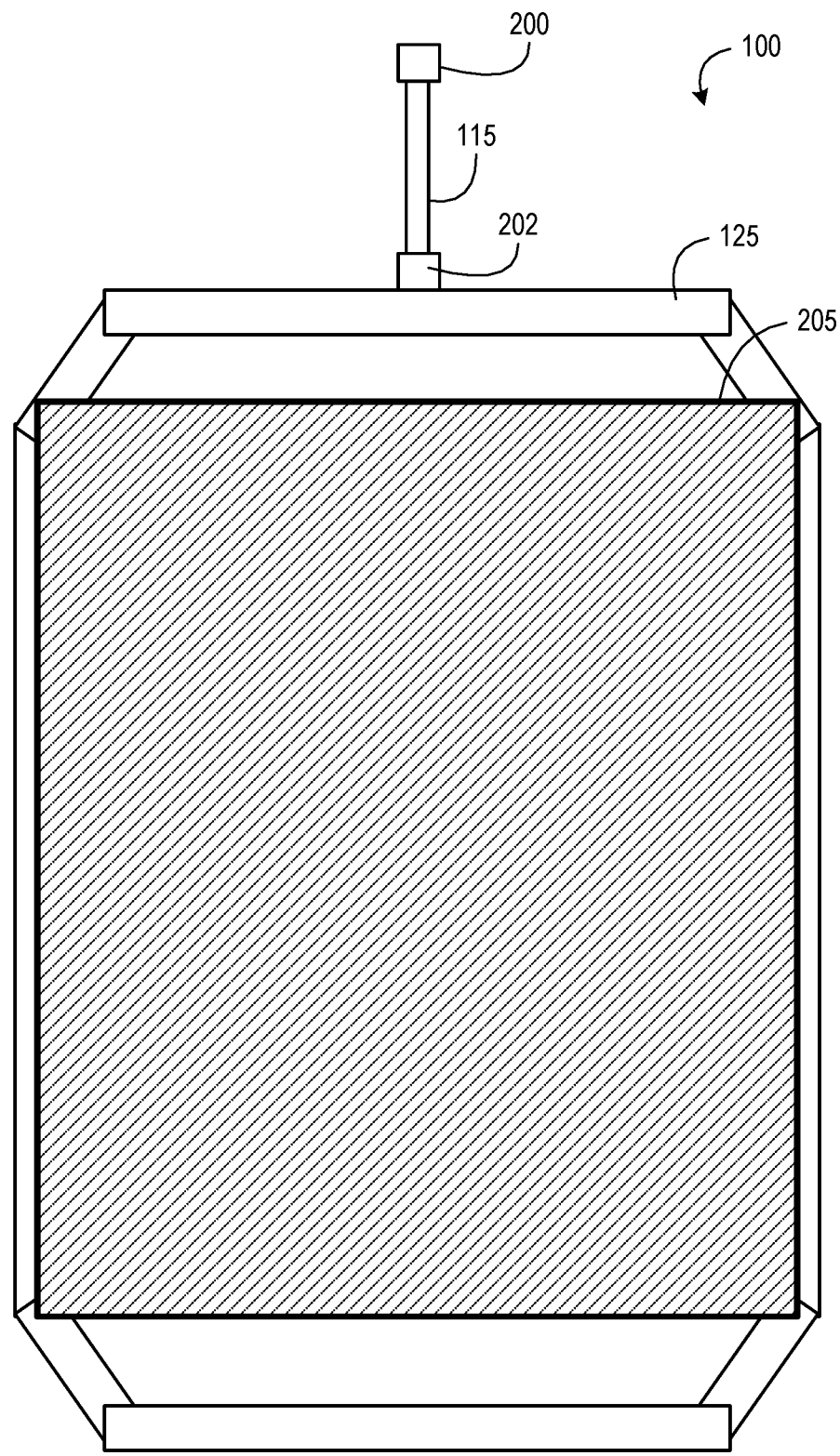
FIG. 2B is a top view diagram of the exemplary auto-chocking enabled cargo dolly of FIG. 1A illustrating a working deck that supports cargo to be transported on the exemplary auto-chocking enabled cargo dolly in accordance with an embodiment of the invention.

FIG. 2A is a perspective diagram of exemplary auto-chocking enabled cargo dolly 100 illustrating exemplary dolly frame 125. Such a frame may include peripheral dolly frame sides and edges, and may include multiple cross-members to help support cargo (e.g., cargo 120) being transported to and from locations (e.g., to and from cargo loaders that help move the cargo to and from aircraft). As shown in FIG. 2B from a top view of exemplary auto-chocking enabled cargo dolly 100, exemplary working deck 205 is shown as a surface that supports cargo 120 to be transported on the exemplary auto-chocking enabled cargo dolly 100. Exemplary tow bar 115 is shown as an articulating tow bar that is attached to dolly 100 at a hinged point 202 and with a distal end of tow bar 115 having a connector 200 used for connecting exemplary auto-chocking enabled cargo dolly 100 to exemplary cargo tractor 105. Examples of such a connector 200 may include a hitch and receiver connection, connection pin type connection, and the like that allows tractor 105 to apply pulling power to sufficient tow dolly 100 and its related cargo 120 (and further following dollies and their respective cargo as part of a dolly train).

Figure 2C:
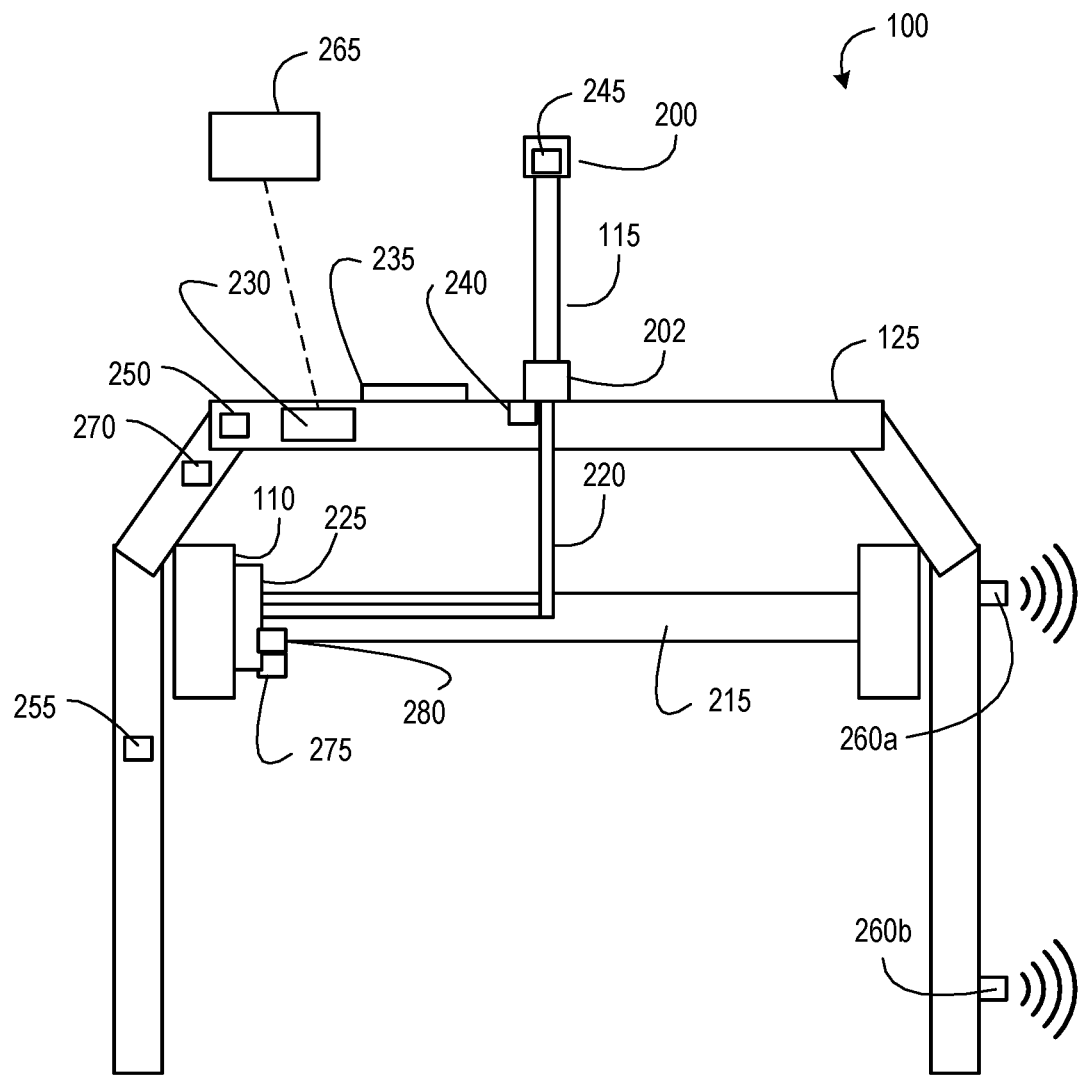
FIG. 2C is a detailed diagram of a portion of the exemplary auto-chocking enabled cargo dolly of FIG. 1A illustrating exemplary components of the dolly and exemplary auto-chocking components in accordance with an embodiment of the invention.

FIG. 2C is a more detailed diagram of a front portion of exemplary auto-chocking enabled cargo dolly 100 illustrating exemplary components of the dolly and exemplary auto-chocking components that may be deployed on such a dolly 100 in accordance with an embodiment of the invention. Referring now to FIG. 2C, exemplary auto-chocking enabled cargo dolly 100 is shown in partial view illustrating only a portion of frame 125 having front axle 215 and tow bar 115. Those skilled in the art will appreciate that axle 215 may be conventionally mounted relative to frame 125 allowing for mounting of each wheel 110 and steering for dolly 100 via tow bar 115, which is flexibly attached to dolly frame 125 at hinged point 202. Exemplary tow bar 115 is shown with hinged point 202 as a first attached end movably attached to the dolly frame 125 and connector 200 as a second distal end having a ground support equipment connector disposed on the second distal end. Embodiments may deploy the tow bar 115 in a raised position where the second distal end with connector 200 being raised and not connected to the ground support equipment (e.g., tractor 105 or another dolly) and a lowered position where the second distal end with connector 200 being lowered in a configuration to be attachable to the ground support equipment that tows dolly 110.

Embodiments may deploy a mechanical linkage, such as exemplary linkage 220, as part of the tow bar 115 as a type of mechanical switch that deploys or disengages auto-chocking for the cargo dolly based upon the position of the cargo dolly's tow bar 115. As such, in the deployed down position, the exemplary tow bar 115 is in a position representing a connection to a GSE (e.g., tractor 105) so that the tow bar 115, in this position, responsively disengages the further auto-chocking elements of the embodiments described below via a mechanical linkage implementing exemplary linkage 220 that is moved when the tow bar is lowered to the deployed down position. In like manner, when the tow bar 115 is in a pulled up position, the tow bar 115 is an alternative position representing no connection to a GSE and may responsively move the linkage so as to cause the further auto-chocking elements of auto-chocking system 225 (as explained in more detail below) to engage or deploy auto-chocking of dolly 100. In this way, an embodiment may use the actual tow bar 100 and one or more mechanical linkages (e.g., struts, cables, joints, shafts, articulating connections that handle changes in angles of responsive movement, and the like) as exemplary linkage 220 to operate as a type of sensor that detects a connection to the GSE and that can activate or deactivate the further auto-chocking elements of auto-chocking system 225 in the embodiments described below. As such, when not linked or engaged or connected, the exemplary dolly 100 in such embodiments may automatically and electronically actuate an automatic chocking solution that holds one or more of the wheels 110 in place without the disadvantage of direct tire contact.

As shown in the embodiment of FIG. 2C, exemplary linkage 220 may be disposed in communication with the tow bar 115, where the linkage 220 actuates from a first position when the tow bar 115 is in the raised position (and actuating the auto-chocking system 225 deployed on exemplary auto-chocking enabled cargo dolly 100, such as an exemplary wheel engagement chocking system) to a second position when the tow bar 115 is in the lowered position. As noted above, embodiments may implement exemplary linkage 220 as a mechanical switch responsive to actuate the auto-chocking system 225 based upon whether the tow bar 115 is in the raised position and whether the tow bar 115 is in the lowered position. For example, such a mechanical switch may be implemented using one or more struts movably fixed to the tow bar 115 and a cable in communication with the strut, where the cable is further in responsive communication with the auto-chocking system 225 so as to responsively actuate components of the auto-chocking system 225. In this way, movement of the tow bar 115 from the lowered position to the raised position may articulate the strut, which then may cause the cable to move and actuate the auto-chocking system 225 deployed on exemplary auto-chocking enabled cargo dolly 100. Other embodiments, as explained below, may have sensors and separate electronic actuators collectively implementing further embodiments of linkage 220 that actuates the auto-chocking system 225.

Embodiments of exemplary auto-chocking enabled cargo dolly 100 may also include an exemplary electronic control module 230 as a control circuit with logic that interfaces with sensors and controls actuators for exemplary auto-chocking system 225 used on exemplary auto-chocking enabled cargo dolly 100. In some embodiments, electronic control module 230 may be implemented with a simple circuit that, response to the sensor input, may generate a control signal that actuates further auto-chocking elements of the embodiments described below. In other embodiments, exemplary electronic control module 230 may be implemented as a processor-based circuit module that may have memory, programs that adapt the processor-based module with particular functionality beyond that of known conventional operation, interfacing circuitry, as well as responsive actuator driver circuits that can generate the control signal as described above and as explained in the embodiments described below. An embodiment of electronic control module 230 may, for example, be implemented with a weatherproof housing and, enclosed therein, a microprocessor, memory, interfacing circuitry for receiving sensor input, transceiver-based communication interface(s) for short range and/or longer range communications, and driving circuitry for sending control signals to activate external actuators. An exemplary embodiment of electronic control module 230 used on exemplary auto-chocking enabled cargo dolly 100 may be implemented with a RASPBERRY PI® type of low-cost computing node that has onboard wireless communications (e.g., BLUETOOTH® communications, ZIGBEE® communications, WIFI® communications, Cellular communications, and the like), sensor & actuator interfacing, memory, and may be battery operated.

The electronics controller module 230 may interface with sensors (e.g., proximity sensors, connection sensors, and the like) to detect connections to and between dollies as well as characteristics related to the dolly 100, such as the position of the dolly's tow bar 115, the dolly's movement status, the dolly's relative position to other objects (e.g., a cargo loader that can receive cargo 120 being transported on dolly 100), and the dolly's current location. For example, FIG. 2C illustrates exemplary position sensor 240 monitoring a position status of tow bar 115, connection sensor 245 monitoring a connection status of connector 200 and whether dolly 100 is connected to another GSE (e.g., tractor 105), motion sensor 250 monitoring movement of dolly 100, cargo weight sensor 255 monitoring a weight of cargo on dolly 100, proximity sensors 260a-260b monitoring a distance-based proximity of dolly 100 to nearby objects (e.g., a cargo loader), location sensor 270 that monitors a current location of dolly 100 (e.g., via a GPS receiver, inertial measurement unit (IMU), and the like), and chocking sensor 275 that monitors a status of auto-chocking system 225 for whether the dolly 100 has been chocked via deployed elements of system 225.

Embodiments using exemplary auto-chocking system 225 may also provide feedback (e.g., visual, wireless or wired communication notifications or alerts) via an exemplary feedback interface 235 to signify the dolly status of chocked or unchocked. Embodiments may trigger this feedback in response to the tow bar position—e.g., a change in the position of the above described mechanical linkage 220 (such as a cable and/or struts connected to or as part of such a linkage 220); a change in sensor output that generates the control signal to activate or deactivate the auto-chocking system 225 via chocking actuator 280. Exemplary feedback may include a mechanically responsive raising/lowering of a flag on the cargo dolly; responsively activating a status light (e.g., one or more status lights on the cargo dolly, a display panel disposed on the cargo dolly, or a rotating alarm type of light similar to that on emergency vehicles that would indicate a chocked state of the cargo dolly), or causing electronics onboard the cargo dolly to generate audible warnings or electronic signals that may be transmitted for display on a console of the GSE of the tractor 105, or on a handheld/smartphone/tablet used by logistics personnel. In this way, exemplary embodiments may have the exemplary auto-chocking enabled cargo dolly 100 itself generating feedback signifying that the cargo dolly 100 is either in a locked state where the dolly 100 may not be moved or in a towable and unlocked state where logistics personnel may move the dolly 100. Such feedback may also take the form of causing or otherwise initiating responsive action to take place, such as causing logistics personnel to stop moving the dolly 100.

In more detail and with reference to FIG. 2C, an embodiment of exemplary auto-chocking enabled cargo dolly 100 may deploy an actuated feedback indicator mounted on the dolly frame 125 as the feedback interface 235, which may be responsively triggered when the linkage 220 is actuated to the first position by the tow bar 115. For example, such an actuated feedback indicator 235 may be implemented as a flag movably disposed on the dolly frame 125 and responsive to the linkage 220, where the flag actuates from a stowed position to a deployed position when the tow bar 115 is moved from the lowered position to the raised position and deploying the flag indicates the auto-chocking system 225 is holding the dolly 100 stationary (e.g., holding at least one of the wheels 110 in place). In another example, the actuated feedback indicator 235 may be implemented with a status light fixed to the dolly frame 125 and responsive to movement of the linkage 220, where the status light activates when the tow bar 115 is moved from the lowered position to the raised position, and activation of the status light indicates the auto-chocking system 225 is holding the dolly 100 stationary (e.g., holding at least one of the wheels 110 in place). Such a status light may, for example, be an alarm light that rotates when activated indicating a chocked state of the dolly frame 125, or a display panel disposed on the dolly frame 125 that automatically displays a chocking status notification when activated indicating a chocked state of the dolly frame 125. In a further example, the actuated feedback indicator 235 may be implemented as a speaker fixed to the dolly frame 125 and responsive to movement of the linkage 220 (e.g., via linkage activated switch that turns the speaker on), where the speaker activates with an audible chocking status notification when the tow bar 115 is moved to the raised position, and the audible chocking status notification indicates the auto-chocking system 225 is holding the dolly 100 stationary (e.g., holding at least one of the wheels 110 in place).

The transceiver-based communication interface(s) of exemplary control module 230 may communicate wirelessly with an external transceiver 265 (e.g., a mobile wireless user access device (handheld/smartphone/tablet) used by a tractor operator, a cargo tractor transceiver disposed on tractor 105, and/or a central server). As such, an exemplary embodiment of auto-chocking enabled cargo dolly 100 may use such a transceiver disposed on the dolly frame 125 and a position sensor 240 disposed on the dolly frame to detect when the tow bar 115 is moved from the lowered position to the raised position. The position sensor 240 in this embodiment is operatively coupled to the transceiver to provide position sensor data indicating when the tow bar 115 is moved from the lowered position to the raised position. The transceiver (e.g., the transceiver in control module 230) in this embodiment is operative to receive the position sensor data from the position sensor 240 when the tow bar 115 is moved from the lowered position to the raised position and responsively transmit a chocking status message to external transceiver 265 associated with the ground support equipment (e.g., as an external transceiver disposed on tractor 105 or as an external transceiver implemented as a mobile wireless user access device associated with an operator of the tractor 105).

Wheel-Engagement Automatic Chocking Designs

In more detail, some embodiments may focus on particular types of wheel-engagement technology and assembly as part of the exemplary auto-chocking system 225 deployed on exemplary auto-chocking enabled cargo dolly 100. As noted above, embodiments may detect whether exemplary cargo dolly 100 is connected with a cargo tractor 105 or other GSE using mechanical devices or via electronic sensors. In general, an exemplary embodiment may deploy an electronic sensor on the cargo dolly that may detect a connection to the GSE and have electronic control module 230 generate a control signal that actuates elements of exemplary auto-chocking system 225.

In general, exemplary auto-chocking elements of exemplary auto-chocking system 225 may include, for example, an exemplary wheel engagement chocking system as system 225 fixed to the dolly frame 125 and disposed to selectively engage at least one of the wheels 110 attached to the dolly frame 125. In other words, embodiments may electrically or mechanically activate/engage auto-chocking elements of exemplary auto-chocking system 225 to hold the dolly's wheel 110 or wheels in place in response to the position of the tow bar 115. In like manner, the embodiments may deactivate/disengage such auto-chocking elements to free up movement of the dolly's wheel(s) 110.

In more detail, an embodiment may have the wheel engagement chocking system implemented as auto-chocking system 225 being responsive to a position of the linkage 220, where the wheel engagement chocking system applies pressure directly to at least one of the wheels 110 to hold the wheel(s) 110 in place when the linkage 220 is actuated to the first position by the tow bar 115. For example, such a wheel engagement chocking system implemented as the auto-chocking system 225 on dolly 100 may be deployed as one or more metal pins that may lock into an opening on one or more of the existing dolly wheels; a braking system that locks into a groove or otherwise grip on the outside of one or more of the existing dolly wheels 110 (e.g., a type of disk brake); or use of a clamp to compress the wheel 110 and hold the wheel 100 in place. As noted above, such wheel engagement chocking systems implemented as auto-chocking system 225 accomplish this without the need for direct contact with tire 112 so to avoid damage to the tire 112.

Figure 3:
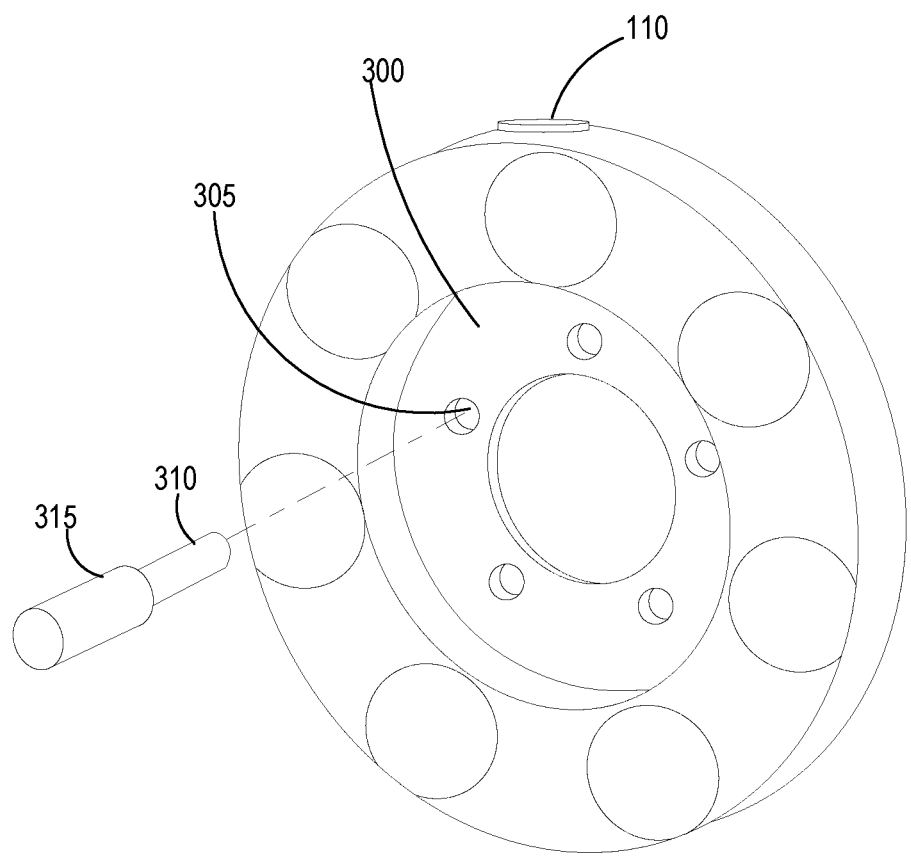
FIG. 3 is a diagram illustrating an exemplary wheel engagement chocking system implemented with an exemplary articulating pin in accordance with an embodiment of the invention.

More specifically, an embodiment of such an exemplary and improved auto-chocking enabled cargo dolly 100 may use an articulating pin that may be actuated to be inserted into an opening on one of the dolly's wheels 110. FIG. 3 is a diagram illustrating an exemplary wheel engagement chocking system operating as exemplary auto-chocking system 225 implemented with an exemplary articulating pin in accordance with an embodiment of the invention. Referring now to FIG. 3, an embodiment is illustrated where one of the wheels 110 is shown having an opening 305 on a radial surface 300 of the wheel 110. Exemplary auto-chocking system 225 in this embodiment has an exemplary articulating pin 310 in responsive communication with the linkage 220 where the pin 310 directly engages the opening 305 on the wheel 110 to hold the wheel 110 in place when the linkage 220 is actuated to the first position by the tow bar 115. Such an exemplary articulating pin 310 may be moved and articulated by an exemplary pin actuator 315 in responsive communication with the linkage 220 where movement of the tow bar 115 from the lowered position to the raised position articulates the linkage 220 to move to the first position causing the pin actuator 315 to move the articulating pin 310 into the opening 305 on the wheel 110 so that articulating pin 310 holds the wheel 310 in place without direct contact with a tire 112 on the wheel 110. Those skilled in the art will appreciate that actuator 315 and pin 310 may be disposed on axle support structure near wheel 110 so as to be located and aligned with opening 305 on surface 300 of wheel 110.

Figure 4:
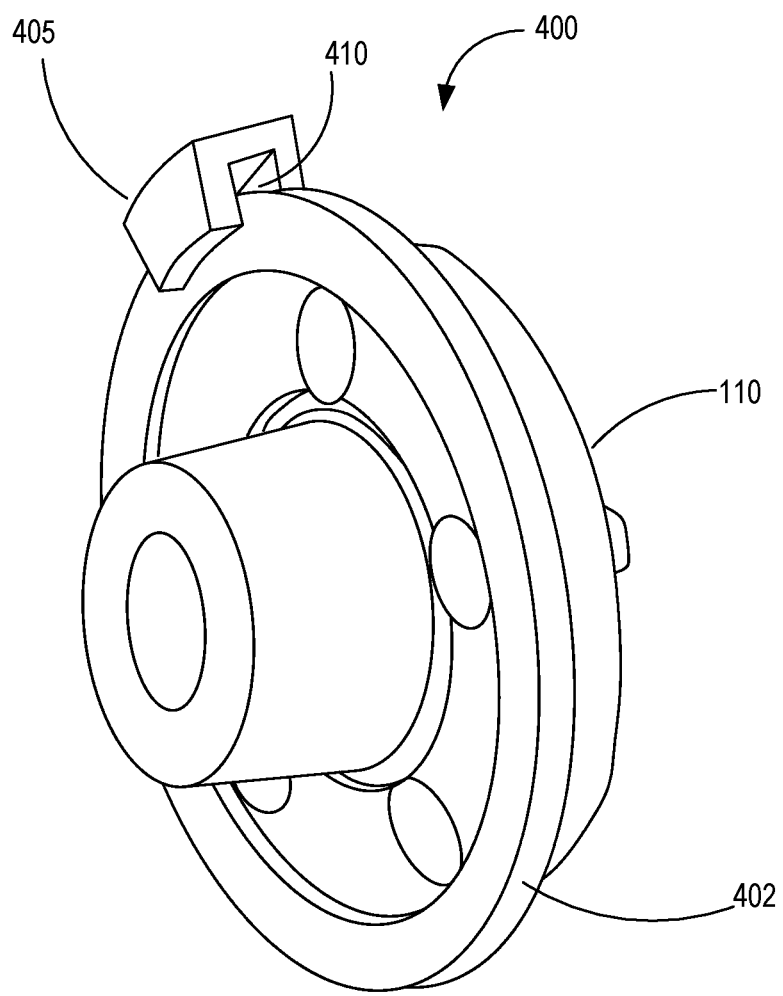
FIG. 4 is a diagram illustrating an exemplary wheel engagement chocking system implemented with an exemplary disk brake system in accordance with an embodiment of the invention.

Another embodiment of such an exemplary and improved auto-chocking enabled cargo dolly 100 may use an exemplary disk brake assembly fixed to one or more of wheels 110 as an implementation of exemplary auto-chocking system 225. FIG. 4 is a diagram illustrating an exemplary wheel engagement chocking system implemented with an exemplary disk brake system in accordance with an embodiment of the invention. Referring now to FIG. 4, an embodiment is illustrated where one of the wheels 110 is shown having an exemplary disk brake a disk brake assembly 400 fixed to one of the wheels 110 and in responsive communication with the linkage 220, where the disk brake assembly 400 operates to hold the wheel 110 in place when the linkage 220 is actuated to the first position by the tow bar 115. Such an exemplary disk brake assembly 400 is shown as including a disk brake rotor 402 fixed to wheel 110, and a disk brake caliper 405 operative to grip the disk brake rotor 402 (e.g., by moving pads 410, which apply pressure to rotor 402). As shown, exemplary disk brake caliper 405 may be disposed on the dolly frame 125 (e.g., fixed relative to frame 125 and axle support structure on frame 125 near wheel 110 so as to be located and aligned to grip rotor 402 that moves with wheel 110) and in responsive communication with the linkage 220 so that disk brake caliper 405 responsively grips the disk brake rotor 402 in response to movement of the linkage 220. As such, movement of the tow bar 115 from the lowered position to the raised position may articulate the linkage 220 to move to the first position causing the disk brake caliper 405 to grip the disk brake rotor 402 (e.g., via disk pads 410) and apply indirect pressure to the wheel 110 through the disk brake rotor 402 to hold the wheel 110 in place without direct contact with a tire 112 on the wheel 110.

Figure 5:
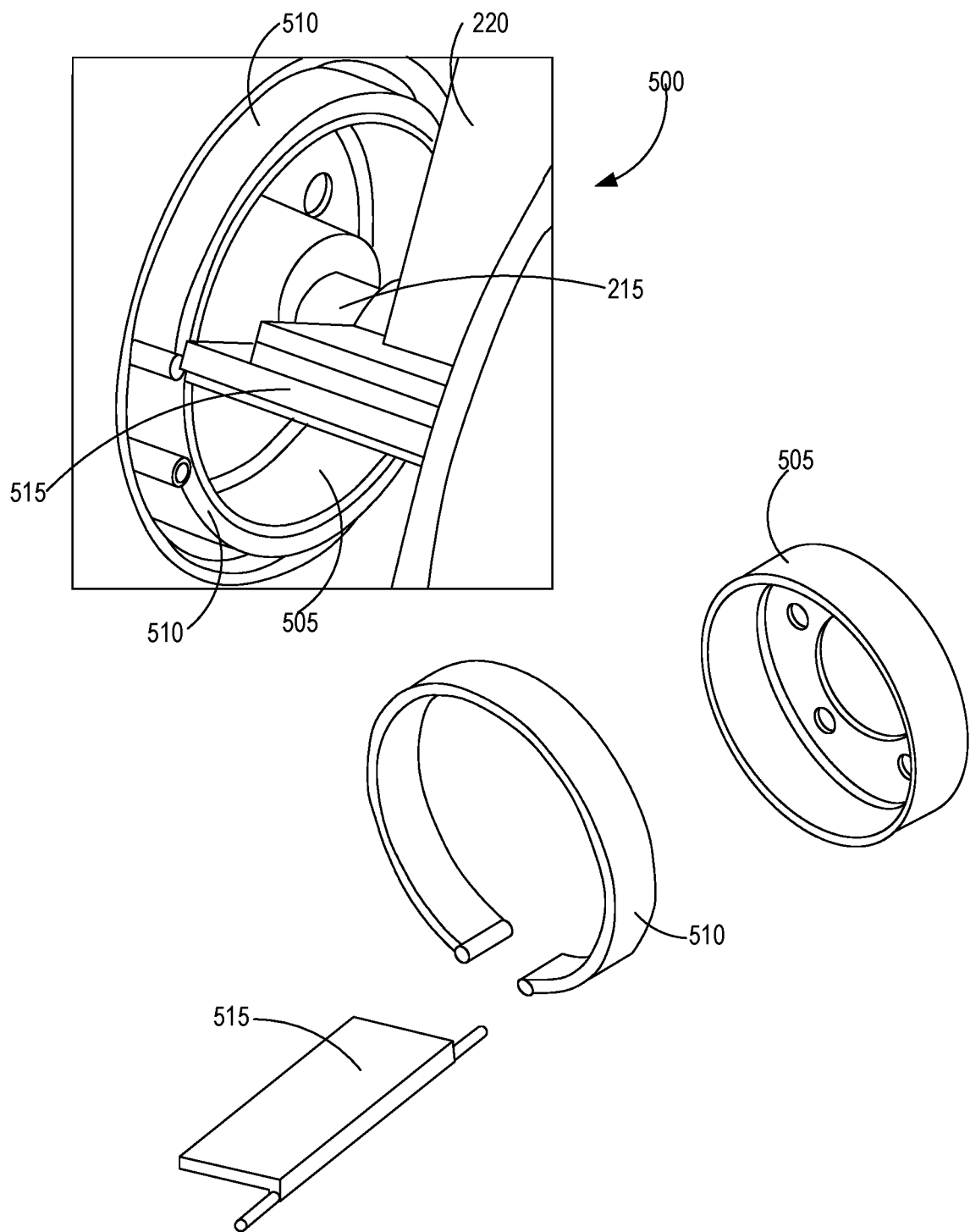
FIG. 5 is a diagram illustrating an exemplary wheel engagement chocking system implemented with an exemplary friction brake assembly in accordance with an embodiment of the invention.

Still another embodiment of such an exemplary and improved auto-chocking enabled cargo dolly 100 may use an exemplary band brake assembly fixed to one or more of wheels 110 as an implementation of exemplary auto-chocking system 225. FIG. 5 is a diagram illustrating an exemplary wheel engagement chocking system implemented with an exemplary friction brake assembly that employs a band type of brake in accordance with an embodiment of the invention. Referring now to FIG. 5, exemplary band brake assembly 500 is shown having an exemplary drum 505 (e.g., configured as a wheel hub drum that may be mounted to wheel 110), an exemplary friction clamp 510, and an exemplary pressure plate 515 used to transfer force to the friction clamp 510 from linkage 220. As shown in the embodiment of FIG. 5, friction clamp 510 (also referred to as a band) may be assembled to be disposed around a portion of the at least one of the wheels (e.g., an outer surface of the hub drum 505 when fixed to wheel 110). In this configuration, friction clamp 510 applies pressure to the portion of the wheel having drum 505 attached to it through drum 505 in response to movement of the linkage 220 (e.g., by transferring force from moving linkage 220 to plate 515, which then transfers force to friction clamp 510). As such, the friction clamp 510 applies pressure against the drum, and operates to hold the wheel 110 in place when the linkage 220 is actuated to the first position by the tow bar 115.

In more detail, wheel hub drum 505 may be fixed to the at least one of the wheels 110 of dolly. Exemplary band 510 operates as an actuated friction clamp disposed relative to the dolly frame 125 in a movable configuration where the band 510 is positioned around an outer surface of the wheel hub drum 505. The actuated friction clamp 510 is, via plate 515, in responsive communication with the linkage 220, wherein the actuated friction clamp 510 is further disposed to responsively grip the wheel hub drum 505 in response to movement of the linkage 220, and where movement of the tow bar 115 from the lowered position to the raised position articulates the linkage 220 to move to the first position causing the actuated friction clamp 510 to grip the outer surface of the wheel hub drum 505 and apply indirect pressure to the at least one of the wheels 110 through the wheel hub drum 505 to hold the wheel 110 in place without direct contact with a tire 112 on the wheel 110.

Further embodiments with auto-chocking system 225 implemented using wheel engagement technology (as well as axle-based engagement systems, skid brake systems, and hub-based systems as described herein) may also involve dolly connection monitoring. For example, an exemplary improved auto-chocking enabled cargo dolly 100 with a transceiver-based electronic control module 230 may include a tow bar connection pin sensor 245 disposed on the tow bar 115 as shown in FIG. 2C. The pin sensor 245 is operatively coupled to the transceiver-based electronic control module 230 to provide connection pin sensor data indicating when the tow bar 115 is connected to the ground support equipment. As such, the transceiver-based electronic control module may be further operative to receive the connection pin sensor data from the tow bar connection pin sensor 245 when the tow bar 115 is connected to the ground support equipment and responsively transmit a connection status message to the external transceiver 265 associated with the ground support equipment. Such a connection status message may include connection related information indicating a connection status between the tow bar 115 and the ground support equipment so as to remotely and automatically inform an operator of the GSE about the connection status. In a further example, the transceiver-based electronic control module 230 is operative to responsively transmit the connection status message to the external transceiver 265 associated with the ground support equipment to initiate an interrupt of operations on the ground support equipment based upon the connection status message and the chocking status message.

Further embodiments may initiate auto-chocking of the dolly 100 based on different sensors deployed on the enhanced dolly. For example, an embodiment with transceiver-based electronic control module 230 may use motion sensor 250 to detect when the dolly frame 125 is not moving. Exemplary motion sensor 250 in this embodiment is operatively coupled to the transceiver-based electronic control module 230 to provide motion sensor data indicating when the dolly frame 125 is not moving. As such, the transceiver-based electronic control module 230 in this embodiment may be further operative to receive the motion sensor data from the motion sensor 250 when the dolly frame 125 is not moving and responsively cause the auto-chocking system 225 (e.g., any of the wheel engagement system, axle-based engagement systems, skid brake systems, and hub-based systems as described herein) to chock the dolly (e.g., to selectively engage at least one of the wheels 110 to hold the wheels in place when the embodiment implements system 225 as the wheel engagement system; to selectively hold an axle in place when the embodiment implements system 225 as the friction brake chocking assembly; to selectively engage the ground with a skid brake to hold the dolly in place when the embodiment implements system 225 as the skid brake chocking assembly; to selectively cause a braking hub extension to engage and hold a braking hub extension in place when the embodiment implements system 225 as the hub-based chocking assembly) when the motion sensor data indicates the dolly frame 125 is not moving.

In another example, an embodiment with transceiver-based electronic control module 230 may use cargo weight sensor 255 to detect a weight level of cargo supported on the dolly frame. Exemplary cargo weight sensor 255 in this embodiment is operatively coupled to the transceiver-based electronic control module 230 to provide weight sensor data indicating the weight level of the cargo 120 supported on the dolly frame 125. As such, the transceiver-based electronic control module 230 in this embodiment may be further operative to receive the weight sensor data from the weight sensor 255 over a period of time, determine when a change in weight of the cargo 120 supported on the dolly frame 100 exceeds a threshold cargo weight change based upon the weight sensor data over the period of time, and responsively cause the auto-chocking system 225 (e.g., any of the wheel engagement system, axle-based engagement systems, skid brake systems, and hub-based systems as described herein) to chock the dolly (e.g., to selectively engage at least one of the wheels 110 to hold the wheels in place when the embodiment implements system 225 as the wheel engagement system; to selectively hold an axle in place when the embodiment implements system 225 as the friction brake chocking assembly; to selectively engage the ground with a skid brake to hold the dolly in place when the embodiment implements system 225 as the skid brake chocking assembly; to selectively cause a braking hub extension to engage and hold a braking hub extension in place when the embodiment implements system 225 as the hub-based chocking assembly) when the change in weight of the cargo 120 supported on the dolly frame 125 exceeds the threshold cargo weight change.

In still other examples, one or more proximity sensors may be used to trigger the auto-chocking system 225 via monitoring by electronic control module 230. For example, an embodiment with transceiver-based electronic control module 230 may use proximity sensor 260*a* disposed on one side of the dolly frame 125 to detect a distance between that side of the dolly frame 125 and an object external to the dolly 100, such as a cargo loader where cargo may be loaded or unloaded. Exemplary proximity sensor 260*a* in this example is operatively coupled to the transceiver-based electronic control module 230 to provide proximity sensor data indicating the distance between that side of the dolly frame 125 and the cargo loader. As such, the transceiver-based electronic control module 230 in this embodiment may be further operative to receive the proximity sensor data from the proximity sensor 260*a* over a period of time, determine when a change in the distance between that side of the dolly frame 125 and the cargo loader is below a threshold cargo loader distance based upon the proximity sensor data over the period of time, and responsively cause the auto-chocking system 225 (e.g., any of the wheel engagement system, axle-based engagement systems, skid brake systems, and hub-based systems as described herein) to chock the dolly (e.g., to selectively engage at least one of the wheels 110 to hold the wheels in place when the embodiment implements system 225 as the wheel engagement system; to selectively hold an axle in place when the embodiment implements system 225 as the friction brake chocking assembly; to selectively engage the ground with a skid brake to hold the dolly in place when the embodiment implements system 225 as the skid brake chocking assembly; to selectively cause a braking hub extension to engage and hold a braking hub extension in place when the embodiment implements system 225 as the hub-based chocking assembly) when the distance between that side of the dolly frame 125 and the cargo loader is below the threshold cargo loader distance. Such a threshold cargo loader distance may represent a predetermined alignment distance for the transfer of cargo 120 between the dolly frame 125 and the cargo loader (e.g., a distance that ensures cargo is not dropped or damaged as the cargo is moved from the working deck 205 of the dolly 100 to a receiving deck on the cargo loader).

In another proximity sensor example embodiment, multiple proximity sensors 260*a*, 260*b* may be used for determining relative distances between different parts of the dolly frame 125 and the cargo loader so as to trigger auto-chocking via system 225 when a threshold alignment configuration is met based on such detected relative distances at the different parts of the dolly frame 125. In more detail, a multi-proximity sensor embodiment may use transceiver-based electronic control module 230 with proximity sensors 260*a*, 260*b* disposed at different points on one side of the dolly frame 125 to detect a relative distance between that side of the dolly frame where the each of the proximity sensors 260a, 260b is disposed and a cargo loader external to the dolly frame 125. Exemplary proximity sensors 260a, 260b in this example are each operatively coupled to the transceiver-based electronic control module 230 to provide their respective proximity sensor data indicating the relative distance between that side of the dolly frame 125 at their respective points and the cargo loader. As such, the transceiver-based electronic control module 230 in this embodiment may be further operative to receive the proximity sensor data from each of the proximity sensors 260a, 260b over a period of time, determine when the relative distances between that side of the dolly frame 125 and the cargo loader meets a threshold alignment configuration for the dolly frame 125 and the cargo loader based upon the proximity sensor data over the period of time, and responsively cause the auto-chocking system 225 (e.g., any of the wheel engagement system, axle-based engagement systems, skid brake systems, and hub-based systems as described herein) to chock the dolly (e.g., to selectively engage at least one of the wheels 110 to hold the wheels in place when the embodiment implements system 225 as the wheel engagement system; to selectively hold an axle in place when the embodiment implements system 225 as the friction brake chocking assembly; to selectively engage the ground with a skid brake to hold the dolly in place when the embodiment implements system 225 as the skid brake chocking assembly; to selectively cause a braking hub extension to engage and hold a braking hub extension in place when the embodiment implements system 225 as the hub-based chocking assembly) when the change in the relative distances between the one side of the dolly frame and the cargo loader meets the threshold alignment configuration for the dolly frame and the cargo loader. This example allows for more precise conditions for auto-chocking system 225 deployment.

Those skilled in the art will appreciate that further embodiments may actuate the auto-chocking system 225 (whether implemented as an embodiment of the wheel engagement system, axle-based engagement systems, skid brake systems, and hub-based systems as described herein) based upon a combination of the above-described sensor data (e.g., when the dolly 100 detects a lack of movement, proximity to a cargo loader, and/or a threshold change in weight as detected on the enhanced dolly 100).

Still further embodiments of exemplary improved auto-chocking enabled cargo dolly 100 may actuate or otherwise trigger the dolly's auto-chocking system 225 based upon input received from a remote entity, such as from an external transceiver 265 (e.g., a transceiver on tractor 105 or a mobile wireless user access device such as a smartphone or tablet used by a tractor operator) or a centralized hub server as a type of external transceiver (e.g., hub manager server 605 shown in FIG. 6). For example, exemplary improved auto-chocking enabled cargo dolly 100 as described above using transceiver-based electronic control module 230 may have the transceiver in module 230 operative to receive a remote auto-chock message from external transceiver 265 and, in response, automatically actuate linkage 220 (or chocking actuator 280 via a generated control signal) to responsively cause auto-chocking system 225 to deploy and chock the dolly (using any of the wheel engagement system, axle-based engagement systems, skid brake systems, and hub-based systems as described herein).

As such, embodiments may extend use of the cargo dolly's electronic control module with further types of sensors and proactive actuation of auto-chocking pins, which may be based upon detected motion, change in weight of the container on the dolly, change in attachment status of dolly to the GSE (e.g., cargo tractor) or other dollies. Further embodiments may have the enhanced cargo dolly automatically actuating and deploying auto-chocking solutions based upon a dolly detected status of cargo tug movement alone, a dolly sensor detected position relative to a container loader (e.g., automatically chocking a sensor-enhanced cargo dolly when the cargo tractor and dolly are no longer moving towards a container loader or when further dolly sensors indicate alignment of the dolly with the cargo container loader).

Additional examples may include exemplary systems with a cargo tractor transceiver such that the cargo dolly's auto-chocking system (based on an electronics module deployed on the cargo dolly) may be responsive to a remote auto-chock message from the GSE or other user access device operated by a logistics operator of the GSE (e.g., a rugged handheld, smartphone, and the like).

Additional embodiments of exemplary improved auto-chocking enabled cargo dolly 100 may sense its own chocking status (e.g., whether the dolly 100 has been chocked via deployed elements of system 225) and have the capability of reporting the dolly's location and status to other GSE as well as further external devices, such as hub manager server 605 shown in FIG. 6). Still further embodiments may leverage such reporting capabilities with an exemplary cargo dolly monitor system for indicating if any or all dollies on a train of dollies are un-chocked so that a cargo tractor or other GSE towing such a train of dollies may know the status of the train and take responsive action quicker and be initiated to do so in an automated fashion. In general, tow bar connection pin status may be communicated via electronic controller module 230 disposed on each cargo dolly to the operator of the towing GSE via a user access device (rugged handheld, smartphone, etc.) or to a cargo tractor transceiver and display to verify the state of the train and the dolly connections prior to GSE movement. The cargo tractor's transceiver may be a processing based transceiver that receives such information from the dollies (e.g., connection related information, chocking status information, and the like), generates notifications for the operator, generates visual feedback, and may cause or initiate actions such as actively interrupting cargo tractor operation until all dollies are unlocked (e.g., actuated braking on the cargo tractor that is released only when the train's dollies report being unlocked and unchocked so they can be moved). A transceiver on tractor 105 may further include user input devices (e.g., keys, switches, joy sticks, touchscreens, and the like) as well as status indicators (e.g., lights, speakers, generated prompts on a display disposed on the system interface, and the like) to allow a logistics operator to send input to the electronics control module 230 on dolly 110 as responsive control input for a processor-based system that can actuate or remotely cause auto-chocking to be initiated (e.g., chock a particular cargo dolly, unchock a particular cargo dolly) to a desired configuration and to allow the logistics operator to receive status information (e.g., status of different cargo dollies connected to the cargo tractor). Using such active electronics (e.g., exemplary electronic control module 230) onboard exemplary enhanced cargo dolly 100 may also have onboard power storage and charging solutions so that such electronics on a particular dolly may use batteries, fuel cells or other power storage units that can be recharged from kinetic motion, solar, or rotational generators deployed on the cargo dolly.

Consistent with such embodiments that sense and report chocking status, exemplary improved auto-chocking enabled cargo dolly 100 as described above using transceiver-based electronic control module 230 may further use location sensor 270 as location circuitry disposed on the dolly frame 125 and operatively coupled to the transceiver-based controller module 230. In this embodiment, exemplary location sensor 270 generates location data (e.g., GPS coordinates, relative distance references to known cell towers, and the like) on a current location of the dolly frame 100 and provides the location data to the transceiver-based controller module 230. The auto-chocking system 225 used in this embodiment of auto-chocking enabled cargo dolly 100 may also include a chocking sensor 275 that monitors whether the auto-chocking system 225 has deployed (e.g., engagement of the wheel engagement chocking system relative to the at least one of the wheels 110) and is coupled to the transceiver-based controller module 230 to provide chock status sensor data indicating such chocking status data as detected by sensor 275. As such, the transceiver-based controller module 230 in this embodiment may be further operative to transmit a dolly asset tracking message to an external transceiver (such as a transceiver on a GSE, a mobile transceiver used by a GSE operator, or a hub manager server 605 responsive for logistics fleet management and asset tracking) when the chock status sensor data indicates the auto-chocking system 225 has been deployed or actuated to chock dolly 100 (e.g., the wheel engagement chocking system has engaged the at least one of the wheels 110 to hold the at least one of the wheels in place). Such a dolly asset tracking message may include the current location of the dolly frame 125 based upon the location data from sensor 270, chock status information for the dolly frame 125 based upon the chock status sensor data from sensor 275, and a reference identification for the dolly frame 125. Those skilled in the art will appreciate that such reference information, location, and chock status for the dolly frame 125 may also be considered reference information, location, and chock status for the dolly 100.

As noted above, while the triggering mechanism for auto-chocking system 225 may be implemented as a physical linkage 220 in some embodiments of an improved auto-chocking enabled cargo dolly, further embodiments may implement this triggering of the auto-chocking system 225 (e.g., any of any of the wheel engagement system, axle-based engagement systems, skid brake systems, and hub-based systems as described herein) using an electronic control module (e.g., module 230) disposed on the dolly frame of the improved auto-chocking enabled cargo dolly, a connection sensor (e.g., sensor 245) disposed on the dolly frame and operatively coupled to the electronic control module and where connection sensor provides connection sensor data to the electronic control module indicating when the dolly frame is connected to the ground support equipment, and a chocking actuator 280 (e.g., an electronically triggered actuator in place of linkage 220) disposed on the dolly frame and operatively coupled to the electronic control module where the chocking actuator is responsive to a control input generated by the electronic control module based on the connection sensor data. As such, the auto-chocking system 225 (whether implemented as an exemplary wheel engagement system, an axle-based engagement system, a skid brake system, or hub-based system as described herein) is actuated, activated, triggered and deployed based upon the control signal generated by the electronic control module. Those skilled in the art will appreciate that similar variations of the improved auto-chocking enabled cargo dolly as described above may also be deployed on such an embodiment of the improved auto-chocking enabled cargo dolly where triggering is accomplished via the control module, connection sensor, and chocking actuator in responsive communication with the auto-chocking system 225 used in such an embodiment (e.g., using different types of auto-chocking systems, including different types of feedback interfaces/indicators, feedback status messages on chocking status, connection status, and the further use of other types of sensors (other than connection sensors—e.g., motion sensor, weight sensor, weight sensor) to have the control module generate the control signal and activate the chocking actuator, and the use of a remote auto-chock message and transmission of dolly asset tracking messages for self-reporting by such improved dollies).

Spring/Axle-Based Automatic Chocking Designs

As noted above, embodiments of auto-chocking system 225 may be implemented with an axle-based engagement chocking system. In more detail, embodiments may automatically deploy an auto-chocking solution that is responsive to raising the tow bar of the cargo dolly (or to another trigger or command to chock the dolly so that the dolly is prevented from moving) using, for example, a set of friction brakes actuated and applied to secure one or more of the axles on the cargo dolly (referred to herein generally as an axle-based engagement system or friction brake chocking system focusing on an axle used on the cargo dolly).

In general, an embodiment may include an exemplary dolly frame 125 having a set of wheels 110, and an exemplary axle may be disposed relative to some of the dolly's wheels. An embodiment may involve a single axle attached to wheels on the cargo dolly and an actuated friction brake chocking assembly disposed about that axle of the dolly, such as that shown in FIG. 7A. In another embodiment, an existing cargo dolly axle may be retrofitted with a hub connection extension axle that generally fixes to existing wheel hubs as an extension axle added, such as that shown in FIG. 7B. Generally, an embodiment of an exemplary actuated friction brake chocking assembly may have one axle brake pad fixed to the dolly's frame while another axle brake pad may be selectively movable relative to the dolly's frame so as to apply friction pressure on opposing sides of the axle when actuated, such as that shown in each of FIGS. 7A and 7B. In other words, when one of the axle brake pads is articulated and actuated to apply pressure against the axle, it begins to apply pressure to both sides of the axle via the other fixed axle brake pad.

Figure 7A:
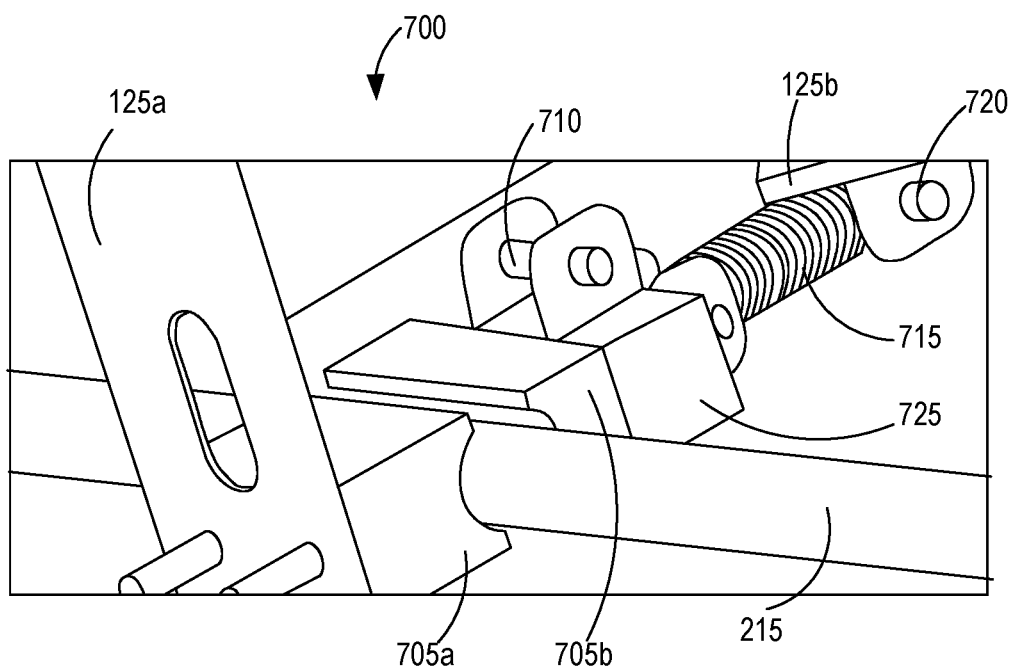
FIG. 7A is a diagram illustrating an exemplary friction brake chocking assembly that applies pressure to an axle to hold the axle in place in accordance with an embodiment of the invention.

Articulating the actuated friction brake chocking assembly may be accomplished in embodiments using a mechanical linkage responsively in communication with the tow bar so that lowering the tow bar causes the linkage (e.g., one or more linked struts, a hydraulically actuated line, or a cable) to move and cause pressure to be applied to the axle brake pads. As shown in FIG. 7A, exemplary springs may be used to help apply a desired amount of pressure for the axle brake pads. Other embodiments may deploy an actuated hydraulic brake line (with reservoirs, and the like) as a type of linkage or as an exemplary chocking actuator to responsively activate or deactivate the friction brake chocking assembly in response to movement of the tow bar or a control signal from an onboard electronics control module (such as module 230).

Figure 7B:
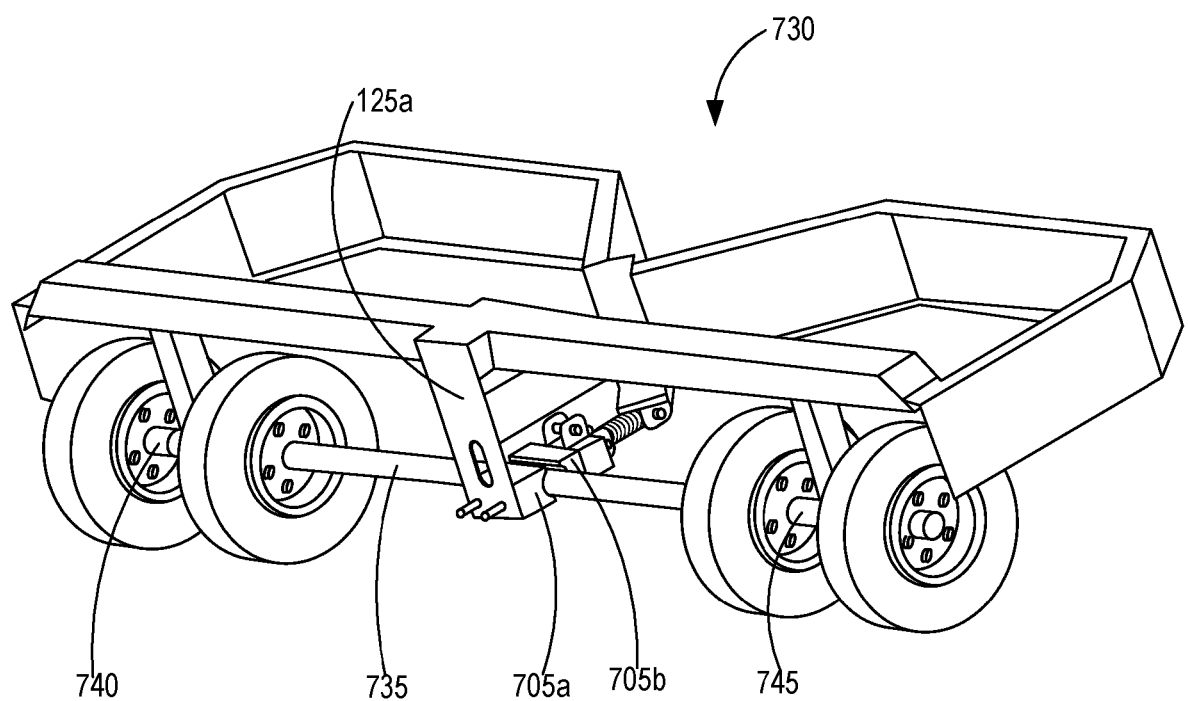
FIG. 7B is a diagram illustrating another exemplary friction brake chocking assembly that applies pressure to an axle to hold the axle in place in accordance with an embodiment of the invention.

FIGS. 7A and 7B provide further details on exemplary embodiments of an exemplary friction brake chocking assembly that may implement an axle-based engagement type of auto-chocking system 225 for use on an improved auto-chocking enabled cargo dolly 100 (having dolly frame 125, wheels 110, tow bar 115, and linkage 220) as described above relative to FIGS. 1A-2C. Referring now to FIG. 7A, an embodiment of exemplary friction brake chocking assembly 700 is shown relative to dolly axle 215 (e.g., a support axle for dolly 100 extending between two of the dolly's wheels 110) and coupled to dolly frame 125 at dolly frame support points 125a and 125b. In this embodiment, exemplary friction brake chocking assembly 700 may include brake pads 705a-705b, a movable friction brake actuator base plate 725, and spring 715 that tensions and biases the base plate 725. Each of brake pads 705a-705b have semi-circular contact surfaces for applying against axle 215 to provide an optimal amount of contact area between the pads, which collectively apply braking pressure to hold axle 215 in place, and the axle 215. One brake pad 705a is fixed to the dolly frame at dolly frame support point 125a, while the other brake pad 705b is fixed to friction brake actuator base plate 725 movably attached at pivot point 710 to the dolly frame 100. Friction brake actuator base plate 725 is biased to hold brake pad 705b against axle 215 using spring 715 attached to dolly frame 125b using spring fitting 720. Actuation of friction brake actuator base plate 725 (which then applies responsive pressure directly to the brake pads 705a-705b, which causes the brake pads to collectively hold the axle in place) may be implemented in an embodiment by movement of linkage 220 in response to a change in position of the tow bar 115 (or by a chocking actuator responsively coupled to the friction brake actuator base plate 725 and that actuates in response to a control signal generated by electronic control module 230). Thus, exemplary friction brake chocking assembly 700 is fixed to the dolly frame at dolly frame support points 125a and 125b, disposed to selectively engage axle 215 with its brake pads 705a-705b, responsive to a position of the linkage 220 or another chocking actuator so as to apply pressure directly to the brake pads 705a-705b, which causes the brake pads 705a-705b to collectively hold the axle 215 in place.

In FIG. 7B, an embodiment of exemplary friction brake chocking assembly 730 is shown relative to exemplary hub connection extension axle 735 attached to two of the dolly's wheels 110 as a type of retrofit equipment that may be added to use with the illustrated friction brake chocking assembly having opposing brake pads 705a-705b that collectively apply pressure against the exemplary hub connection extension axle 735 to hold this axle in place, which by virtue of the wheels 110 connection to hub connection extension axle 735 causes the dolly to be chocked in place preventing movement of exemplary dolly 100 using such an exemplary friction brake chocking assembly as its auto-chocking system 225. In more detail, an embodiment of exemplary hub connection extension axle 735 may be mounted to a support axle 740 (e.g., to a wheel 110) or to support axles 740, 745 on opposing wheel bases as shown in FIG. 7B.

Those skilled in the art will appreciate that embodiments of an improved auto-chocking enabled cargo dolly (such as dolly 100) that implement auto-chocking system 225 using an exemplary friction brake chocking assembly as shown in FIGS. 7A-7B may include variations of such embodiments of an improved auto-chocking enabled cargo dolly described above relative to further feedback indicators used on the dolly; transceiver-based control modules, sensors, and actuators used on such embodiments of the auto-chocking enabled cargo dolly; dolly connection monitoring with dolly connection status messages; sensor-based activation of the auto-chocking system of the dolly (e.g., using motion sensors, weight sensors, proximity sensors); remote activation of the auto-chocking system vis a remote auto-chock message; and aspects on dolly asset tracking and management using dolly asset tracking messages from the improved auto-chocking dolly.

Additionally, those skilled in the art will further appreciate that embodiments of an improved auto-chocking enabled cargo dolly (such as dolly 100) that implement auto-chocking system 225 using an exemplary friction brake chocking assembly as shown in FIGS. 7A-7B may include variations of such embodiments of an improved auto-chocking enabled cargo dolly described above that use an electronic control module, connection sensor, and chocking actuator where a control signal generated by the electronic control module actuates the friction brake chocking assembly as a type of auto-chocking system 225 instead of being triggered by the tow bar 115 and a linkage 220.

Actuated Skid Brake Automatic Chocking Designs

As noted above, embodiments of auto-chocking system 225 may also be implemented with a skid brake chocking assembly or system. In more detail, embodiments may use a type of automatically deployed solution for enhanced chocking an exemplary cargo dolly that is responsive to raising the tow bar of the cargo dolly (or connection sensor data) involving an exemplary actuated skid brake that extends down from below the cargo dolly's frame (notably the undercarriage part of the dolly frame). Once deployed, the skid brake engages and makes contact with the ground to hold the cargo dolly in place.

Figure 8A:
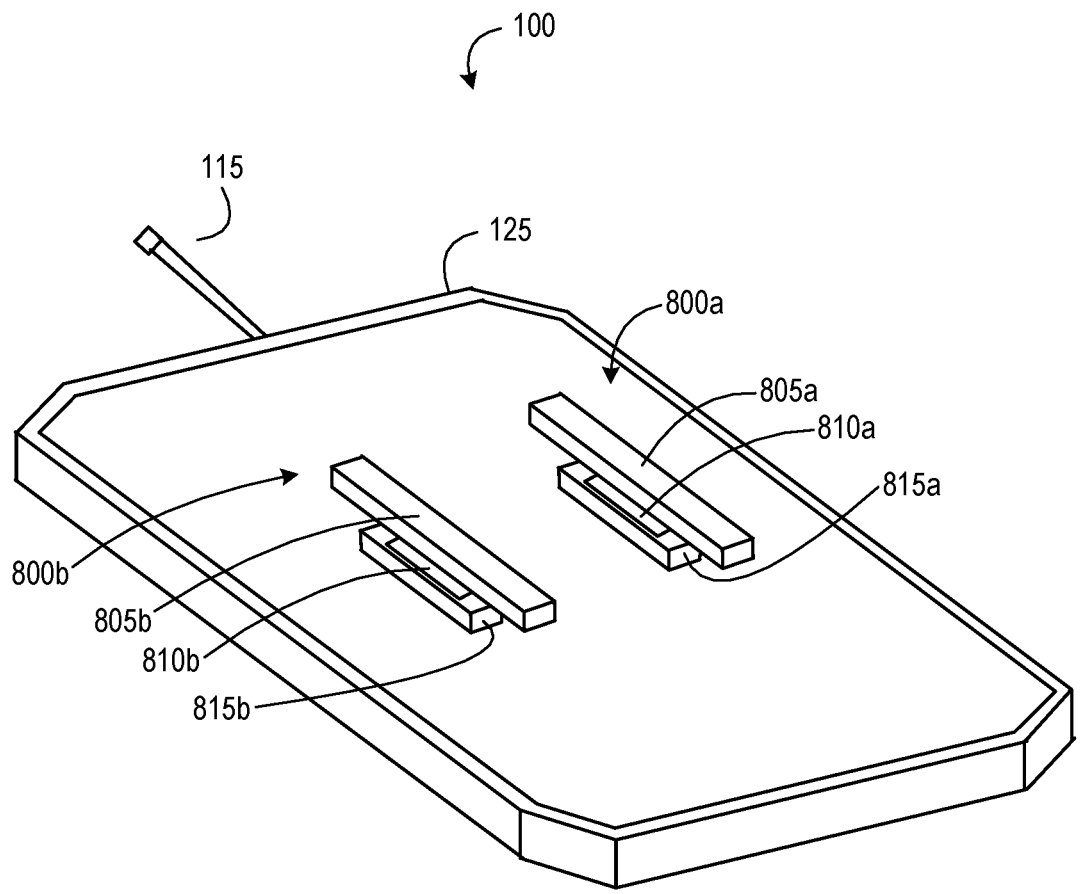
FIG. 8A is a diagram illustrating an exemplary skid brake chocking assembly as a type of auto-chocking system where the exemplary skid brake chocking assembly is shown in a retracted position below an exemplary cargo dolly that may extend from below the exemplary cargo dolly to contact the ground and hold the dolly in place in accordance with an embodiment of the invention.
Figure 8B:
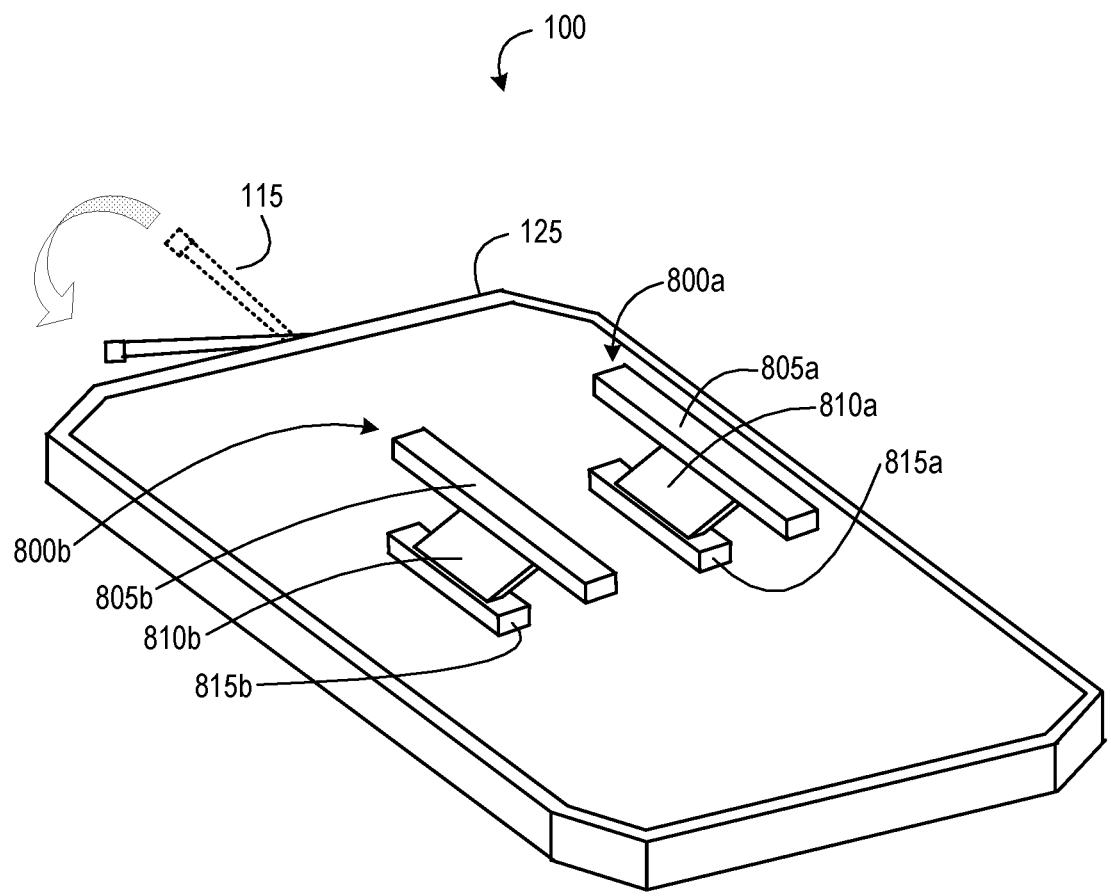
FIG. 8B is a diagram illustrating the exemplary skid brake chocking assembly shown in FIG. 8A in a deployed position extending below the exemplary cargo dolly to contact the ground and hold the dolly in place in accordance with an embodiment of the invention.

In general, an exemplary hydraulically actuated skid brake may be implemented in an embodiment as part of an enhanced cargo dolly (e.g., exemplary dolly 100) where the skid brake may be actuated by the tow bar or tongue of the cargo dolly (or another chocking actuator), which may cause hydraulic fluid to activate a hydraulic piston (used as a hydraulic skid brake actuator of the skid brake chocking system) to extend a skid brake frame ground contact from an initial position closer to the undercarriage of the dolly frame (e.g., as shown in FIG. 8A) to a deployed extended position down from the undercarriage of the dolly frame (e.g., as shown in FIG. 8B). The hydraulic skid brake is movably anchored to the dolly frame (undercarriage) and actuated in one embodiment using skid brake linkages, which may be configured as two pairs of parallel linkages mounted to the dolly frame using an anchor point on one end and mounted to the skid brake ground contact element (e.g., a beam operating as the skid brake). Such an embodiment of an exemplary hydraulic skid brake may be disposed on multiple parts of the dolly frame that as commonly actuated using the tow bar. The anchor points fixed to the dolly frame may be bolted to the dolly frame. As such, embodiments may use one or more skid brakes as part of such an exemplary skid brake chocking system to implement auto-chocking system 225 as described above.

FIGS. 8A-8E provide further details regarding embodiments of auto-chocking system 225 may also be implemented with an exemplary skid brake chocking assembly or system. FIG. 8A is a diagram illustrating an exemplary skid brake chocking assembly as a type of auto-chocking system 225 where the exemplary skid brake chocking assembly is shown in a retracted position below exemplary cargo dolly 100 that may extend from below the exemplary cargo dolly 100 to contact the ground and hold the dolly 100 in place in accordance with an embodiment of the invention. Referring now to FIG. 8A, those skilled in the art will appreciate that while exemplary dolly 100 is shown upside down and without some components that may be used dolly 100, exemplary dolly 100 may be implemented with similar components as described above relative to FIGS. 1A-2C and that components not shown in FIGS. 8A-8B are not shown for purposes of clarity and to simplify the illustrations of an exemplary skid brake chocking system. In FIG. 8A, a bottom view of exemplary dolly 100 and its frame 125 are shown having exemplary skid brake chocking systems 800a, 800b fixed to the bottom or undercarriage of dolly frame 125 (e.g., fixed to cross-member components of dolly frame 125, or the like). Each of exemplary skid brake chocking systems 800a, 800b is disposed to selectively and directly engage the ground below the dolly frame 125 to hold the dolly frame 125 in place when the exemplary skid brake chocking systems 800a, 800b are actuated based, for example on a position of linkage 220 in response to movement of tow bar 115 (or actuated based on connection sensor data where electronic control module 230 may generate a control signal for a chocking actuator to actuate exemplary skid brake chocking assemblies 800a, 800b). Those skilled in the art will appreciate that embodiments of an improved auto-chocking enabled cargo dolly 100 may deploy multiple skid brake chocking assemblies 800a, 800b (such as that shown in FIG. 8A) where each of assemblies 800a, 800b may be commonly triggered to actuate, but other embodiments of improved auto-chocking enabled cargo dolly 100 may deploy a single skid brake chocking system (such as assembly 800a) in order to hold dolly frame 125 in place through skid brake chocking technology.

As shown in FIG. 8A, each of exemplary skid brake chocking assemblies 800a, 800b have common elements—namely, exemplary skid brakes 805a-805b; exemplary skid brake linkages 810a-810b, and skid brake bases 815a-815b. For each skid brake chocking system, the respective skid brake base (e.g., 815a) is fixed to a bottom of the dolly frame 125 as an anchor point for that skid brake chocking assembly. Skid brake linkages (e.g., movable skid brake linkages 810a) are used in sets and are movably attached to the skid brake base for that assembly/system and to the skid brake (e.g., 805a) for that assembly/system. While not shown in FIG. 8A, embodiments of exemplary skid brake chocking systems 800a, 800b also include skid brake actuators. Each of the skid brake actuators are responsive to the position of linkage 220 so as to cause movement of respective skid brakes in assemblies 800a, 800b. For example, skid brake 805a of assembly 800 is moved by its skid brake actuator relative to the skid brake base 815a attached to the bottom undercarriage of dolly frame 125 so that the skid brake 805a may be extended relative to the bottom of the dolly frame 125 to engage the ground below the dolly frame 125 when the linkage 220 is actuated by movement of tow bar 115. Thus, while exemplary skid brakes 805a-805b are shown in a retracted position under dolly frame 25 in FIG. 8A; exemplary skid brake linkages 810a-810b may be moved by each assembly's skid brake actuators relative to respective skid brake bases 815a-815b so that each of skid brakes 805a-805b extends relative to the bottom of the dolly frame 125 as shown in FIG. 8B so as to engage the ground below the dolly frame 125. As such, the skid brake actuator is moved to a position where the assemblies 800a, 800b have their respective skid brakes 805a, 805b directly engaging the ground below the dolly frame 125 to hold the dolly frame in place in response to movement of the tow bar 115 and connecting linkage 220.

Embodiments that deploy such exemplary skid brake chocking assemblies may be actuated by different types of linkages as exemplary linkage 220 (e.g., exemplary linkages, joints, shafts, articulating connections that handle changes in angles of responsive movement). For example, exemplary linkage 220 may be implemented as a mechanical switch responsive to actuate the skid brake chocking assembly and cause the skid brake chocking assembly to directly engage the ground below the dolly frame 125 based upon whether the tow bar 115 is in the raised position and whether the tow bar 115 is in the lowered position. In more detail, such a mechanical switch may be implemented as a strut movably fixed to the tow bar 115 and a cable in communication with the strut, where the cable is further in responsive communication with the skid brake chocking assembly (e.g., the skid brake actuator within the particular assembly). As such, movement of the tow bar 115 from the lowered position to the raised position articulates the strut, which then causes the cable to move and actuate the skid brake chocking assembly.

In still another example embodiment that deploys such exemplary skid brake chocking assemblies, exemplary linkage 220 may be a hydraulic line responsive to actuate the skid brake chocking assembly based upon whether the tow bar 115 is in the raised position and whether the tow bar is in the lowered position.

In yet another example embodiment that deploys such exemplary skid brake chocking assemblies, exemplary linkage 220 may be a hydraulic control piston attached to the dolly frame 125 and in communication with the tow bar 115. In this embodiment, the hydraulic control piston provides a hydraulic control output responsive to actuate the skid brake chocking assembly based upon whether the tow bar 115 is in the raised position and whether the tow bar 115 is in the lowered position. More specifically, the hydraulic control piston may actuate from a first position when the tow bar 115 is in the raised position to a second position when the tow bar 115 is in the lowered position so as to actuate the skid brake chocking assembly to directly engage the ground below the dolly frame 125 to hold the dolly frame 125 in place when the hydraulic control piston is in the first position, and to retract the skid brake chocking assembly (e.g., skid brake 805a and/or skid brake 805b) from engaging the ground below the dolly frame 125 when the hydraulic control piston is in the second position.

Figure 8C:
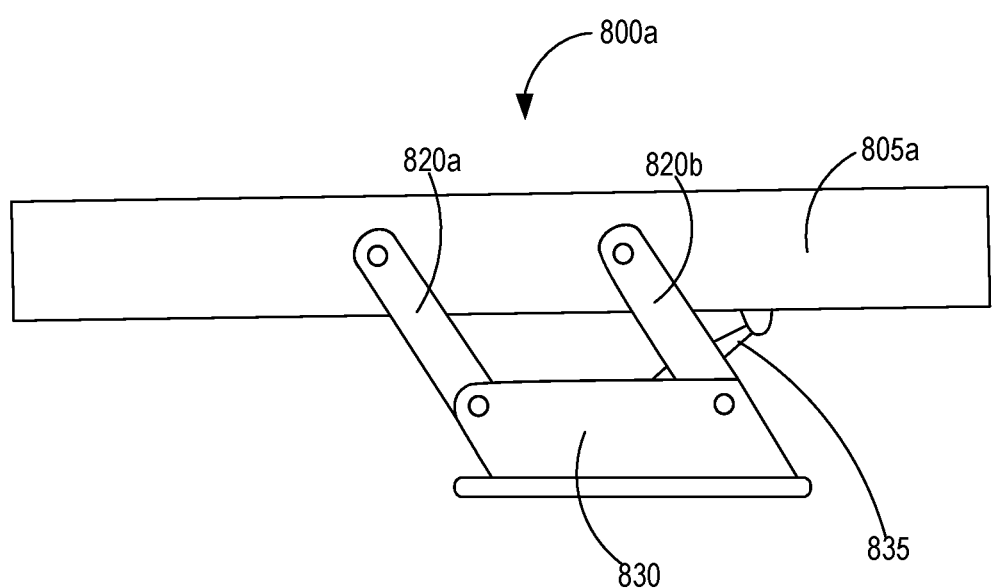
FIG. 8C is a diagram illustrating further details of an exemplary skid brake chocking assembly in accordance with an embodiment of the invention.
Figure 8D:
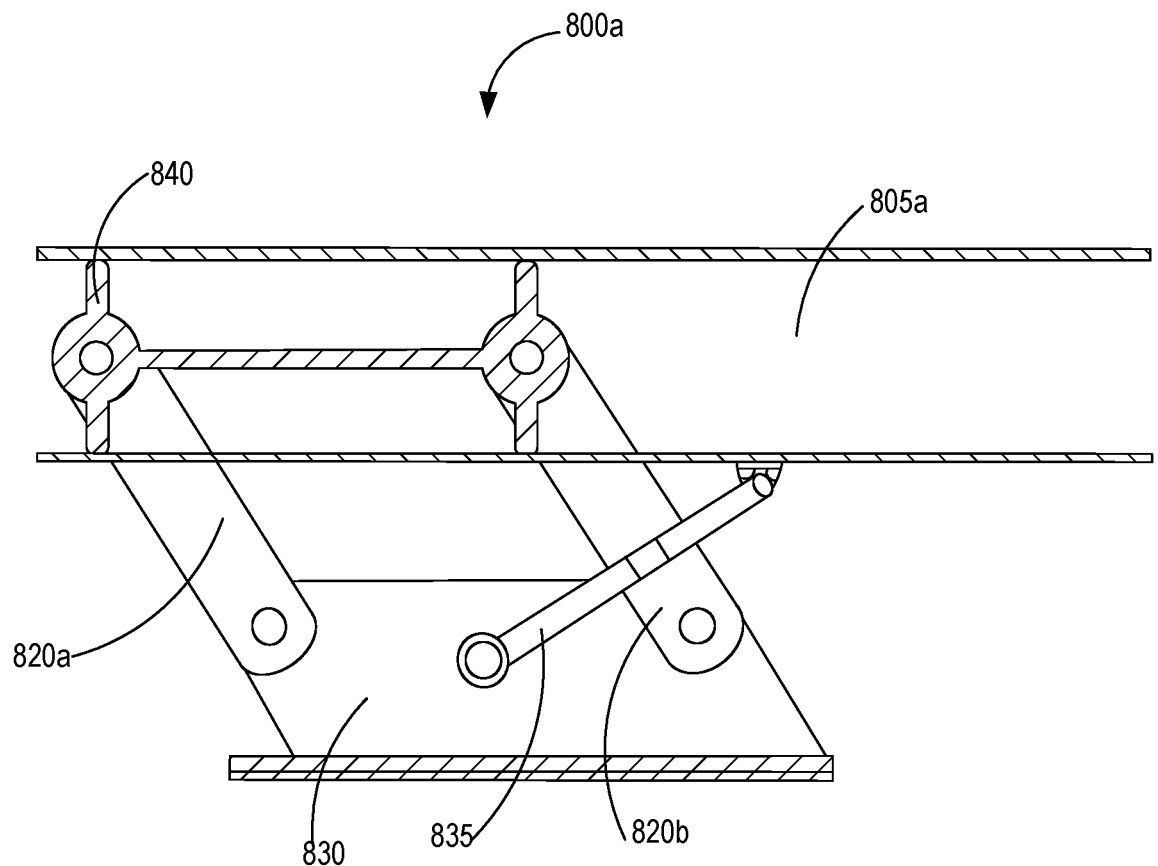
FIG. 8D a diagram illustrating further details of an exemplary chocking actuator used as part of an exemplary skid brake chocking assembly in accordance with an embodiment of the invention.
Figure 8E:
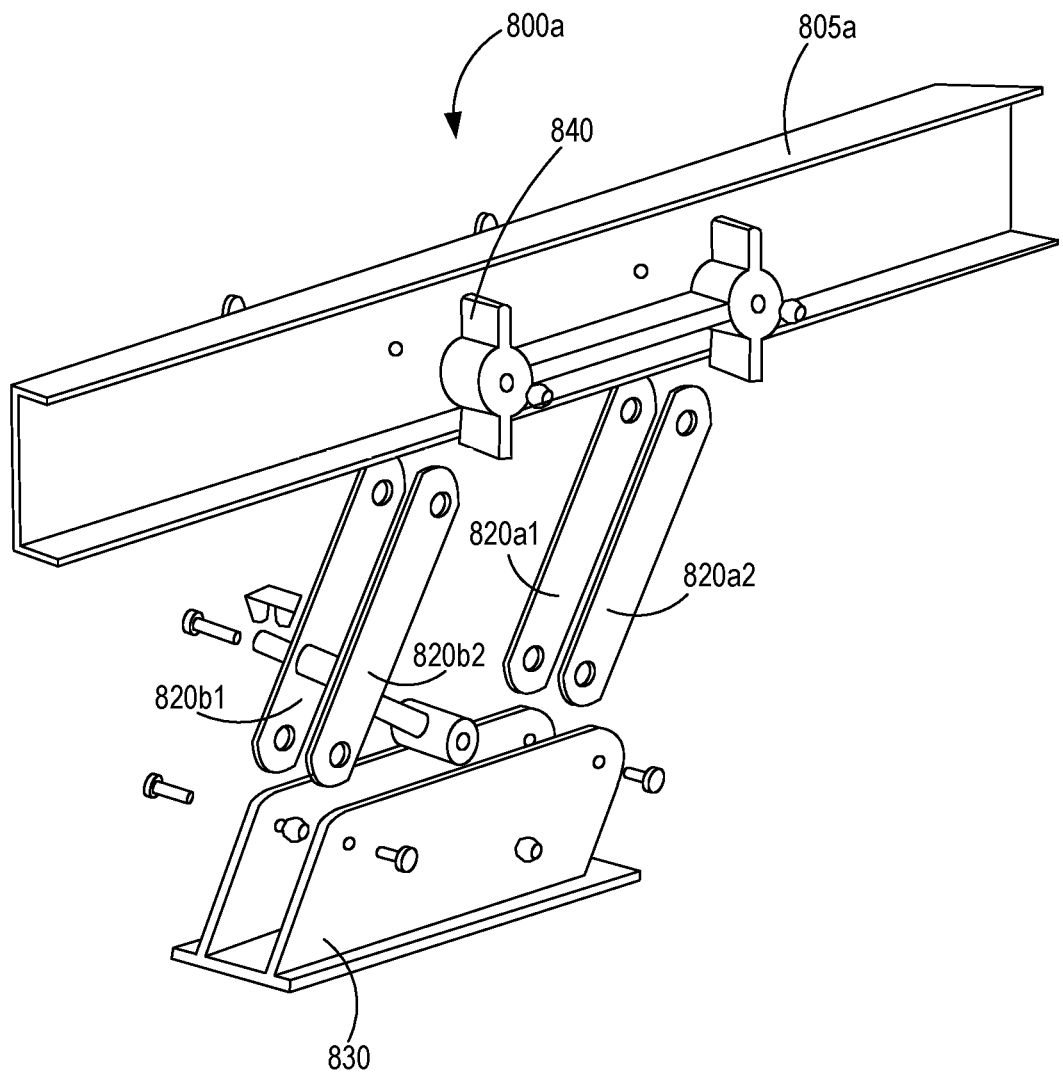
FIG. 8E a diagram illustrating further details of an exemplary skid brake chocking assembly including exemplary skid brake linages in accordance with an embodiment of the invention.

FIG. 8C is a diagram illustrating further details of an exemplary skid brake chocking assembly 800a in accordance with an embodiment of the invention. Referring now to FIG. 8C, exemplary skid brake chocking assembly 800a is shown with exemplary skid brake base 830, which is fixed to a bottom of the dolly frame 125 (similar to that described for base 815a) as an anchor point for the skid brake chocking assembly 800a. FIG. 8C further illustrates an exemplary set of skid brake linkages 820a, 820b movably attached to the skid brake base 830 via bolts that allow each of skid brake linkages 820a, 820b to respectively pivot relative to the bolt attachment locations on base 830. In some embodiments, each of skid brake linkages 820a, 820b may be implemented as with pair of parallel disposed strut links, such as a first link pair 820a1, 820a2 and a second link pair 820b1, 820b2, that provide enhanced stability when implementing the skid brake linkages as shown in FIG. 8E. In other embodiments, each of skid brake linkages 820a, 820b may be attached to skid brake 805a using a mounting support 840, which may be useful when skid brake 805a is implemented using a beam type of contact beam as shown in FIG. 8E.

FIG. 8C also illustrates skid brake 805a as movably attached to each of the skid brake linkages 820a, 820b with similar bolts and bolt attachment locations on skid brake 805a. In this manner, skid brake 805a may be articulated by exemplary skid brake chocking actuator 835 (e.g., a hydraulic skid brake actuator responsive to linkage 220, which may be implemented as the hydraulic control piston described above) shown in FIG. 8C and shown in FIG. 8D in more detail. As such, exemplary skid brake chocking actuator 835 has a first end attached to the skid brake base 830 and a second end attached to the skid brake 805a, and may be articulated to extend the relative position of the second end or retract the second end, which causes the skid brake 805a extend away from the skid brake base 830. In this manner, the position of the second end of the skid brake actuator 835 is responsive to the position of the linkage 220 so that the skid brake 805a may be moved by the skid brake actuator 835 relative to the skid brake base 830 so that the skid brake 805a extends relative to the bottom of the dolly frame 125 to engage the ground below the dolly frame 125 when the linkage 220 (however implemented) is actuated to the first position by the tow bar 115. In an example where the linkage 220 may be implemented with the hydraulic control piston described above (i.e., attached to the dolly frame 125 and in communication with the tow bar 115, and providing a hydraulic control output responsive movement of the tow bar 115), actuator 835 may be implemented as a hydraulic skid brake actuator with a first end attached to the skid brake base 830 and a second end attached to the skid brake 805a. Movement of the second end of the hydraulic skid brake actuator 835 relative to the skid brake base 830 is responsive to the hydraulic control output from the hydraulic control piston so that the skid brake 805a may be moved by the hydraulic skid brake actuator 835 relative to the skid brake base 830 to extend the skid brake 805a relative to the bottom of the dolly frame 125 to engage the ground below the dolly frame 125 when the hydraulic control piston actuates from a first position when the tow bar 115 is in the lowered position to a second position when the tow bar 115 is in the raised position. As such, hydraulic skid brake actuator 835 may be implemented as a type of hydraulic piston coupled to the anchor point for each of the dolly's hydraulically extendible skid brakes 805a. In this manner, movement of the tow bar 115 activates and actuates the hydraulic pistons, which in turn move and lower the skid brake frame ground contact (e.g., skid brake 805a and/or 805b) from the retracted position to an extended position. As such and in the extended position, the ground contacting skid brake 805a, 805b inhibits movement of the cargo dolly 100 as a type of automatically deployed chocking system.

Those skilled in the art will appreciate that embodiments of an improved auto-chocking enabled cargo dolly (such as dolly 100) that implement auto-chocking system 225 using an exemplary skid brake chocking assembly as shown in FIGS. 8A-8E and described above may also include variations of such embodiments of an improved auto-chocking enabled cargo dolly described above relative to further feedback indicators used on the dolly; transceiver-based control modules, sensors, and actuators used on such embodiments of the auto-chocking enabled cargo dolly; dolly connection monitoring with dolly connection status messages; sensor-based activation of the auto-chocking system of the dolly (e.g., using motion sensors, weight sensors, proximity sensors); remote activation of the auto-chocking system via a remote auto-chock message; and aspects on dolly asset tracking and management using dolly asset tracking messages from the improved auto-chocking dolly.

Additionally, those skilled in the art will further appreciate that embodiments of an improved auto-chocking enabled cargo dolly (such as dolly 100) that implement auto-chocking system 225 using an exemplary skid brake chocking assembly as shown in FIGS. 8A-8E may include variations of such embodiments of an improved auto-chocking enabled cargo dolly described above that use an electronic control module, connection sensor, and chocking actuator (using exemplary skid brake actuator as the chocking actuator) where a control signal generated by the electronic control module actuates the skid brake chocking assembly as a type of auto-chocking system 225 instead of being triggered by the tow bar 115 and a linkage 220.

Hub-Based Automatic Chocking Designs

As mentioned above, embodiments of auto-chocking system 225 may alternatively be implemented with a hub-based chocking assembly or system. Embodiments may use friction forces, but implement such a hub-based chocking assembly with a separate metal flywheel (generally referred to as a braking hub extension) that extends from the cargo dolly's wheels instead of applying frictional braking force directly to the rubber on the cargo dolly's wheels. Such an embodiment may advantageously be added to existing frictional cargo dolly braking systems that may apply braking force to the tire's rubber. In such a retrofitted embodiment, the tow bar activated chocking system may be enhanced to apply frictional braking force using elements that extend from the cargo dolly wheels (e.g., a braking hub extension) and a tow bar actuated element that presses against the element extending from the wheels.

In general, embodiments of an exemplary hub-based chocking assembly or system may involve a friction bracket component and a wheel hub component where the friction bracket component engages with the wheel hub component to secure movement of the wheel (rather than applying friction via a conventional friction bar to rubber on the tire, which will inherently wear out). Such engagement may, for example, come from frictional pressure applied by the friction bracket that is actuated to press against the wheel hub component or, in another example, come from a physical engagement of the friction bracket with a geared part of the wheel hub component. In general, the wheel hub component (e.g., the braking hub extension) may be attached to a wheel 110 on the cargo dolly 100.

Figure 9A:
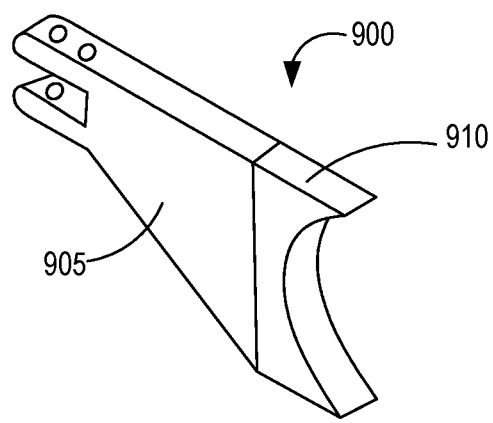
FIG. 9A is a diagram illustrating an exemplary friction bracket used as part of an exemplary hub-based chocking assembly as a type of auto-chocking system in accordance with an embodiment of the invention.

FIGS. 9A-10B provide further details regarding various embodiments of auto-chocking system 225 that may be implemented with an exemplary hub-based chocking assembly or system. In one embodiment, an exemplary braking hub extension may be implemented as an extended braking hub spindle (also referred to as a metal flywheel) that may be bolted to an existing cargo dolly wheel's hub as a replaceable component. This embodiment, as shown in FIGS. 9A and 9B, also includes an exemplary friction bracket that may be disposed on (e.g., bolted onto) linkage 220 so as to selectively engage the braking hub spindle when the tow bar 115 actuates the system, which then applies pressure to the braking hub spindle by the friction. FIG. 9A is a diagram illustrating an exemplary friction bracket 900 used as part of an exemplary hub-based chocking assembly as a type of auto-chocking system 225 in accordance with an embodiment of the invention. Exemplary friction bracket 900 is shown in FIG. 9A having a first end responsively coupled to the linkage 220 and a second end engaging a braking hub extension to hold the braking hub extension in place when the linkage 220 is actuated to the first position by the tow bar 115. As shown in FIG. 9A, exemplary friction bracket 900 may be implemented with an exemplary bracket extension 905 and replaceable friction pad 910. Exemplary bracket extension 905 may be implemented as a coupling strut that may be assembled as part of the hub-based chocking assembly as coupled to linkage 220 at a first end of the bracket extension 900. Exemplary replaceable friction pad 910 is shown attached to a second end of the bracket extension 900. When assembled with braking hub extension 915 as part of an exemplary hub-based chocking assembly, the circular portion of replaceable friction pad 910 engages the braking hub extension 915 (e.g., the contact surface on spindle 925) to hold the braking hub extension 915 in place when the linkage 220 is actuated to the first position by the tow bar 115. Exemplary replaceable friction pad 910 may, for example, be made from rubber so as to provide a suitable friction contact surface and that may be replaced when worn out.

Figure 9B:
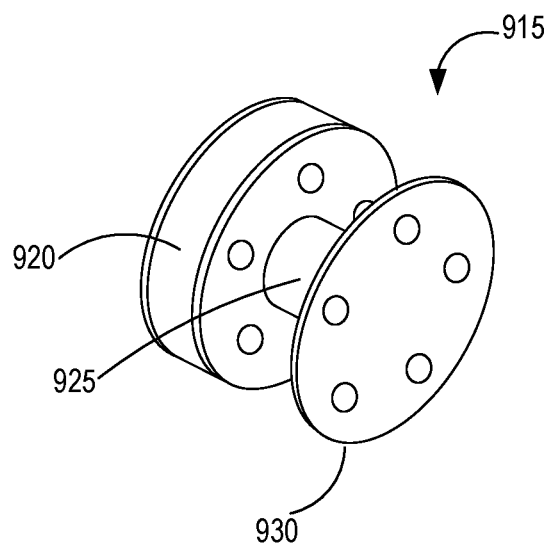
FIG. 9B is a diagram illustrating an exemplary braking hub extension with a braking hub spindle that engages with the exemplary friction bracket of FIG. 9A as part of an exemplary hub-based chocking assembly as a type of auto-chocking system in accordance with an embodiment of the invention.

FIG. 9B is a diagram illustrating exemplary braking hub extension 915 with a braking hub spindle 925 that engages with the exemplary friction bracket 900 of FIG. 9A as part of an exemplary hub-based chocking assembly as a type of auto-chocking system in accordance with an embodiment of the invention. Referring now to FIG. 9B, exemplary braking hub extension 915 removably attached (e.g., bolted) directly to at least one of the wheels 110 on dolly 100. In more detail, exemplary braking hub extension 915 is shown having a braking hub extension base 920, a braking hub spindle 925, and a braking hub outer portion 930 with a diameter larger than the diameter of the cylindrical contact surface of spindle 925. Braking hub extension base 920 may be attached to at least one of the wheels 110 with braking hub spindle 925 extending from the braking hub extension base 920. The braking hub spindle 925 has a cylindrical contact surface that engages with friction pad 910 on the second end of the friction bracket 900. Embodiments of spindle 925 may be implemented with an increased thickness so as to deploy an increased cylindrical contact surface that may enhance chocking performance.

Thus, the exemplary bracket extension 900, shown in FIG. 9A as a friction bar component, has one end that may be fixed (e.g., via bolts so that it may be easily replaced) to linkage 220 (or a chocking actuator) and another end disposed and configured to fit against the braking hub spindle 925 so as to apply frictional forces to the braking hub spindle 925 and impede/prevent movement of the braking hub spindle 925 of braking hub extension 915 and, as a result, impeding/preventing the wheels 110 on the cargo dolly 100 from moving in response to actuation by movement of the tow bar 115 (or by a control signal generated by control module 230 and provided to an electronically controlled chocking actuator operating as linkage 220 and/or tow bar 115).

Figure 10A:
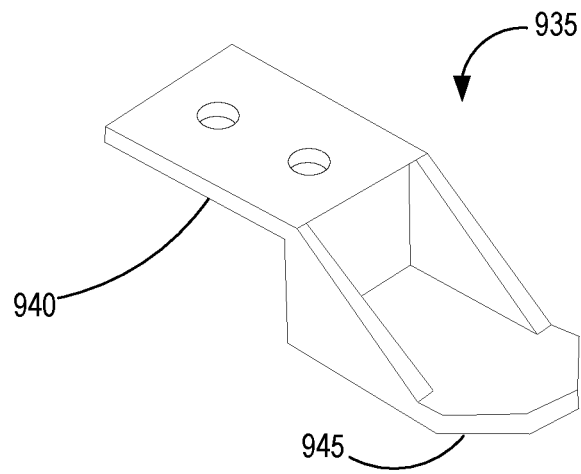
FIG. 10A is a diagram illustrating another exemplary friction bracket used as part of another exemplary hub-based chocking assembly as a type of auto-chocking system in accordance with an embodiment of the invention.
Figure 10B:
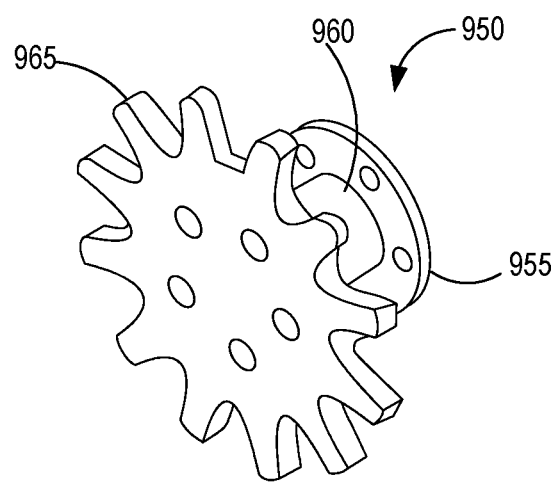
FIG. 10B is a diagram illustrating an exemplary braking hub extension with a braking hub spoked gear that engages with the exemplary friction bracket of FIG. 10A as part of an exemplary hub-based chocking assembly as a type of auto-chocking system in accordance with an embodiment of the invention.

Another embodiment of exemplary hub-based chocking assembly may use a gear lock assembly as shown in FIGS. 10A-10B to secure movement of the braking hub extension, thus securing movement of cargo dolly's wheel 110. In general, such an embodiment of an exemplary hub-based chocking system includes a bracket extension 935 to be fixed to (e.g., bolted) to linkage 220 so that when the hub-based chocking assembly is actuated via the tow bar 115, the bracket extension 935 may engage braking hub extension 950 (e.g., where the bracket extension moves to fit between spokes/teeth/geared portions on the hub extension). When actuated in this embodiment, engaging the geared portions of the hub extension secures movement of the hub extension and, by virtue of the connection of the hub extension to wheel 110, secures movement of wheel 110 to chock dolly 100 and its frame 125.

FIG. 10A is a diagram illustrating exemplary friction bracket 935 used as part of another exemplary hub-based chocking assembly as a type of auto-chocking system 225 in accordance with an embodiment of the invention. Referring now to FIG. 10A, exemplary friction bracket 935 is shown with an extension bracket 940 for coupling to linkage 220. Bolts may be used through the openings shown in the extension bracket 940 portion of friction bracket 935 to attach bracket 935 to linkage 220. Exemplary friction bracket 935 also has an engagement end 945 that engages the portion of braking hub spoked gear 965 to prevent rotation of the braking hub extension 950 and hold at least one of the wheels 110 in place when the linkage 220 is actuated (e.g. when raising the tow bar 115).

FIG. 10B is a diagram illustrating exemplary braking hub extension 950 with a braking hub spoked gear 965 that engages with the exemplary friction bracket 935 of FIG. 10A as part of an exemplary hub-based chocking assembly as a type of auto-chocking system in accordance with an embodiment of the invention. In general, exemplary braking hub extension 950 in this embodiment as illustrated in FIG. 10B includes braking hub extension base 955, braking hub spindle 960 extending from the braking hub extension base 955, and a braking hub spoked gear 965 disposed on the braking hub spindle 960. Braking hub spoked gear 965 is shown configured with spokes, teeth, or gears that extend from the end of spindle 960 and provide points of contact for friction bracket 935 when bracket 935 is actuated (e.g., via linkage 220 or a chocking actuator responsive to a control signal generated by electronic control module 230). The braking hub extension base 955 is attached (e.g., bolted) to at least one of the wheels 110. In this embodiment, the second end 945 of the friction bracket 935 may engage a portion of the braking hub spoked gear 965 disposed on the braking hub spindle 960 to hold the braking hub extension 950 in place when the linkage 220 is actuated (e.g. when raising the tow bar 115).

Those skilled in the art will appreciate that embodiments of an improved auto-chocking enabled cargo dolly (such as dolly 100) that implement auto-chocking system 225 using an exemplary hub-based chocking assembly as shown in FIGS. 9A-10B and described above may also include variations of such embodiments of an improved auto-chocking enabled cargo dolly described above relative to further feedback indicators used on the dolly; transceiver-based control modules, sensors, and actuators used on such embodiments of the auto-chocking enabled cargo dolly; dolly connection monitoring with dolly connection status messages; sensor-based activation of the auto-chocking system of the dolly (e.g., using motion sensors, weight sensors, proximity sensors); remote activation of the auto-chocking system vis a remote auto-chock message; and aspects on dolly asset tracking and management using dolly asset tracking messages from the improved auto-chocking dolly.

Additionally, those skilled in the art will further appreciate that embodiments of an improved auto-chocking enabled cargo dolly (such as dolly 100) that implement auto-chocking system 225 using an exemplary hub-based chocking assembly as shown in FIGS. 9A-10B may include variations of such embodiments of an improved auto-chocking enabled cargo dolly described above that use an electronic control module, connection sensor, and chocking actuator where a control signal generated by the electronic control module actuates the hub-based chocking assembly (e.g., an electronically stimulated chocking actuator takes the place of exemplary linkage 220 to cause movement of the exemplary friction bracket of the hub-based chocking assembly) as a type of auto-chocking system 225 instead of being triggered by the tow bar 115 and a linkage 220.

Dolly Asset Tracking & Management System Involving Automatic Chocking

Still further embodiments describe a type of asset tracking system application, such as a dolly tracking system, that manages the chocked status of a fleet of dollies via such feedback provided by electronic controller module enabled cargo dollies (e.g., an embodiment of cargo dolly 100 as shown in FIG. 2C using exemplary electronic control module 230) to a central hub manager or master type of server that may communicate with respective electronic controller modules disposed in each dolly and/or indirectly with dollies through a connected transceiver-enabled GSE towing such dollies. An embodiment of an exemplary system for chocked status management of a logistics ground support equipment fleet may have cargo tug operators notified of where chocked dollies are located. Cargo dollies may be outfitted with location circuitry (e.g., as part of cellular communication interfaces and/or GPS chipsets used in onboard electronic controller modules) that provide the location of the particular cargo dolly along with a chocked status for the particular dolly. The hub manager may then provide GSE operators with identification and status information on particular dollies (e.g., a specific reference number for the dolly and coordinates for the dolly as well as whether a dolly is part of a train), information on which dollies in the fleet are nearest and available to where needed (e.g., which side of the airport), and the like. Information provided by the hub manager may then initiate responsive action, such as obtaining free and available ones of the cargo dollies closest to where needed; removing cargo dollies from a congested area and relocating/staging available cargo dollies at other locations (e.g., moving and then auto-chocking and then having the cargo dollies report back to the hub manager with an updated status and location). For example, the hub manager may respond to a request for available dollies near a particular location with such information, which then causes the receiving requester (e.g., a transceiver-enabled GSE) to collect the available enhanced reporting dollies for use in a particular logistics operation.

Figure 6A:
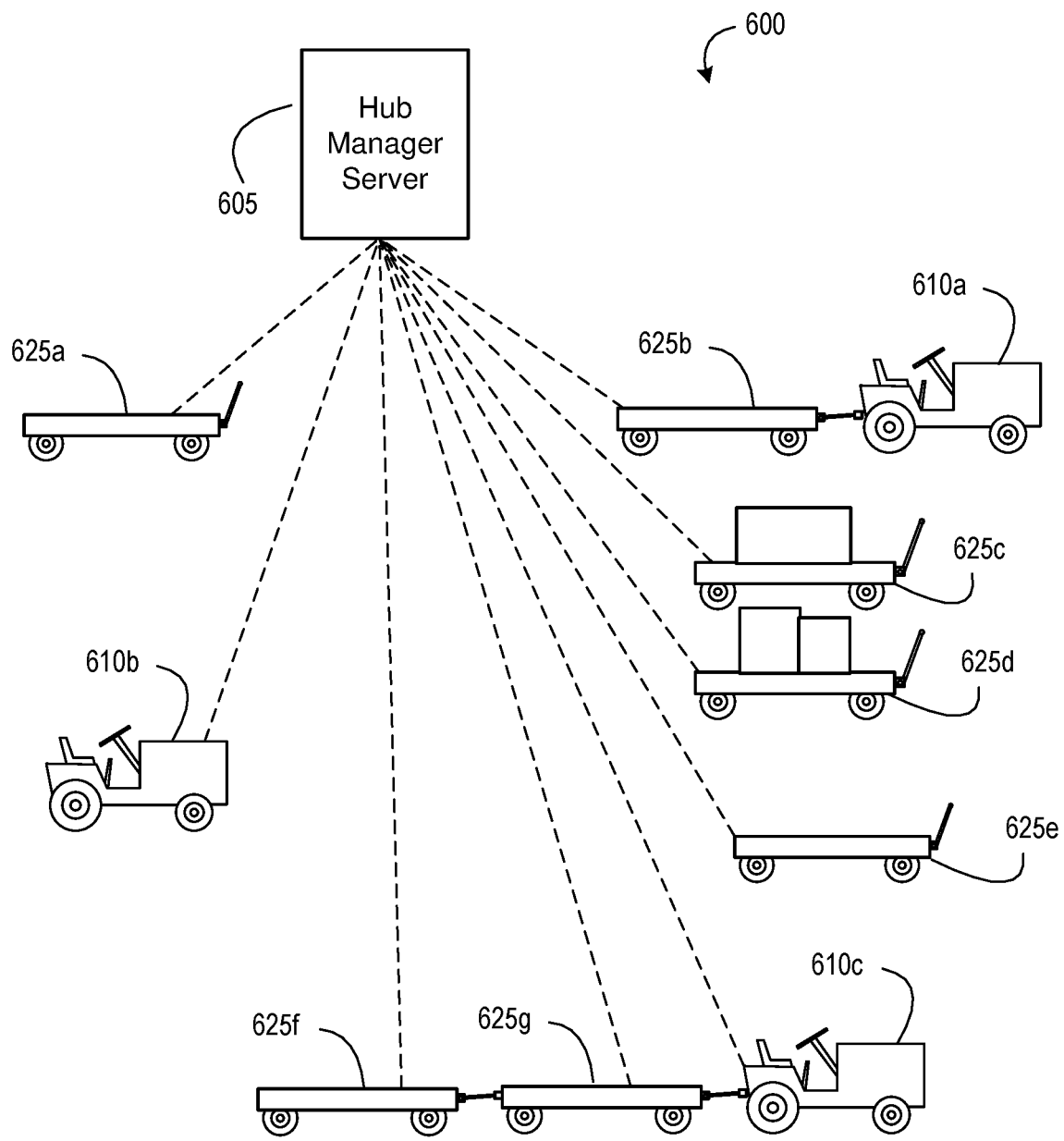
FIGS. 6A-6D are a series of diagrams illustrating an exemplary system for chocked status management of an exemplary logistics ground support equipment fleet in accordance with an embodiment of the invention.

FIGS. 6A-6D are a series of diagrams illustrating an exemplary system for chocked status management of an exemplary logistics ground support equipment fleet in accordance with an embodiment of the invention. Referring now to FIG. 6A, exemplary system 600 is shown with a hub manager server 605, various exemplary cargo tractors 610a-610c (equipped similar to exemplary tractor 105 as described above), and various exemplary improved auto-chocking enabled cargo dollies 625a-625g (equipped similar to exemplary dolly 100 as described above and as further described in this system embodiment). An exemplary operating environment for system 600 may be an airport environment where the fleet of exemplary cargo tractors 610a-610c (as logistics ground support equipment) and exemplary improved auto-chocking enabled cargo dollies 625a-625g (as further types of logistics ground support equipment) are involved in moving cargo to and from different locations in the airport environment. As shown in FIG. 6A, an embodiment may have one or more of cargo dollies 625a-625g report information, such as their chocking status, through dolly asset tracking messages sent to hub manager server 605. In an example where a particular dolly 625e reports such information, hub manager server 605 may receive the dolly asset tracking message from that dolly 625e and updates fleet management information stored on the hub manager server 605 to reflect the dolly asset tracking information on that dolly 625e. Hub manager server 605 may then transmit a message to a logistics ground support equipment cargo tractor, such as tractor 610b, to initiate a responsive fleet operation action using the updated fleet management information.

Figure 6B:
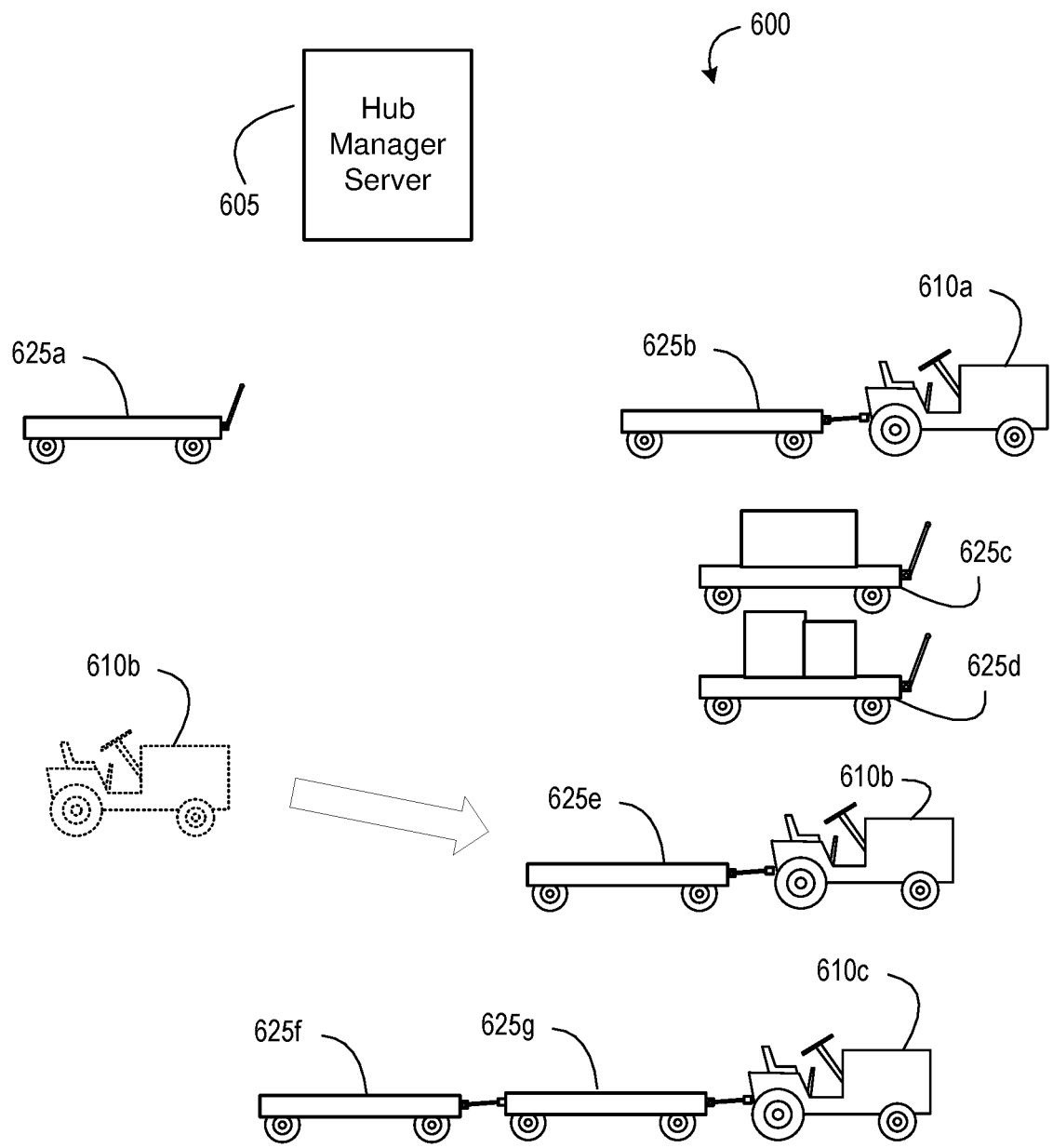
Figure 6C:
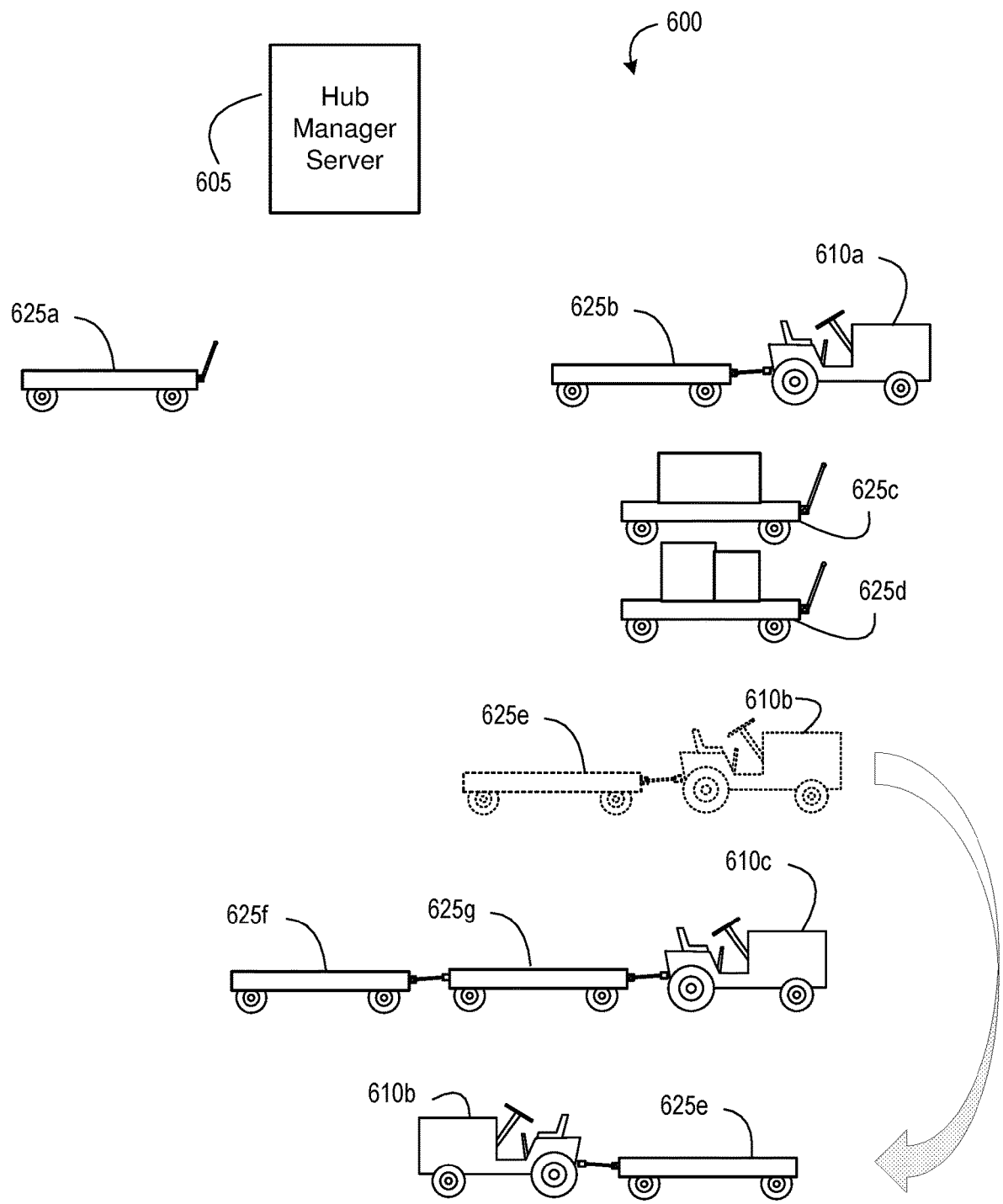
Figure 6D:
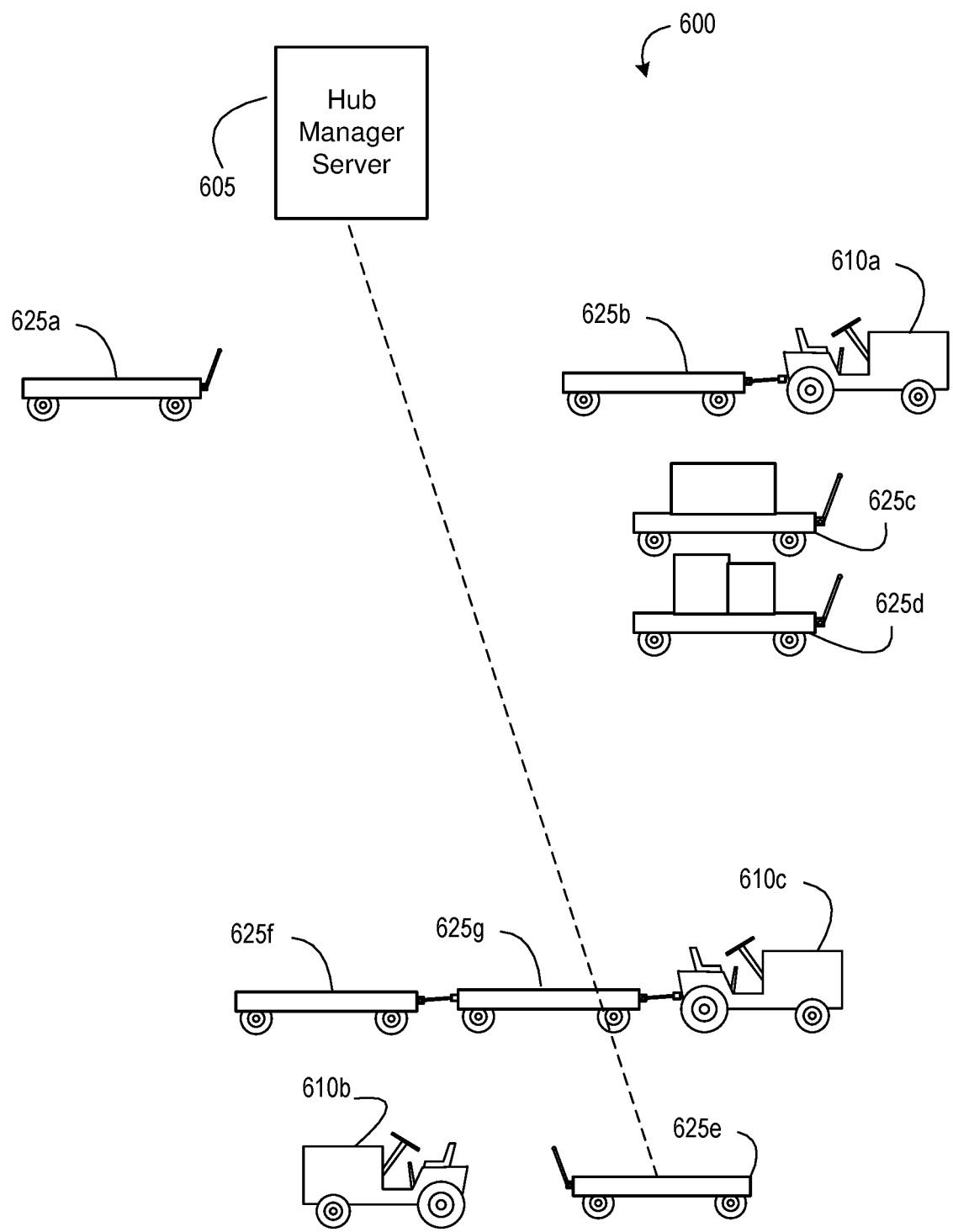

As shown in FIG. 6B, tractor 610b may receive a message from the hub manager server 605. Such a message may be to initiate a responsive fleet operation using the updated fleet management information (including the update from dolly 625e), or may be in response to a request from tractor 610b. For example, tractor 610b may have requested which dollies are available and the message from hub manager server 605 may include, in response, a current location of available dollies known by server 605 based upon the updated fleet management information, which dollies are currently chocked as known by server 605 per the updated fleet management information, and/or which dollies are which are available to be moved (e.g., close by, without cargo, chocked) based upon the updated fleet management information. In the example shown in FIG. 6B, tractor 610b may be informed by server 605 that dolly 625e is chocked and available, which then initiates a responsive fleet operation in the form of tractor 610b transiting to the reported location of dolly 635e where tractor 610b connects with dolly 625e. In the example shown in FIG. 6B, dolly 625e detects the connection to tractor 610b and, in response to detecting the connection and its unchocked status, dolly 625e updates server 605 with another dolly asset tracking message. As shown in FIG. 6C, tractor 610b and connected dolly 625e may move to a different location (e.g., an area where an available dolly is need, an area in the airport environment that is less congested than where dolly 625e was located, an area where dolly 625e is to be staged for anticipated fleet operations, such as loading/unloading of cargo). In this example, tractor 610b and dolly 625e may arrive at the new location where tractor 610b is disconnected from dolly 625e as shown in FIG. 6D. As shown in FIG. 6D, dolly 625e detects the disconnection from tractor 610b and, in response to detecting its updated connection status and its chocked status (using an auto-chocking system), dolly 625e may then update server 605 with a further dolly asset tracking message as a post-move dolly asset tracking message with the current location, chock status, and reference ID of dolly 625e.

In light of such an example as shown in FIG. 6A-6D, an exemplary system for chocked status management of a logistics ground support equipment fleet may include a hub manager server (e.g., server 605), a logistics ground support equipment cargo tractor (e.g., tractor 610b) having a transceiver-based control module with which to communicate wirelessly with the hub manager server, and multiple improved auto-chocking enabled cargo dollies (e.g., auto-chocking enabled cargo dollies 625a-625g). Consistent with the description above, each of the improved auto-chocking enabled cargo dollies has a dolly frame (e.g., frame 125), wheels attached to the frame (e.g., wheels 110), an electronic control module disposed on the dolly frame (e.g., exemplary electronic control module 230), location circuitry disposed on the dolly frame and operatively coupled to the electronic controller module (e.g., exemplary location sensor 270, such as a GPS receiver), a connection sensor disposed on the dolly frame and operatively coupled to the electronic control module (e.g., exemplary connection sensor 245), a chocking actuator disposed on the dolly frame and operatively coupled to the electronic control module (e.g., an embodiment of linkage 220 that is responsive to a control signal supplied by electronic control module 230), an auto-chocking system fixed to the dolly frame (e.g., exemplary auto-chocking system 225), and a chocking sensor (e.g., exemplary chocking sensor 275) that monitors deployment of the auto-chocking system. The electronic control module on each of the system's improved auto-chocking enabled cargo dollies includes a transceiver operative to communicate wirelessly with the hub manager server. The location circuitry on each of the system's improved auto-chocking enabled cargo dollies generates location data on a current location of the dolly frame of that respective cargo dollies and provides the location data to the dolly's electronic controller module. The connection sensor on each of the system's improved auto-chocking enabled cargo dollies provides connection sensor data to the dolly's electronic control module indicating when the dolly frame for that dolly is connected to the system's ground support equipment (e.g., tractor 610*b*). The auto-chocking system on each of the system's improved auto-chocking enabled cargo dollies is responsive to the chocking actuator to selectively deploy and prevent the dolly from moving in response to activation of the chocking actuator by the control signal. The chocking sensor on each of the system's improved auto-chocking enabled cargo dollies is coupled to the respective dolly's electronic controller module to provide chock status sensor data indicating when the dolly's auto-chocking system has selectively deployed to prevent the dolly from moving.

The electronic control module of a first of the system's improved auto-chocking enabled cargo dollies transmits a dolly asset tracking message to the hub manager server when the chock status sensor data indicates the auto-chocking system has selectively deployed to prevent the dolly's frame from moving. Such a dolly asset tracking message includes dolly asset tracking information on this first dolly, including a current location of the dolly frame of the first dolly based upon the location data, chock status information for the dolly frame of the first dolly based upon the chock status sensor data, and a reference identification for the first dolly (e.g., a reference ID associated with the dolly frame or other characteristic component of the first dolly).

The system's hub manager server is operative as part of the system to receive the dolly asset tracking message from that reporting first dolly; updates fleet management information stored on the hub manager server to reflect the dolly asset tracking information on the reporting first dolly; and transmit a message to the logistics ground support equipment cargo tractor to initiate a responsive fleet operation action using the updated fleet management information. In more detail, such a message to the logistics ground support equipment cargo tractor may, for example, include updated status information on the improved auto-chocking enabled cargo dollies including the first dolly (e.g., a current location of each of the improved auto-chocking enabled cargo dollies; information on which of the improved auto-chocking enabled cargo dollies are located within a predetermined distance relative to the logistics ground support equipment cargo tractor; information on which of the improved auto-chocking enabled cargo dollies are currently chocked; information on which of the improved auto-chocking enabled cargo dollies are available to be moved; information on which of the improved auto-chocking enabled cargo dollies are available to be moved to respond to a request sent by the logistics ground support equipment cargo tractor to the hub manager server; and/or which of the improved auto-chocking enabled cargo dollies are available to be staged for use at an alternative staging location). In a further embodiment, such an alternative staging location may be a less congested operating area for the logistics ground support equipment fleet compared to a more congested operating area for the logistics ground support equipment fleet (e.g., a part of the airport operating environment for the fleet that is less congested than other parts of the airport operating environment for the fleet).

In another embodiment, where at least one of the improved auto-chocking enabled cargo dollies available to be moved according to the updated status information may be operative, after being moved by the logistics ground support equipment cargo tractor, to re-engage its auto-chocking system on that moved improved auto-chocking enabled cargo dolly, and responsively transmit a post-move dolly asset tracking message to the hub manager server after re-engaging the auto-chocking system. In this example, the post-move dolly asset tracking message may include updated dolly asset tracking information on that moved dolly including a current location of the dolly frame of the moved dolly (e.g., dolly 625*e* after being moved as shown in FIG. 6D) based upon the location data, chock status information for the dolly frame of the moved dolly based upon the chock status sensor data, and reference identification for the dolly frame of the moved dolly.

In more detailed system embodiments, the particular auto-chocking system used on the improved auto-chocking enabled cargo dollies in the fleet may be implemented as a wheel engagement chocking assembly, a friction brake chocking assembly for a dolly axle, a skid brake chocking assembly, or hub-based chocking assembly. For example, the auto-chocking system implemented may be a wheel engagement system responsive to the dolly's chocking actuator, where the wheel engagement chocking assembly applies pressure directly to at least one of the wheels to hold the wheel(s) in place and prevent the dolly frame from moving when the chocking actuator is actuated by the control input from the electronic control module. In another example, the auto-chocking system implemented may be a friction brake chocking assembly fixed to the dolly frame and disposed to selectively engage the axle with brake pads, where the friction brake chocking assembly is responsive to the chocking actuator and applies pressure directly to at least one of the brake pads to cause the brake pads to collectively hold the axle in place when the chocking actuator is actuated by the control input from the electronic control module. In still another example, the auto-chocking system may be implemented with a skid brake chocking assembly fixed to the dolly frame and disposed to selectively and directly engage the ground below the dolly frame to hold the dolly frame in place, where the skid brake chocking assembly (e.g., having one or more skid brakes movably fixed to the bottom of the dolly frame via a skid brake base and skid brake linkages) is responsive to the chocking actuator to directly engage the ground below the dolly frame to hold the dolly frame in place when the chocking actuator is actuated by the control input from the electronic control module. In yet another example, the auto-chocking system may be implemented with a hub-based chocking assembly having a braking hub extension removably attached to at least one of the wheels and a friction bracket with a first end responsively coupled to the chocking actuator and a second end engaging the braking hub extension to hold the braking hub extension in place when the chocking actuator is actuated by the control input from the electronic control module.

What follows is a further collective description of different embodiments consistent with and exemplified by the above description.

Further Embodiment (Set B)—Auto-Chocking Using an Axle-Based Chocking Assembly

1. An improved auto-chocking enabled cargo dolly that is towable by ground support equipment, the cargo dolly comprising:

a dolly frame;

a set of wheels attached to the dolly frame, wherein the set of wheels supports the dolly frame and rotates to allow movement of the dolly frame;

an axle attached to at least one of the wheels and disposed on the dolly frame to allow movement of the axle relative to the dolly frame;

a tow bar flexibly attached to the dolly frame, the tow bar having a first attached end movably attached to the dolly frame and a second distal end having a ground support equipment connector disposed on the second distal end, the tow bar having a raised position where the second distal end is raised and not connected to the ground support equipment and a lowered position where the second distal end is lowered in a configuration to be attachable to the ground support equipment;

a linkage in communication with the tow bar, wherein the linkage actuates from a first position when the tow bar is in the raised position to a second position when the tow bar is in the lowered position;

a friction brake chocking assembly fixed to the dolly frame and disposed to selectively engage the axle with a plurality of brake pads, the friction brake chocking assembly being responsive to a position of the linkage, wherein the friction brake chocking assembly applies pressure directly to at least one of the brake pads to cause the brake pads to collectively hold the axle in place when the linkage is actuated to the first position by the tow bar.

2. The improved auto-chocking enabled cargo dolly of embodiment 1, where the axle comprises a support axle extending between the at least one of the wheels and a second wheel from the set of wheels.

3. The improved auto-chocking enabled cargo dolly of embodiment 1, where the axle comprises hub connection extension axle attached to the at least one of the wheels.

4. The improved auto-chocking enabled cargo dolly of embodiment 3, wherein the dolly frame comprises at least a first wheel base on a first side of the dolly frame and a second wheel base on a second side of the dolly frame, the first wheel base having a first support axle and the second wheel base having a second support axle; and wherein the hub connection extension axle is mounted to at least the first support axle.

5. The improved auto-chocking enabled cargo dolly of embodiment 4, wherein the hub connection extension axle is disposed between a first wheel mounted to the first support axle and a second wheel mounted to the second support connected to the second wheel base.

6. The improved auto-chocking enabled cargo dolly of embodiment 1, wherein the linkage comprises a mechanical switch responsive to actuate the friction brake chocking assembly based upon whether the tow bar is in the raised position and whether the tow bar is in the lowered position.

7. The improved auto-chocking enabled cargo dolly of embodiment 6, wherein the mechanical switch comprises a strut movably fixed to the tow bar and a cable in communication with the strut, wherein the cable is further in responsive communication with the friction brake chocking assembly;

wherein movement of the tow bar from the lowered position to the raised position articulates the strut to cause the cable to move and actuate the friction brake chocking assembly.

8. The improved auto-chocking enabled cargo dolly of embodiment 1, wherein the linkage comprises a hydraulic line responsive to actuate the friction brake chocking assembly based upon whether the tow bar is in the raised position and whether the tow bar is in the lowered position.

9. The improved auto-chocking enabled cargo dolly of embodiment 1, wherein the friction brake chocking assembly comprises:

a first of the brake pads fixed to the dolly frame, the first of the brake pads having a first semi-circular contact surface for applying against the axle;

a second of the brake pads having a second semi-circular contact surface for applying against the axle while opposing the first of the brake pads;

a friction brake actuator base plate movably attached to the dolly frame and supporting the second of the brake pads as positioned to apply the second semi-circular contact surface against the axle, the friction brake actuator base plate being responsive to the position of the linkage to apply responsive pressure directly to the second of the brake pads causing the first of the brake pads and the second of the brake pads to collectively hold the axle in place when the linkage is actuated to the first position by the tow bar.

10. The improved auto-chocking enabled cargo dolly of embodiment 9, wherein the friction brake chocking assembly further comprises a tension spring having a first end attached to the dolly frame and a second end attached to the friction brake actuator base plate, the tension spring providing a biasing force to the friction brake actuator base plate that facilitates applying the responsive pressure to the second of the brake pads in response to actuation of the linkage to the first position.

11. The improved auto-chocking enabled cargo dolly of embodiment 1 further comprising an actuated feedback indicator mounted on the dolly frame, the actuated feedback indictor being responsively triggered when the when the linkage is actuated to the first position by the tow bar.

12. The improved auto-chocking enabled cargo dolly of embodiment 1, wherein the actuated feedback indicator comprises a flag movably disposed on the dolly frame and responsive to the linkage, wherein the flag actuates from a stowed position to a deployed position when the tow bar is moved from the lowered position to the raised position, the deployed position of the flag indicating the friction brake chocking assembly is holding the axle in place.

13. The improved auto-chocking enabled cargo dolly of embodiment 1, wherein the actuated feedback indicator comprises a status light fixed to the dolly frame and responsive to movement of the linkage, wherein the status light activates when the tow bar is moved from the lowered position to the raised position, activation of the status light indicating the friction brake chocking assembly is holding the axle in place.

14. The improved auto-chocking enabled cargo dolly of embodiment 13, wherein status light comprises an alarm light that rotates when activated, the rotating alarm light indicating a chocked state of the dolly frame.

15. The improved auto-chocking enabled cargo dolly of embodiment 13, wherein status light comprises a display panel disposed on the dolly frame that automatically displays a chocking status notification when activated, the chocking status notification indicating a chocked state of the dolly frame.

16. The improved auto-chocking enabled cargo dolly of embodiment 1, wherein the actuated feedback indicator comprises a speaker fixed to the dolly frame and responsive to movement of the linkage, wherein the speaker activates with an audible chocking status notification when the tow bar is moved from the lowered position to the raised position, the audible chocking status notification indicating the friction brake chocking assembly is holding the axle in place.

17. The improved auto-chocking enabled cargo dolly of embodiment 1 further comprising a transceiver disposed on the dolly frame and a position sensor disposed on the dolly frame to detect when the tow bar is moved from the lowered position to the raised position, the position sensor being operatively coupled to the transceiver to provide position sensor data indicating when the tow bar is moved from the lowered position to the raised position; and
    wherein the transceiver being operative to receive the position sensor data from the position sensor when the tow bar is moved from the lowered position to the raised position and responsively transmit a chocking status message to an external transceiver associated with the ground support equipment.

18. The improved auto-chocking enabled cargo dolly of embodiment 17, wherein the transceiver being operative to responsively transmit the chocking status message to the external transceiver disposed on the ground support equipment.

19. The improved auto-chocking enabled cargo dolly of embodiment 17, wherein the transceiver being operative to responsively transmit the chocking status message to a mobile wireless user access device associated with an operator of the ground support equipment as the external transceiver.

20. The improved auto-chocking enabled cargo dolly of embodiment 17 further comprising a tow bar connection pin sensor disposed on the tow bar and operatively coupled to the transceiver to provide connection pin sensor data indicating when the tow bar is connected to the ground support equipment; and
    wherein the transceiver being further operative to receive the connection pin sensor data from the tow bar connection pin sensor when the tow bar is connected to the ground support equipment and responsively transmit a connection status message to the external transceiver associated with the ground support equipment, the connection status message including connection related information indicating a connection status between the tow bar and the ground support equipment.

21. The improved auto-chocking enabled cargo dolly of embodiment 20, wherein the transceiver being operative to responsively transmit the connection status message to the external transceiver associated with the ground support equipment to initiate an interrupt of operations on the ground support equipment based upon the connection status message and the chocking status message.

22. The improved auto-chocking enabled cargo dolly of embodiment 1 further comprising a transceiver disposed on the dolly frame and a motion sensor disposed on the dolly frame to detect when the dolly frame is not moving, the motion sensor being operatively coupled to the transceiver to provide motion sensor data indicating when the dolly frame is not moving; and
    wherein the transceiver being further operative to receive the motion sensor data from the motion sensor when the dolly frame is not moving and responsively cause the friction brake chocking assembly to selectively engage the axle to hold the axle in place when the motion sensor data indicates the dolly frame is not moving.

23. The improved auto-chocking enabled cargo dolly of embodiment 1 further comprising a transceiver disposed on the dolly frame and a cargo weight sensor disposed on the dolly frame to detect a weight level of cargo supported on the dolly frame, the weight sensor being operatively coupled to the transceiver to provide weight sensor data indicating the weight level of the cargo supported on the dolly frame; and
    wherein the transceiver being further operative to
        receive the weight sensor data from the weight sensor over a period of time,
        determine when a change in weight of the cargo supported on the dolly frame exceeds a threshold cargo weight change based upon the weight sensor data over the period of time, and
        responsively cause the friction brake chocking system to selectively engage axle to hold the axle in place when the change in weight of the cargo supported on the dolly frame exceeds the threshold cargo weight change.

24. The improved auto-chocking enabled cargo dolly of embodiment 1 further comprising a transceiver disposed on the dolly frame and a proximity sensor disposed on one side of the dolly frame to detect a distance between the one side of the dolly frame and a cargo loader external to the dolly frame, the proximity sensor being operatively coupled to the transceiver to provide proximity sensor data indicating the distance between the one side of the dolly frame and the cargo loader; and
    wherein the transceiver being further operative to
        receive the proximity sensor data from the proximity sensor over a period of time,
        determine when a distance between the one side of the dolly frame and the cargo loader is below a threshold cargo loader distance based upon the proximity sensor data over the period of time, and
        responsively cause the friction brake chocking system to selectively engage the axle to hold the axle in place when the distance between the one side of the dolly frame and the cargo loader is below the threshold cargo loader distance.

25. The improved auto-chocking enabled cargo dolly of embodiment 24, wherein the threshold cargo loader distance represents a predetermined alignment distance for transfer of cargo between the dolly frame and the cargo loader.

26. The improved auto-chocking enabled cargo dolly of embodiment 1 further comprising a transceiver disposed on the dolly frame and a plurality of proximity sensors disposed on one side of the dolly frame, wherein each of the proximity sensors being operative to detect a relative distance between the one side of the dolly frame where the each of the proximity sensors is disposed and a cargo loader external to the dolly frame, wherein the proximity sensors being operatively coupled to the transceiver to provide proximity sensor data indicating the relative distances between the one side of the dolly frame and the cargo loader as detected by each of the proximity sensors; and
    wherein the transceiver being further operative to
        receive the proximity sensor data from each of the proximity sensors over a period of time,
        determine when the relative distances between the one side of the dolly frame and the cargo loader meets a threshold alignment configuration for the dolly frame and the cargo loader based upon the proximity sensor data over the period of time, and
        responsively cause the friction brake chocking system to selectively engage the axle to hold the axle in place when the relative distances between the one side of the dolly frame and the cargo loader meets the threshold alignment configuration for the dolly frame and the cargo loader.

27. The improved auto-chocking enabled cargo dolly of embodiment 1 further comprising a transceiver disposed on the dolly frame, the transceiver being operatively coupled to the linkage and operative to, in response to receiving a remote auto-chock message from an external transceiver, electronically actuate the linkage and responsively cause the friction brake chocking system to selectively engage the axle to hold the axle in place.

28. The improved auto-chocking enabled cargo dolly of embodiment 27, wherein the transceiver being operative to electronically actuate the linkage in response to receiving the remote auto-chock message from the external transceiver disposed on the ground support equipment.

29. The improved auto-chocking enabled cargo dolly of embodiment 27, wherein the transceiver being operative to electronically actuate the linkage in response to receiving the remote auto-chock message from a mobile wireless user access device associated with an operator of the ground support equipment as the external transceiver.

30. The improved auto-chocking enabled cargo dolly of embodiment 1 further comprising:
   a transceiver-based controller module disposed on the dolly frame;
   location circuitry disposed on the dolly frame and operatively coupled to the transceiver-based controller module, the location circuitry generating location data on a current location of the dolly frame and providing the location data to the transceiver-based controller module;
   wherein the friction brake chocking system for the axle further comprises a chocking sensor that monitors engagement of the friction brake chocking system relative to the axle, the chocking sensor being coupled to the transceiver-based controller module to provide chock status sensor data indicating when the friction brake chocking system has selectively engaged the axle to hold the axle in place; and
   wherein the transceiver-based controller module being further operative to transmit a dolly asset tracking message to a hub manager server when the chock status sensor data indicates the friction brake chocking system has engaged the axle to hold the axle in place, wherein the dolly asset tracking message including the current location of the dolly frame based upon the location data, chock status information for the dolly frame based upon the chock status sensor data, and a reference identification for the dolly frame.

31. The improved auto-chocking enabled cargo dolly of embodiment 1 further comprising:
   a transceiver-based controller module disposed on the dolly frame;
   location circuitry disposed on the dolly frame and operatively coupled to the transceiver-based controller module, the location circuitry generating location data on a current location of the dolly frame and providing the location data to the transceiver-based controller module;
   wherein the friction brake chocking system for the axle further comprises a chocking sensor that monitors engagement of the friction brake chocking system relative to the axle, the chocking sensor being coupled to the transceiver-based controller module to provide chock status sensor data indicating when the friction brake chocking system has selectively engaged the axle to hold the in place; and
   wherein the transceiver-based controller module being further operative to transmit a dolly asset tracking message to an external transceiver disposed on the ground support equipment when the chock status sensor data indicates the friction brake chocking system has engaged the axle to hold the axle in place, the dolly asset tracking message including dolly asset tracking information related to the dolly frame for forwarding to a hub manager server, wherein the dolly asset tracking information to be forwarded to the hub manager server including the current location of the dolly frame based upon the location data, chock status information for the dolly frame based upon the chock status sensor data, and a reference identification for the dolly frame.

32. An improved auto-chocking enabled cargo dolly that is towable by ground support equipment, the cargo dolly comprising:
   a dolly frame;
   a set of wheels attached to the dolly frame, wherein the set of wheels supports the dolly frame and rotates to allow movement of the dolly frame;
   an axle attached to at least one of the wheels and disposed on the dolly frame to allow movement of the axle relative to the dolly frame;
   an electronic control module disposed on the dolly frame;
   a connection sensor disposed on the dolly frame and operatively coupled to the electronic control module, the connection sensor providing connection sensor data to the electronic control module indicating when the dolly frame is connected to the ground support equipment;
   a chocking actuator disposed on the dolly frame and operatively coupled to the electronic control module, the chocking actuator being responsive to a control input generated by the electronic control module based on the connection sensor data; and
   a friction brake chocking system fixed to the dolly frame and disposed to selectively engage the axle with a plurality of brake pads, the friction brake chocking system being responsive to the chocking actuator, wherein the friction brake chocking system applies pressure directly to the axle to hold the axle in place when the chocking actuator is actuated by the control signal.

33. The improved auto-chocking enabled cargo dolly of embodiment 32, where the axle comprises a support axle extending between the at least one of the wheels and a second wheel from the set of wheels.

34. The improved auto-chocking enabled cargo dolly of embodiment 32, where the axle comprises hub connection extension axle attached to the at least one of the wheels.

35. The improved auto-chocking enabled cargo dolly of embodiment 34, wherein the dolly frame comprises at least a first wheel base on a first side of the dolly frame and a second wheel base on a second side of the dolly frame, the first wheel base having a first support axle and the second wheel base having a second support axle; and
   wherein the hub connection extension axle is mounted to at least the first support axle.

36. The improved auto-chocking enabled cargo dolly of embodiment 35, wherein the hub connection extension axle is disposed between a first wheel mounted to the first support axle and a second wheel mounted to the second support connected to the second wheel base.

37. The improved auto-chocking enabled cargo dolly of embodiment 32, wherein the friction brake chocking assembly comprises:

a first of the brake pads fixed to the dolly frame, the first of the brake pads having a first semi-circular contact surface for applying against the axle;

a second of the brake pads having a second semi-circular contact surface for applying against the axle while opposing the first of the brake pads;

a friction brake actuator base plate movably attached to the dolly frame and supporting the second of the brake pads as positioned to apply the second semi-circular contact surface against the axle, the friction brake actuator base plate being responsive to the chocking actuator to apply responsive pressure directly to the second of the brake pads causing the first of the brake pads and the second of the brake pads to collectively hold the axle in place when the chocking actuator is actuated by the control signal.

38. The improved auto-chocking enabled cargo dolly of embodiment 37, wherein the friction brake chocking assembly further comprises a tension spring having a first end attached to the dolly frame and a second end attached to the friction brake actuator base plate, the tension spring providing a biasing force to the friction brake actuator base plate that facilitates applying the responsive pressure to the second of the brake pads in response to actuation of the chocking actuator by the control signal.

39. The improved auto-chocking enabled cargo dolly of embodiment 32 further comprising an actuated feedback indicator mounted on the dolly frame and operatively coupled to the electronic control module, the actuated feedback indictor being responsively triggered by the electronic control module based upon the control signal that actuates the chocking actuator.

40. The improved auto-chocking enabled cargo dolly of embodiment 32, wherein the actuated feedback indicator comprises an actuated flag movably disposed on the dolly frame and operatively coupled to the electronic control module, the actuated flag actuates from a stowed position to a deployed position based upon the control signal that actuates the chocking actuator, the deployed position of the actuated flag indicating the friction brake chocking system is holding the axle in place.

41. The improved auto-chocking enabled cargo dolly of embodiment 32, wherein the actuated feedback indicator comprises a status light fixed to the dolly frame and operatively coupled to the electronic control module, wherein the status light activates based upon the control signal that actuates the chocking actuator, activation of the status light indicating the friction brake chocking system is holding the axle in place.

42. The improved auto-chocking enabled cargo dolly of embodiment 41, wherein status light comprises an alarm light that rotates when activated, the rotating alarm light indicating a chocked state of the dolly frame.

43. The improved auto-chocking enabled cargo dolly of embodiment 41, wherein status light comprises a display panel disposed on the dolly frame that automatically displays a chocking status notification when activated, the chocking status notification indicating a chocked state of the dolly frame.

44. The improved auto-chocking enabled cargo dolly of embodiment 32, wherein the actuated feedback indicator comprises a speaker fixed to the dolly frame and operatively coupled to the electronic control module, wherein the speaker activates with an audible chocking status notification based upon the control signal that actuates the chocking actuator, the audible chocking status notification indicating the friction brake chocking system is holding the axle in place.

45. The improved auto-chocking enabled cargo dolly of embodiment 32, wherein the electronic control module including a transceiver that is operative to responsively transmit a chocking status message to an external transceiver associated with the ground support equipment based upon the control signal that actuates the chocking actuator.

46. The improved auto-chocking enabled cargo dolly of embodiment 45, wherein the transceiver being operative to responsively transmit the chocking status message to the external transceiver disposed on the ground support equipment.

47. The improved auto-chocking enabled cargo dolly of embodiment 45, wherein the transceiver being operative to responsively transmit the chocking status message to a mobile wireless user access device associated with an operator of the ground support equipment as the external transceiver.

48. The improved auto-chocking enabled cargo dolly of embodiment 32, wherein the electronic control module including a transceiver that is operative to responsively transmit a connection status message to an external transceiver associated with the ground support equipment, the connection status message indicating a connection status between the dolly frame and the ground support equipment based upon the connection sensor data.

49. The improved auto-chocking enabled cargo dolly of embodiment 32, further comprising a motion sensor disposed on the dolly frame to detect when the dolly frame is not moving, the motion sensor being operatively coupled to the electronic control module to provide motion sensor data indicating when the dolly frame is not moving; and wherein the electronic control module is operative to receive the motion sensor data from the motion sensor when the dolly frame is not moving and generate the control signal to trigger the chocking actuator to responsively cause the friction brake chocking system to engage the axle to hold the axle in place when the motion sensor data indicates the dolly frame is not moving.

50. The improved auto-chocking enabled cargo dolly of embodiment 32 further comprising a cargo weight sensor disposed on the dolly frame to detect a weight level of cargo supported on the dolly frame, the weight sensor being operatively coupled to the electronic control module to provide weight sensor data indicating the weight level of the cargo supported on the dolly frame; and wherein the electronic control module being further operative to
receive the weight sensor data from the weight sensor over a period of time,
determine when a change in weight of the cargo supported on the dolly frame exceeds a threshold cargo weight change based upon the weight sensor data over the period of time, and
responsively trigger the chocking actuator to cause the friction brake chocking system to engage the axle and hold the axle in place when the change in weight of the cargo supported on the dolly frame exceeds the threshold cargo weight change.

51. The improved auto-chocking enabled cargo dolly of embodiment 32 further comprising a proximity sensor disposed on one side of the dolly frame to detect a distance between the one side of the dolly frame and a cargo loader external to the dolly frame, the proximity sensor being operatively coupled to the electronic control module to provide proximity sensor data indicating the distance between the one side of the dolly frame and the cargo loader; and wherein the electronic control module being further operative to
        receive the proximity sensor data from the proximity sensor over a period of time,
        determine when a distance between the one side of the dolly frame and the cargo loader is below a threshold cargo loader distance based upon the proximity sensor data over the period of time, and
        responsively trigger the chocking actuator to cause the friction brake chocking system to engage the axle and hold the axle in place when the distance between the one side of the dolly frame and the cargo loader is below the threshold cargo loader distance.

52. The improved auto-chocking enabled cargo dolly of embodiment 51, wherein the threshold cargo loader distance represents a predetermined alignment distance for transfer of cargo between the dolly frame and the cargo loader.

53. The improved auto-chocking enabled cargo dolly of embodiment 32 further comprising a plurality of proximity sensors disposed on one side of the dolly frame, wherein each of the proximity sensors being operative to detect a relative distance between the one side of the dolly frame where the each of the proximity sensors is disposed and a cargo loader external to the dolly frame, wherein the proximity sensors being operatively coupled to the electronic control module to provide proximity sensor data indicating the relative distances between the one side of the dolly frame and the cargo loader as detected by each of the proximity sensors; and wherein the electronic control module being further operative to
        receive the proximity sensor data from each of the proximity sensors over a period of time,
        determine when the relative distances between the one side of the dolly frame and the cargo loader meets a threshold alignment configuration for the dolly frame and the cargo loader based upon the proximity sensor data over the period of time, and
        responsively trigger the chocking actuator to cause the friction brake chocking system to selectively engage the axle to hold the axle in place when the relative distances between the one side of the dolly frame and the cargo loader meets the threshold alignment configuration for the dolly frame and the cargo loader.

54. The improved auto-chocking enabled cargo dolly of embodiment 32, wherein the electronic control module being operative to, in response to receiving a remote auto-chock message from an external transceiver, electronically actuate the chocking actuator and responsively cause the friction brake chocking system to selectively engage the axle to hold the axle in place.

55. The improved auto-chocking enabled cargo dolly of embodiment 54, wherein the transceiver being operative to electronically actuate the chocking actuator in response to receiving the remote auto-chock message from the external transceiver disposed on the ground support equipment.

56. The improved auto-chocking enabled cargo dolly of embodiment 54, wherein the transceiver being operative to electronically actuate the chocking actuator in response to receiving the remote auto-chock message from a mobile wireless user access device associated with an operator of the ground support equipment as the external transceiver.

57. The improved auto-chocking enabled cargo dolly of embodiment 32, wherein the electronic control module comprises a wireless transceiver;
    further comprising location circuitry disposed on the dolly frame and operatively coupled to the electronic controller module, the location circuitry generating location data on a current location of the dolly frame and providing the location data to the electronic controller module;
    wherein the friction brake chocking system further comprises a chocking sensor that monitors engagement of the friction brake chocking system relative to the axle, the chocking sensor being coupled to the electronic controller module to provide chock status sensor data indicating when the friction brake chocking system has selectively engaged the axle to hold the axle in place; and
    wherein the electronic controller module being further operative to transmit a dolly asset tracking message to a hub manager server when the chock status sensor data indicates the friction brake chocking system has engaged the axle to hold the axle in place, wherein the dolly asset tracking message including the current location of the dolly frame based upon the location data, chock status information for the dolly frame based upon the chock status sensor data, and a reference identification for the dolly frame.

58. The improved auto-chocking enabled cargo dolly of embodiment 32, wherein the electronic control module comprises a wireless transceiver;
    further comprising location circuitry disposed on the dolly frame and operatively coupled to the electronic controller module, the location circuitry generating location data on a current location of the dolly frame and providing the location data to the electronic controller module;
    wherein the friction brake chocking system further comprises a chocking sensor that monitors engagement of the friction brake chocking system relative to the axle, the chocking sensor being coupled to the electronic controller module to provide chock status sensor data indicating when the friction brake chocking system has selectively engaged the axle to hold the axle in place; and
    wherein the electronic controller module being further operative to transmit a dolly asset tracking message to an external transceiver disposed on the ground support equipment when the chock status sensor data indicates the friction brake chocking system has engaged the axle to hold the axle in place, the dolly asset tracking message including dolly asset tracking information related to the dolly frame for forwarding to a hub manager server, wherein the dolly asset tracking information to be forwarded to the hub manager server including the current location of the dolly frame based upon the location data, chock status information for the dolly frame based upon the chock status sensor data, and a reference identification for the dolly frame.

Further Embodiment (Set C)—Auto-Chocking with an Actuated Skid Brake Chocking Assembly 1. An improved auto-chocking enabled cargo dolly that is towable by ground support equipment, the cargo dolly comprising:
    a dolly frame;

a set of wheels attached to the dolly frame, wherein the set of wheels supports the dolly frame and rotates to allow movement of the dolly frame;

a tow bar flexibly attached to the dolly frame, the tow bar having a first attached end movably attached to the dolly frame and a second distal end having a ground support equipment connector disposed on the second distal end, the tow bar having a raised position where the second distal end is raised and not connected to the ground support equipment and a lowered position where the second distal end is lowered in a configuration to be attachable to the ground support equipment;

a linkage in communication with the tow bar, wherein the linkage actuates from a first position when the tow bar is in the raised position to a second position when the tow bar is in the lowered position;

a skid brake chocking assembly fixed to the dolly frame and disposed to selectively and directly engage the ground below the dolly frame to hold the dolly frame in place, the skid brake chocking assembly being responsive to a position of the linkage, wherein the skid brake chocking assembly directly engages the ground below the dolly frame to hold the dolly frame in place when the linkage is actuated to the first position by the tow bar.

2. The improved auto-chocking enabled cargo dolly of embodiment 1, wherein the linkage comprises a mechanical switch responsive to actuate the skid brake chocking assembly and cause the skid brake chocking assembly to directly engage the ground below the dolly frame based upon whether the tow bar is in the raised position and whether the tow bar is in the lowered position.

3. The improved auto-chocking enabled cargo dolly of embodiment 2, wherein the mechanical switch comprises a strut movably fixed to the tow bar and a cable in communication with the strut, wherein the cable is further in responsive communication with the skid brake chocking assembly;

wherein movement of the tow bar from the lowered position to the raised position articulates the strut to cause the cable to move and actuate the skid brake chocking assembly.

4. The improved auto-chocking enabled cargo dolly of embodiment 1, wherein the linkage comprises a hydraulic line responsive to actuate the skid brake chocking assembly based upon whether the tow bar is in the raised position and whether the tow bar is in the lowered position.

5. The improved auto-chocking enabled cargo dolly of embodiment 1, wherein the linkage comprises a hydraulic control piston attached to the dolly frame and in communication with the tow bar, the hydraulic control piston providing a hydraulic control output responsive to actuate the skid brake chocking assembly based upon whether the tow bar is in the raised position and whether the tow bar is in the lowered position.

6. The improved auto-chocking enabled cargo dolly of embodiment 5, wherein the hydraulic control piston actuates from a first position when the tow bar is in the raised position to a second position when the tow bar is in the lowered position;

wherein the skid brake chocking assembly is actuated by the hydraulic control piston to directly engage the ground below the dolly frame to hold the dolly frame in place when the hydraulic control piston is in the first position; and wherein the skid brake chocking assembly is actuated by the hydraulic control piston to retract from engaging the ground below the dolly frame when the hydraulic control piston is in the second position.

7. The improved auto-chocking enabled cargo dolly of embodiment 1, wherein the skid brake chocking assembly comprises:

a skid brake base fixed to a bottom of the dolly frame as an anchor point for the skid brake chocking assembly;

a set of skid brake linkages movably attached to the skid brake base;

a skid brake movably attached to each of the skid brake linkages; and a skid brake actuator with a first end attached to the skid brake base and a second end attached to the skid brake, wherein a position of the second end of the skid brake actuator being responsive to the position of the linkage, wherein the skid brake is moved by the skid brake actuator relative to the skid brake base so that the skid brake extends relative to the bottom of the dolly frame to engage the ground below the dolly frame when the linkage is actuated to the first position by the tow bar.

8. The improved auto-chocking enabled cargo dolly of embodiment 1, wherein the linkage comprises a hydraulic control piston attached to the dolly frame and in communication with the tow bar, the hydraulic control piston providing a hydraulic control output responsive movement of the tow bar;

wherein the skid brake chocking assembly comprises:

a skid brake base fixed to a bottom of the dolly frame as an anchor point for the skid brake chocking assembly;

a set of skid brake linkages movably attached to the skid brake base;

a skid brake movably attached to each of the skid brake linkages; and a hydraulic skid brake actuator with a first end attached to the skid brake base and a second end attached to the skid brake, wherein movement of the second end of the hydraulic skid brake actuator relative to the skid brake base is responsive to the hydraulic control output, wherein the skid brake being moved by the hydraulic skid brake actuator relative to the skid brake base to extend the skid brake relative to the bottom of the dolly frame to engage the ground below the dolly frame when the hydraulic control piston actuates from a first position when the tow bar is in the lowered position to a second position when the tow bar is in the raised position.

9. The improved auto-chocking enabled cargo dolly of embodiment 8, wherein each of the skid brake linkages comprises a pair of parallel disposed strut links.

10. The improved auto-chocking enabled cargo dolly of embodiment 1 further comprising an actuated feedback indicator mounted on the dolly frame, the actuated feedback indictor being responsively triggered when the when the linkage is actuated to the first position by the tow bar.

11. The improved auto-chocking enabled cargo dolly of embodiment 1, wherein the actuated feedback indicator comprises a flag movably disposed on the dolly frame and responsive to the linkage, wherein the flag actuates from a stowed position to a deployed position when the tow bar is moved from the lowered position to the raised position, the deployed position of the flag indicating the friction brake chocking assembly is holding the axle in place.

12. The improved auto-chocking enabled cargo dolly of embodiment 1, wherein the actuated feedback indicator comprises a status light fixed to the dolly frame and responsive to movement of the linkage, wherein the status light activates when the tow bar is moved from the lowered position to the raised position, activation of the status light indicating the friction brake chocking assembly is holding the axle in place.

13. The improved auto-chocking enabled cargo dolly of embodiment 12, wherein status light comprises an alarm light that rotates when activated, the rotating alarm light indicating a chocked state of the dolly frame.

14. The improved auto-chocking enabled cargo dolly of embodiment 12, wherein status light comprises a display panel disposed on the dolly frame that automatically displays a chocking status notification when activated, the chocking status notification indicating a chocked state of the dolly frame.

15. The improved auto-chocking enabled cargo dolly of embodiment 1, wherein the actuated feedback indicator comprises a speaker fixed to the dolly frame and responsive to movement of the linkage, wherein the speaker activates with an audible chocking status notification when the tow bar is moved from the lowered position to the raised position, the audible chocking status notification indicating the friction brake chocking assembly is holding the axle in place.

16. The improved auto-chocking enabled cargo dolly of embodiment 1 further comprising a transceiver disposed on the dolly frame and a position sensor disposed on the dolly frame to detect when the tow bar is moved from the lowered position to the raised position, the position sensor being operatively coupled to the transceiver to provide position sensor data indicating when the tow bar is moved from the lowered position to the raised position; and
  wherein the transceiver being operative to receive the position sensor data from the position sensor when the tow bar is moved from the lowered position to the raised position and responsively transmit a chocking status message to an external transceiver associated with the ground support equipment.

17. The improved auto-chocking enabled cargo dolly of embodiment 16, wherein the transceiver being operative to responsively transmit the chocking status message to the external transceiver disposed on the ground support equipment.

18. The improved auto-chocking enabled cargo dolly of embodiment 16, wherein the transceiver being operative to responsively transmit the chocking status message to a mobile wireless user access device associated with an operator of the ground support equipment as the external transceiver.

19. The improved auto-chocking enabled cargo dolly of embodiment 16 further comprising a tow bar connection pin sensor disposed on the tow bar and operatively coupled to the transceiver to provide connection pin sensor data indicating when the tow bar is connected to the ground support equipment; and
  wherein the transceiver being further operative to receive the connection pin sensor data from the tow bar connection pin sensor when the tow bar is connected to the ground support equipment and responsively transmit a connection status message to the external transceiver associated with the ground support equipment, the connection status message including connection related information indicating a connection status between the tow bar and the ground support equipment.

20. The improved auto-chocking enabled cargo dolly of embodiment 19, wherein the transceiver being operative to responsively transmit the connection status message to the external transceiver associated with the ground support equipment to initiate an interrupt of operations on the ground support equipment based upon the connection status message and the chocking status message.

21. The improved auto-chocking enabled cargo dolly of embodiment 1 further comprising a transceiver disposed on the dolly frame and a motion sensor disposed on the dolly frame to detect when the dolly frame is not moving, the motion sensor being operatively coupled to the transceiver to provide motion sensor data indicating when the dolly frame is not moving; and
  wherein the transceiver being further operative to receive the motion sensor data from the motion sensor when the dolly frame is not moving and responsively cause the friction brake chocking assembly to selectively engage the axle to hold the axle in place when the motion sensor data indicates the dolly frame is not moving.

22. The improved auto-chocking enabled cargo dolly of embodiment 1 further comprising a transceiver disposed on the dolly frame and a cargo weight sensor disposed on the dolly frame to detect a weight level of cargo supported on the dolly frame, the weight sensor being operatively coupled to the transceiver to provide weight sensor data indicating the weight level of the cargo supported on the dolly frame; and
  wherein the transceiver being further operative to
    receive the weight sensor data from the weight sensor over a period of time,
    determine when a change in weight of the cargo supported on the dolly frame exceeds a threshold cargo weight change based upon the weight sensor data over the period of time, and
    responsively cause the friction brake chocking system to selectively engage axle to hold the axle in place when the change in weight of the cargo supported on the dolly frame exceeds the threshold cargo weight change.

23. The improved auto-chocking enabled cargo dolly of embodiment 1 further comprising a transceiver disposed on the dolly frame and a proximity sensor disposed on one side of the dolly frame to detect a distance between the one side of the dolly frame and a cargo loader external to the dolly frame, the proximity sensor being operatively coupled to the transceiver to provide proximity sensor data indicating the distance between the one side of the dolly frame and the cargo loader; and
  wherein the transceiver being further operative to
    receive the proximity sensor data from the proximity sensor over a period of time,
    determine when a distance between the one side of the dolly frame and the cargo loader is below a threshold cargo loader distance based upon the proximity sensor data over the period of time, and
    responsively cause the friction brake chocking system to selectively engage the axle to hold the axle in place when the distance between the one side of the dolly frame and the cargo loader is below the threshold cargo loader distance.

24. The improved auto-chocking enabled cargo dolly of embodiment 23, wherein the threshold cargo loader distance represents a predetermined alignment distance for transfer of cargo between the dolly frame and the cargo loader.

25. The improved auto-chocking enabled cargo dolly of embodiment 1 further comprising a transceiver disposed on the dolly frame and a plurality of proximity sensors disposed on one side of the dolly frame, wherein each of the proximity sensors being operative to detect a relative distance between the one side of the dolly frame where the each of the proximity sensors is disposed and a cargo loader external to the dolly frame, wherein the proximity sensors being operatively coupled to the transceiver to provide proximity sensor data indicating the relative distances between the one side of the dolly frame and the cargo loader as detected by each of the proximity sensors; and wherein the transceiver being further operative to
        receive the proximity sensor data from each of the proximity sensors over a period of time,
        determine when the relative distances between the one side of the dolly frame and the cargo loader meets a threshold alignment configuration for the dolly frame and the cargo loader based upon the proximity sensor data over the period of time, and
        responsively cause the friction brake chocking system to selectively engage the axle to hold the axle in place when the relative distances between the one side of the dolly frame and the cargo loader meets the threshold alignment configuration for the dolly frame and the cargo loader.

26. The improved auto-chocking enabled cargo dolly of embodiment 1 further comprising a transceiver disposed on the dolly frame, the transceiver being operatively coupled to the linkage and operative to, in response to receiving a remote auto-chock message from an external transceiver, electronically actuate the linkage and responsively cause the friction brake chocking system to selectively engage the axle to hold the axle in place.

27. The improved auto-chocking enabled cargo dolly of embodiment 26, wherein the transceiver being operative to electronically actuate the linkage in response to receiving the remote auto-chock message from the external transceiver disposed on the ground support equipment.

28. The improved auto-chocking enabled cargo dolly of embodiment 26, wherein the transceiver being operative to electronically actuate the linkage in response to receiving the remote auto-chock message from a mobile wireless user access device associated with an operator of the ground support equipment as the external transceiver.

29. The improved auto-chocking enabled cargo dolly of embodiment 1 further comprising:
    a transceiver-based controller module disposed on the dolly frame;
    location circuitry disposed on the dolly frame and operatively coupled to the transceiver-based controller module, the location circuitry generating location data on a current location of the dolly frame and providing the location data to the transceiver-based controller module;
    wherein the skid brake chocking system further comprises a chocking sensor that monitors engagement of the skid brake chocking system relative to the ground, the chocking sensor being coupled to the transceiver-based controller module to provide chock status sensor data indicating the skid brake chocking system has engaged the ground below the dolly frame to hold the dolly frame in place; and
    wherein the transceiver-based controller module being further operative to transmit a dolly asset tracking message to a hub manager server when the chock status sensor data indicates the skid brake chocking system has engaged the ground below the dolly frame to hold the dolly frame in place, wherein the dolly asset tracking message including the current location of the dolly frame based upon the location data, chock status information for the dolly frame based upon the chock status sensor data, and a reference identification for the dolly frame.

30. The improved auto-chocking enabled cargo dolly of embodiment 1 further comprising:
    a transceiver-based controller module disposed on the dolly frame;
    location circuitry disposed on the dolly frame and operatively coupled to the transceiver-based controller module, the location circuitry generating location data on a current location of the dolly frame and providing the location data to the transceiver-based controller module;
    wherein the skid brake chocking system further comprises a chocking sensor that monitors engagement of the skid brake chocking system relative to the ground, the chocking sensor being coupled to the transceiver-based controller module to provide chock status sensor data indicating when the skid brake chocking system has engaged the ground below the dolly frame to hold the dolly frame in place; and
    wherein the transceiver-based controller module being further operative to transmit a dolly asset tracking message to an external transceiver disposed on the ground support equipment when the chock status sensor data indicates the skid brake chocking system has engaged the ground below the dolly frame to hold the dolly frame in place, the dolly asset tracking message including dolly asset tracking information related to the dolly frame for forwarding to a hub manager server, wherein the dolly asset tracking information to be forwarded to the hub manager server including the current location of the dolly frame based upon the location data, chock status information for the dolly frame based upon the chock status sensor data, and a reference identification for the dolly frame.

31. An improved auto-chocking enabled cargo dolly that is towable by ground support equipment, the cargo dolly comprising:
    a dolly frame;
    a set of wheels attached to the dolly frame, wherein the set of wheels supports the dolly frame and rotates to allow movement of the dolly frame;
    an axle attached to at least one of the wheels and disposed on the dolly frame to allow movement of the axle relative to the dolly frame;
    an electronic control module disposed on the dolly frame;
    a connection sensor disposed on the dolly frame and operatively coupled to the electronic control module, the connection sensor providing connection sensor data to the electronic control module indicating when the dolly frame is connected to the ground support equipment;
    a skid brake chocking actuator disposed on the dolly frame and operatively coupled to the electronic control module, the skid brake chocking actuator being responsive to a control input generated by the electronic control module based on the connection sensor data; and
    a skid brake chocking assembly fixed to the dolly frame and disposed to selectively and directly engage the ground below the dolly frame to hold the dolly frame in place, the skid brake chocking assembly being responsive to the skid brake chocking actuator, wherein the skid brake chocking assembly directly engages the ground below the dolly frame to hold the dolly frame in place when the skid brake chocking actuator is actuated by the control signal.

32. The improved auto-chocking enabled cargo dolly of embodiment 31, wherein the skid brake chocking assembly comprises:
   a skid brake base fixed to a bottom of the dolly frame as an anchor point for the skid brake chocking assembly;
   a set of skid brake linkages movably attached to the skid brake base; and
   a skid brake movably attached to each of the skid brake linkages;
   wherein the skid brake chocking actuator comprises a first end attached to the skid brake base and a second end attached to the skid brake, wherein a position of the second end of the skid brake chocking actuator moves relative to the first end in response to the control signal, and wherein the skid brake is moved by the skid brake chocking actuator relative to the skid brake base so that the skid brake extends away from the bottom of the dolly frame to engage the ground below the dolly frame when the skid brake chocking actuator is actuated by the control signal.

33. The improved auto-chocking enabled cargo dolly of embodiment 32, wherein the skid brake chocking actuator comprises a hydraulic skid brake actuator, wherein movement of the second end of the hydraulic skid brake actuator relative to the skid brake base in response to the control signal extends the skid brake relative to the bottom of the dolly frame to engage the ground below the dolly frame.

34. The improved auto-chocking enabled cargo dolly of embodiment 33, wherein each of the skid brake linkages comprises a pair of parallel disposed strut links.

35. The improved auto-chocking enabled cargo dolly of embodiment 31 further comprising an actuated feedback indicator mounted on the dolly frame and operatively coupled to the electronic control module, the actuated feedback indictor being responsively triggered by the electronic control module based upon the control signal that actuates the skid brake chocking actuator.

36. The improved auto-chocking enabled cargo dolly of embodiment 31, wherein the actuated feedback indicator comprises an actuated flag movably disposed on the dolly frame and operatively coupled to the electronic control module, the actuated flag actuates from a stowed position to a deployed position based upon the control signal that actuates the skid brake chocking actuator, the deployed position of the actuated flag indicating the skid brake chocking system is engaging the ground below the dolly frame to hold the dolly frame in place.

37. The improved auto-chocking enabled cargo dolly of embodiment 31, wherein the actuated feedback indicator comprises a status light fixed to the dolly frame and operatively coupled to the electronic control module, wherein the status light activates based upon the control signal that actuates the skid brake chocking actuator, activation of the status light indicating the skid brake chocking system is engaging the ground below the dolly frame to hold the dolly frame in place.

38. The improved auto-chocking enabled cargo dolly of embodiment 37, wherein status light comprises an alarm light that rotates when activated, the rotating alarm light indicating a chocked state of the dolly frame.

39. The improved auto-chocking enabled cargo dolly of embodiment 37, wherein status light comprises a display panel disposed on the dolly frame that automatically displays a chocking status notification when activated, the chocking status notification indicating a chocked state of the dolly frame.

40. The improved auto-chocking enabled cargo dolly of embodiment 31, wherein the actuated feedback indicator comprises a speaker fixed to the dolly frame and operatively coupled to the electronic control module, wherein the speaker activates with an audible chocking status notification based upon the control signal that actuates the skid brake chocking actuator, the audible chocking status notification indicating the skid brake chocking system is engaging the ground below the dolly frame to hold the dolly frame in place.

41. The improved auto-chocking enabled cargo dolly of embodiment 31, wherein the electronic control module including a transceiver that is operative to responsively transmit a chocking status message to an external transceiver associated with the ground support equipment based upon the control signal that actuates the skid brake chocking actuator.

42. The improved auto-chocking enabled cargo dolly of embodiment 41, wherein the transceiver being operative to responsively transmit the chocking status message to the external transceiver disposed on the ground support equipment.

43. The improved auto-chocking enabled cargo dolly of embodiment 41, wherein the transceiver being operative to responsively transmit the chocking status message to a mobile wireless user access device associated with an operator of the ground support equipment as the external transceiver.

44. The improved auto-chocking enabled cargo dolly of embodiment 31, wherein the electronic control module including a transceiver that is operative to responsively transmit a connection status message to an external transceiver associated with the ground support equipment, the connection status message indicating a connection status between the dolly frame and the ground support equipment based upon the connection sensor data.

45. The improved auto-chocking enabled cargo dolly of embodiment 31, further comprising a motion sensor disposed on the dolly frame to detect when the dolly frame is not moving, the motion sensor being operatively coupled to the electronic control module to provide motion sensor data indicating when the dolly frame is not moving; and
   wherein the electronic control module is operative to receive the motion sensor data from the motion sensor when the dolly frame is not moving and generate the control signal to trigger the skid brake chocking actuator to responsively cause the skid brake chocking system to engage the ground below the dolly frame to hold the dolly frame in place when the motion sensor data indicates the dolly frame is not moving.

46. The improved auto-chocking enabled cargo dolly of embodiment 31 further comprising a cargo weight sensor disposed on the dolly frame to detect a weight level of cargo supported on the dolly frame, the weight sensor being operatively coupled to the electronic control module to provide weight sensor data indicating the weight level of the cargo supported on the dolly frame; and
   wherein the electronic control module being further operative to
      receive the weight sensor data from the weight sensor over a period of time,
      determine when a change in weight of the cargo supported on the dolly frame exceeds a threshold cargo weight change based upon the weight sensor data over the period of time, and responsively trigger the skid brake chocking actuator to cause the skid brake chocking system to engage the ground below the dolly frame to hold the dolly frame in place when the change in weight of the cargo supported on the dolly frame exceeds the threshold cargo weight change.

47. The improved auto-chocking enabled cargo dolly of embodiment 31 further comprising a proximity sensor disposed on one side of the dolly frame to detect a distance between the one side of the dolly frame and a cargo loader external to the dolly frame, the proximity sensor being operatively coupled to the electronic control module to provide proximity sensor data indicating the distance between the one side of the dolly frame and the cargo loader; and wherein the electronic control module being further operative to receive the proximity sensor data from the proximity sensor over a period of time, determine when a distance between the one side of the dolly frame and the cargo loader is below a threshold cargo loader distance based upon the proximity sensor data over the period of time, and responsively trigger the skid brake chocking actuator to cause the skid brake chocking system to engage the ground below the dolly frame to hold the dolly frame in place when the distance between the one side of the dolly frame and the cargo loader is below the threshold cargo loader distance.

48. The improved auto-chocking enabled cargo dolly of embodiment 47, wherein the threshold cargo loader distance represents a predetermined alignment distance for transfer of cargo between the dolly frame and the cargo loader.

49. The improved auto-chocking enabled cargo dolly of embodiment 31 further comprising a plurality of proximity sensors disposed on one side of the dolly frame, wherein each of the proximity sensors being operative to detect a relative distance between the one side of the dolly frame where the each of the proximity sensors is disposed and a cargo loader external to the dolly frame, wherein the proximity sensors being operatively coupled to the electronic control module to provide proximity sensor data indicating the relative distances between the one side of the dolly frame and the cargo loader as detected by each of the proximity sensors; and wherein the electronic control module being further operative to receive the proximity sensor data from each of the proximity sensors over a period of time, determine when the relative distances between the one side of the dolly frame and the cargo loader meets a threshold alignment configuration for the dolly frame and the cargo loader based upon the proximity sensor data over the period of time, and responsively trigger the skid brake chocking actuator to cause the skid brake chocking system to engage the ground below the dolly frame to hold the dolly frame in place when the relative distances between the one side of the dolly frame and the cargo loader meets the threshold alignment configuration for the dolly frame and the cargo loader.

50. The improved auto-chocking enabled cargo dolly of embodiment 31, wherein the electronic control module being operative to, in response to receiving a remote auto-chock message from an external transceiver, electronically actuate the skid brake chocking actuator and responsively cause the skid brake chocking system to engage the ground below the dolly frame to hold the dolly frame in place.

51. The improved auto-chocking enabled cargo dolly of embodiment 50, wherein the transceiver being operative to electronically actuate the skid brake chocking actuator in response to receiving the remote auto-chock message from the external transceiver disposed on the ground support equipment.

52. The improved auto-chocking enabled cargo dolly of embodiment 50, wherein the transceiver being operative to electronically actuate the skid brake chocking actuator in response to receiving the remote auto-chock message from a mobile wireless user access device associated with an operator of the ground support equipment as the external transceiver.

53. The improved auto-chocking enabled cargo dolly of embodiment 31 further comprising location circuitry disposed on the dolly frame and operatively coupled to the electronic controller module, the location circuitry generating location data on a current location of the dolly frame and providing the location data to the electronic controller module;

wherein the skid brake chocking system further comprises a chocking sensor that monitors engagement of the skid brake chocking system relative to the ground, the chocking sensor being coupled to the electronic controller module to provide chock status sensor data indicating when the skid brake chocking system has engaged the ground below the dolly frame to hold the dolly frame in place;

wherein the electronic control module comprises a wireless transceiver, wherein the electronic controller module being further operative to transmit a dolly asset tracking message using the wireless transceiver to a hub manager server when the chock status sensor data indicates the skid brake chocking system has engaged the ground below the dolly frame to hold the dolly frame in place, wherein the dolly asset tracking message including the current location of the dolly frame based upon the location data, chock status information for the dolly frame based upon the chock status sensor data, and a reference identification for the dolly frame.

54. The improved auto-chocking enabled cargo dolly of embodiment 31 further comprising location circuitry disposed on the dolly frame and operatively coupled to the electronic controller module, the location circuitry generating location data on a current location of the dolly frame and providing the location data to the electronic controller module;

wherein the skid brake chocking system further comprises a chocking sensor that monitors engagement of the skid brake chocking system relative to the ground, the chocking sensor being coupled to the electronic controller module to provide chock status sensor data indicating when the skid brake chocking system has engaged the ground below the dolly frame to hold the dolly frame in place; and wherein the electronic controller module comprises a wireless transceiver, wherein the electronic controller module being further operative to transmit a dolly asset tracking message using the wireless transceiver to an external transceiver disposed on the ground support equipment when the chock status sensor data indicates the skid brake chocking system has engaged the ground below the dolly frame to hold the dolly frame in place, the dolly asset tracking message including dolly asset tracking information related to the dolly frame for forwarding to a hub manager server, wherein the dolly asset tracking information to be forwarded to the hub manager server including the current location of the dolly frame based upon the location data, chock status information for the dolly frame based upon the chock status sensor data, and a reference identification for the dolly frame.

55. An improved auto-chocking enabled cargo dolly that is towable by ground support equipment, the cargo dolly comprising:
a dolly frame,
a set of wheels attached to the dolly frame, wherein the set of wheels supports the dolly frame and rotates to allow movement of the dolly frame;
a tow bar flexibly attached to the dolly frame, the tow bar having a first attached end movably attached to the dolly frame and a second distal end having a ground support equipment connector disposed on the second distal end, the tow bar having a raised position where the second distal end is raised and not connected to the ground support equipment and a lowered position where the second distal end is lowered in a configuration to be attachable to the ground support equipment;
a hydraulic control piston in communication with the tow bar and having a control output, wherein the hydraulic control piston actuates from a first position when the tow bar is in the raised position to a second position when the tow bar is in the lowered position;
a hydraulic line coupled to the control output of the hydraulic control piston;
a skid brake assembly fixed to the dolly frame and disposed to selectively engage the ground with at least one skid brakes, the skid brake assembly comprising
an anchor point fixed to a bottom of the dolly frame,
a first linkage movably attached to the anchor point,
a hydraulic actuator piston having a first end, a second end, a control input coupled to the hydraulic line from the control output of the hydraulic control piston, wherein the first end is attached to the anchor point and the second end is operative to extend relative to the first end in response to the control output from the hydraulic control piston as provided by the hydraulic line coupled to the control input of the hydraulic actuator piston, and
a skid brake movably attached to the second end of the hydraulic actuator piston;
wherein the skid brake assembly extends the skid brake down from the bottom of the dolly frame in response to movement of the tow bar from the second position to the first position that causes the skid brake to extend from a retracted position relative to the dolly frame to an extended deployed position beneath the dolly frame to contact the ground.

Further Embodiment (Set D)—Auto-Chocking with a Hub-based Chocking Assembly

1. An improved auto-chocking enabled cargo dolly that is towable by ground support equipment, the cargo dolly comprising:
a dolly frame;
an axle disposed on the dolly frame;
a set of wheels attached to the axle, wherein the set of wheels supports at least a portion of the dolly frame, wherein each of the wheels contacts ground below the dolly frame and rotates to allow movement of the dolly frame;
a tow bar flexibly attached to the dolly frame, the tow bar having a first attached end movably attached to the dolly frame and a second distal end having a ground support equipment connector disposed on the second distal end, the tow bar having a raised position where the second distal end is raised and not connected to the ground support equipment and a lowered position where the second distal end is lowered in a configuration to be attachable to the ground support equipment;
a linkage in communication with the tow bar, wherein the linkage actuates from a first position when the tow bar is in the raised position to a second position when the tow bar is in the lowered position;
a hub-based chocking assembly comprising
a braking hub extension removably attached directly to at least one of the wheels, and
a friction bracket having a first end responsively coupled to the linkage and a second end engaging the braking hub extension to hold the braking hub extension in place when the linkage is actuated to the first position by the tow bar.

2. The improved auto-chocking enabled cargo dolly of embodiment 1, wherein the linkage comprises a mechanical switch responsive to actuate the hub extension friction chocking assembly and cause the hub extension friction chocking assembly to engage the hub extension to hold the dolly frame in place based upon whether the tow bar is in the raised position and whether the tow bar is in the lowered position.

3. The improved auto-chocking enabled cargo dolly of embodiment 2, wherein the mechanical switch comprises a strut movably fixed to the tow bar and a cable in communication with the strut, wherein the cable is further in responsive communication with the hub extension friction chocking assembly;
wherein movement of the tow bar from the lowered position to the raised position articulates the strut to cause the cable to move and actuate the skid brake chocking assembly.

4. The improved auto-chocking enabled cargo dolly of embodiment 1, wherein the braking hub extension comprises:
a braking hub extension base attached to the at least one of the wheels;
a braking hub spindle extending from the braking hub extension base, the braking hub spindle having a cylindrical contact surface that engages with the second end of the friction bracket.

5. The improved auto-chocking enabled cargo dolly of embodiment 4, wherein the braking hub spindle comprises:
a first cylindrical portion having the cylindrical contact surface that engages with the second end of the friction bracket; and
a second cylindrical portion having a second diameter larger than a first diameter of the first cylindrical portion.

6. The improved auto-chocking enabled cargo dolly of embodiment 1, wherein the friction bracket comprises:
a bracket extension coupled to the linkage at a first end of the bracket extension; and
a replaceable friction pad attached to a second end of the bracket extension, the replaceable friction pad engaging the braking hub extension to hold the braking hub extension in place when the linkage is actuated to the first position by the tow bar.

7. The improved auto-chocking enabled cargo dolly of embodiment 1, wherein the braking hub extension comprises:
- a braking hub extension base attached to the at least one of the wheels;
- a braking hub spindle extending from the braking hub extension base;
- a braking hub spoked gear disposed on the braking hub spindle; and
- wherein the second end of the friction bracket engaging a portion of the braking hub spoked gear disposed on the braking hub spindle to hold the braking hub extension in place when the linkage is actuated to the first position by the tow bar.

8. The improved auto-chocking enabled cargo dolly of embodiment 7, wherein the friction bracket comprises an extension bracket coupled to the linkage to engage the portion of the braking hub spoked gear to prevent rotation of the braking hub extension and hold the at least one of the wheels in place when the linkage is actuated to the first position by the tow bar.

9. The improved auto-chocking enabled cargo dolly of embodiment 1 further comprising an actuated feedback indicator mounted on the dolly frame, the actuated feedback indictor being responsively triggered when the when the linkage is actuated to the first position by the tow bar.

10. The improved auto-chocking enabled cargo dolly of embodiment 1, wherein the actuated feedback indicator comprises a flag movably disposed on the dolly frame and responsive to the linkage, wherein the flag actuates from a stowed position to a deployed position when the tow bar is moved from the lowered position to the raised position, the deployed position of the flag indicating the hub-based chocking assembly is holding the at least one of the wheels in place with the braking hub extension holding the braking hub extension in place.

11. The improved auto-chocking enabled cargo dolly of embodiment 1, wherein the actuated feedback indicator comprises a status light fixed to the dolly frame and responsive to movement of the linkage, wherein the status light activates when the tow bar is moved from the lowered position to the raised position, activation of the status light indicating the hub-based chocking assembly is holding the at least one of the wheels in place with the braking hub extension holding the braking hub extension in place.

12. The improved auto-chocking enabled cargo dolly of embodiment 11, wherein status light comprises an alarm light that rotates when activated, the rotating alarm light indicating a chocked state of the dolly frame.

13. The improved auto-chocking enabled cargo dolly of embodiment 11, wherein status light comprises a display panel disposed on the dolly frame that automatically displays a chocking status notification when activated, the chocking status notification indicating a chocked state of the dolly frame.

14. The improved auto-chocking enabled cargo dolly of embodiment 1, wherein the actuated feedback indicator comprises a speaker fixed to the dolly frame and responsive to movement of the linkage, wherein the speaker activates with an audible chocking status notification when the tow bar is moved from the lowered position to the raised position, the audible chocking status notification indicating the hub-based chocking assembly is holding the at least one of the wheels in place with the braking hub extension holding the braking hub extension in place.

15. The improved auto-chocking enabled cargo dolly of embodiment 1 further comprising a transceiver disposed on the dolly frame and a position sensor disposed on the dolly frame to detect when the tow bar is moved from the lowered position to the raised position, the position sensor being operatively coupled to the transceiver to provide position sensor data indicating when the tow bar is moved from the lowered position to the raised position; and
- wherein the transceiver being operative to receive the position sensor data from the position sensor when the tow bar is moved from the lowered position to the raised position and responsively transmit a chocking status message to an external transceiver associated with the ground support equipment.

16. The improved auto-chocking enabled cargo dolly of embodiment 15, wherein the transceiver being operative to responsively transmit the chocking status message to the external transceiver disposed on the ground support equipment.

17. The improved auto-chocking enabled cargo dolly of embodiment 15, wherein the transceiver being operative to responsively transmit the chocking status message to a mobile wireless user access device associated with an operator of the ground support equipment as the external transceiver.

18. The improved auto-chocking enabled cargo dolly of embodiment 15 further comprising a tow bar connection pin sensor disposed on the tow bar and operatively coupled to the transceiver to provide connection pin sensor data indicating when the tow bar is connected to the ground support equipment; and
- wherein the transceiver being further operative to receive the connection pin sensor data from the tow bar connection pin sensor when the tow bar is connected to the ground support equipment and responsively transmit a connection status message to the external transceiver associated with the ground support equipment, the connection status message including connection related information indicating a connection status between the tow bar and the ground support equipment.

19. The improved auto-chocking enabled cargo dolly of embodiment 18, wherein the transceiver being operative to responsively transmit the connection status message to the external transceiver associated with the ground support equipment to initiate an interrupt of operations on the ground support equipment based upon the connection status message and the chocking status message.

20. The improved auto-chocking enabled cargo dolly of embodiment 1 further comprising a transceiver disposed on the dolly frame and a motion sensor disposed on the dolly frame to detect when the dolly frame is not moving, the motion sensor being operatively coupled to the transceiver to provide motion sensor data indicating when the dolly frame is not moving; and
- wherein the transceiver being further operative to receive the motion sensor data from the motion sensor when the dolly frame is not moving and responsively cause the hub-based chocking assembly to hold the at least one of the wheels in place by engaging the braking hub extension to hold the braking hub extension in place when the motion sensor data indicates the dolly frame is not moving.

21. The improved auto-chocking enabled cargo dolly of embodiment 1 further comprising a transceiver disposed on the dolly frame and a cargo weight sensor disposed on the dolly frame to detect a weight level of cargo supported on the dolly frame, the weight sensor being operatively coupled to the transceiver to provide weight sensor data indicating the weight level of the cargo supported on the dolly frame; and wherein the transceiver being further operative to
receive the weight sensor data from the weight sensor over a period of time,
determine when a change in weight of the cargo supported on the dolly frame exceeds a threshold cargo weight change based upon the weight sensor data over the period of time, and
responsively cause the hub-based chocking assembly to hold the at least one of the wheels in place by engaging the braking hub extension to hold the braking hub extension in place when the change in weight of the cargo supported on the dolly frame exceeds the threshold cargo weight change.

22. The improved auto-chocking enabled cargo dolly of embodiment 1 further comprising a transceiver disposed on the dolly frame and a proximity sensor disposed on one side of the dolly frame to detect a distance between the one side of the dolly frame and a cargo loader external to the dolly frame, the proximity sensor being operatively coupled to the transceiver to provide proximity sensor data indicating the distance between the one side of the dolly frame and the cargo loader; and wherein the transceiver being further operative to
receive the proximity sensor data from the proximity sensor over a period of time,
determine when a distance between the one side of the dolly frame and the cargo loader is below a threshold cargo loader distance based upon the proximity sensor data over the period of time, and
responsively cause the hub-based chocking assembly to hold the at least one of the wheels in place by engaging the braking hub extension to hold the braking hub extension in place when the distance between the one side of the dolly frame and the cargo loader is below the threshold cargo loader distance.

23. The improved auto-chocking enabled cargo dolly of embodiment 22, wherein the threshold cargo loader distance represents a predetermined alignment distance for transfer of cargo between the dolly frame and the cargo loader.

24. The improved auto-chocking enabled cargo dolly of embodiment 1 further comprising a transceiver disposed on the dolly frame and a plurality of proximity sensors disposed on one side of the dolly frame, wherein each of the proximity sensors being operative to detect a relative distance between the one side of the dolly frame where the each of the proximity sensors is disposed and a cargo loader external to the dolly frame, wherein the proximity sensors being operatively coupled to the transceiver to provide proximity sensor data indicating the relative distances between the one side of the dolly frame and the cargo loader as detected by each of the proximity sensors; and wherein the transceiver being further operative to
receive the proximity sensor data from each of the proximity sensors over a period of time,
determine when the relative distances between the one side of the dolly frame and the cargo loader meets a threshold alignment configuration for the dolly frame and the cargo loader based upon the proximity sensor data over the period of time, and
responsively cause the hub-based chocking assembly to hold the at least one of the wheels in place by engaging the braking hub extension to hold the braking hub extension in place when the relative distances between the one side of the dolly frame and the cargo loader meets the threshold alignment configuration for the dolly frame and the cargo loader.

25. The improved auto-chocking enabled cargo dolly of embodiment 1 further comprising a transceiver disposed on the dolly frame, the transceiver being operatively coupled to the linkage and operative to, in response to receiving a remote auto-chock message from an external transceiver, electronically actuate the linkage and responsively cause the hub-based chocking assembly to hold the at least one of the wheels in place by engaging the braking hub extension to hold the braking hub extension in place.

26. The improved auto-chocking enabled cargo dolly of embodiment 25, wherein the transceiver being operative to electronically actuate the linkage in response to receiving the remote auto-chock message from the external transceiver disposed on the ground support equipment.

27. The improved auto-chocking enabled cargo dolly of embodiment 25, wherein the transceiver being operative to electronically actuate the linkage in response to receiving the remote auto-chock message from a mobile wireless user access device associated with an operator of the ground support equipment as the external transceiver.

28. The improved auto-chocking enabled cargo dolly of embodiment 1 further comprising:
a transceiver-based controller module disposed on the dolly frame;
location circuitry disposed on the dolly frame and operatively coupled to the transceiver-based controller module, the location circuitry generating location data on a current location of the dolly frame and providing the location data to the transceiver-based controller module;
wherein the hub-based chocking system further comprises a chocking sensor that monitors engagement of the braking hub extension to hold the braking hub extension in place as a chocking status of the hub-based chocking system, the chocking sensor being coupled to the transceiver-based controller module to provide chock status sensor data indicating when the hub-based chocking system has engaged the braking hub extension to hold the braking hub extension in place; and
wherein the transceiver-based controller module being further operative to transmit a dolly asset tracking message to a hub manager server when the chock status sensor data indicates the hub-based chocking system has engaged the braking hub extension to hold the braking hub extension in place, wherein the dolly asset tracking message including the current location of the dolly frame based upon the location data, chock status information for the dolly frame based upon the chock status sensor data, and a reference identification for the dolly frame.

29. The improved auto-chocking enabled cargo dolly of embodiment 1 further comprising:
a transceiver-based controller module disposed on the dolly frame;
location circuitry disposed on the dolly frame and operatively coupled to the transceiver-based controller module, the location circuitry generating location data on a current location of the dolly frame and providing the location data to the transceiver-based controller module;
wherein the hub-based chocking system further comprises a chocking sensor that monitors engagement of the braking hub extension to hold the braking hub extension in place as a chocking status of the hub-based chocking system, the chocking sensor being coupled to the transceiver-based controller module to provide chock status sensor data indicating when the hub-based chocking system has engaged the braking hub extension to hold the braking hub extension in place; and wherein the transceiver-based controller module being further operative to transmit a dolly asset tracking message to an external transceiver disposed on the ground support equipment when the chock status sensor data indicates the hub-based chocking system has engaged the braking hub extension to hold the braking hub extension in place, the dolly asset tracking message including dolly asset tracking information related to the dolly frame for forwarding to a hub manager server, wherein the dolly asset tracking information to be forwarded to the hub manager server including the current location of the dolly frame based upon the location data, chock status information for the dolly frame based upon the chock status sensor data, and a reference identification for the dolly frame.

30. An improved auto-chocking enabled cargo dolly that is towable by ground support equipment, the cargo dolly comprising:
a dolly frame,
an axle disposed on the dolly frame;
a set of wheels attached to the axle, wherein the set of wheels supports at least a portion of the dolly frame, wherein each of the wheels contacts ground below the dolly frame and rotates to allow movement of the dolly frame;
an electronic control module disposed on the dolly frame;
a connection sensor disposed on the dolly frame and operatively coupled to the electronic control module, the connection sensor providing connection sensor data to the electronic control module indicating when the dolly frame is connected to the ground support equipment;
a hub-based chocking actuator disposed on the dolly frame and operatively coupled to the electronic control module, the hub-based chocking actuator being responsive to a control input generated by the electronic control module based on the connection sensor data; and
a hub-based chocking assembly comprising
a braking hub extension removably attached directly to at least one of the wheels, and
a friction bracket having a first end responsively coupled to the hub-based chocking actuator and a second end engaging the braking hub extension to hold the braking hub extension in place when the hub-based chocking actuator is actuated by the control signal.

31. The improved auto-chocking enabled cargo dolly of embodiment 30, wherein the braking hub extension comprises:
a braking hub extension base attached to the at least one of the wheels;
a braking hub spindle extending from the braking hub extension base, the braking hub spindle having a cylindrical contact surface that engages with the second end of the friction bracket.

32. The improved auto-chocking enabled cargo dolly of embodiment 31, wherein the braking hub spindle comprises:
a first cylindrical portion having the cylindrical contact surface that engages with the second end of the friction bracket; and
a second cylindrical portion having a second diameter larger than a first diameter of the first cylindrical portion.

33. The improved auto-chocking enabled cargo dolly of embodiment 30, wherein the friction bracket comprises:
a bracket extension coupled to the hub-based chocking actuator at a first end of the bracket extension; and
a replaceable friction pad attached to a second end of the bracket extension, the replaceable friction pad engaging the braking hub extension to hold the braking hub extension in place when the hub-based chocking actuator is actuated by the control signal.

34. The improved auto-chocking enabled cargo dolly of embodiment 30, wherein the braking hub extension comprises:
a braking hub extension base attached to the at least one of the wheels;
a braking hub spindle extending from the braking hub extension base;
a braking hub spoked gear disposed on the braking hub spindle; and
wherein the second end of the friction bracket engaging a portion of the braking hub spoked gear disposed on the braking hub spindle to hold the braking hub extension in place when the hub-based chocking actuator is actuated by the control signal.

35. The improved auto-chocking enabled cargo dolly of embodiment 34, wherein the friction bracket comprises an extension bracket coupled to the hub-based chocking actuator to engage the portion of the braking hub spoked gear to prevent rotation of the braking hub extension and hold the at least one of the wheels in place when the hub-based chocking actuator is actuated by the control signal.

36. The improved auto-chocking enabled cargo dolly of embodiment 30 further comprising an actuated feedback indicator mounted on the dolly frame and operatively coupled to the electronic control module, the actuated feedback indictor being responsively triggered by the electronic control module based upon the control signal that actuates the hub-based chocking actuator.

37. The improved auto-chocking enabled cargo dolly of embodiment 30, wherein the actuated feedback indicator comprises an actuated flag movably disposed on the dolly frame and operatively coupled to the electronic control module, the actuated flag actuates from a stowed position to a deployed position based upon the control signal that actuates the skid brake chocking actuator, the deployed position of the actuated flag the hub-based chocking assembly is holding the at least one of the wheels in place with the braking hub extension holding the braking hub extension in place.

38. The improved auto-chocking enabled cargo dolly of embodiment 30, wherein the actuated feedback indicator comprises a status light fixed to the dolly frame and operatively coupled to the electronic control module, wherein the status light activates based upon the control signal that actuates the skid brake chocking actuator, activation of the status light indicating the hub-based chocking assembly is holding the at least one of the wheels in place with the braking hub extension holding the braking hub extension in place.

39. The improved auto-chocking enabled cargo dolly of embodiment 38, wherein status light comprises an alarm light that rotates when activated, the rotating alarm light indicating a chocked state of the dolly frame.

40. The improved auto-chocking enabled cargo dolly of embodiment 38, wherein status light comprises a display panel disposed on the dolly frame that automatically displays a chocking status notification when activated, the chocking status notification indicating a chocked state of the dolly frame.

41. The improved auto-chocking enabled cargo dolly of embodiment 30, wherein the actuated feedback indicator comprises a speaker fixed to the dolly frame and operatively coupled to the electronic control module, wherein the speaker activates with an audible chocking status notification based upon the control signal that actuates the skid brake chocking actuator, the audible chocking status notification indicating the hub-based chocking assembly is holding the at least one of the wheels in place with the braking hub extension holding the braking hub extension in place.

42. The improved auto-chocking enabled cargo dolly of embodiment 30, wherein the electronic control module including a transceiver that is operative to responsively transmit a chocking status message to an external transceiver associated with the ground support equipment based upon the control signal that actuates the hub-based chocking actuator.

43. The improved auto-chocking enabled cargo dolly of embodiment 42, wherein the transceiver being operative to responsively transmit the chocking status message to the external transceiver disposed on the ground support equipment.

44. The improved auto-chocking enabled cargo dolly of embodiment 42, wherein the transceiver being operative to responsively transmit the chocking status message to a mobile wireless user access device associated with an operator of the ground support equipment as the external transceiver.

45. The improved auto-chocking enabled cargo dolly of embodiment 30, wherein the electronic control module including a transceiver that is operative to responsively transmit a connection status message to an external transceiver associated with the ground support equipment, the connection status message indicating a connection status between the dolly frame and the ground support equipment based upon the connection sensor data.

46. The improved auto-chocking enabled cargo dolly of embodiment 30 further comprising a motion sensor disposed on the dolly frame to detect when the dolly frame is not moving, the motion sensor being operatively coupled to the electronic control module to provide motion sensor data indicating when the dolly frame is not moving; and wherein the electronic control module is operative to
receive the motion sensor data from the motion sensor when the dolly frame is not moving and generate the control signal to trigger the hub-based chocking actuator to responsively cause the hub-based chocking assembly to hold the at least one of the wheels in place by engaging the braking hub extension to hold the braking hub extension in place when the motion sensor data indicates the dolly frame is not moving.

47. The improved auto-chocking enabled cargo dolly of embodiment 30 further comprising a cargo weight sensor disposed on the dolly frame to detect a weight level of cargo supported on the dolly frame, the weight sensor being operatively coupled to the electronic control module to provide weight sensor data indicating the weight level of the cargo supported on the dolly frame; and wherein the electronic control module being further operative to
receive the weight sensor data from the weight sensor over a period of time,
determine when a change in weight of the cargo supported on the dolly frame exceeds a threshold cargo weight change based upon the weight sensor data over the period of time, and
responsively trigger the hub-based chocking actuator to cause the hub-based chocking assembly to hold the at least one of the wheels in place by engaging the braking hub extension to hold the braking hub extension in place when the change in weight of the cargo supported on the dolly frame exceeds the threshold cargo weight change.

48. The improved auto-chocking enabled cargo dolly of embodiment 30 further comprising a proximity sensor disposed on one side of the dolly frame to detect a distance between the one side of the dolly frame and a cargo loader external to the dolly frame, the proximity sensor being operatively coupled to the electronic control module to provide proximity sensor data indicating the distance between the one side of the dolly frame and the cargo loader; and wherein the electronic control module being further operative to
receive the proximity sensor data from the proximity sensor over a period of time,
determine when a distance between the one side of the dolly frame and the cargo loader is below a threshold cargo loader distance based upon the proximity sensor data over the period of time, and
responsively trigger the hub-based chocking actuator to cause the hub-based chocking assembly to hold the at least one of the wheels in place by engaging the braking hub extension to hold the braking hub extension in place when the distance between the one side of the dolly frame and the cargo loader is below the threshold cargo loader distance.

49. The improved auto-chocking enabled cargo dolly of embodiment 48, wherein the threshold cargo loader distance represents a predetermined alignment distance for transfer of cargo between the dolly frame and the cargo loader.

50. The improved auto-chocking enabled cargo dolly of embodiment 30 further comprising a plurality of proximity sensors disposed on one side of the dolly frame, wherein each of the proximity sensors being operative to detect a relative distance between the one side of the dolly frame where the each of the proximity sensors is disposed and a cargo loader external to the dolly frame, wherein the proximity sensors being operatively coupled to the electronic control module to provide proximity sensor data indicating the relative distances between the one side of the dolly frame and the cargo loader as detected by each of the proximity sensors; and wherein the electronic control module being further operative to
receive the proximity sensor data from each of the proximity sensors over a period of time,
determine when the relative distances between the one side of the dolly frame and the cargo loader meets a threshold alignment configuration for the dolly frame and the cargo loader based upon the proximity sensor data over the period of time, and
responsively trigger the hub-based chocking actuator to cause the hub-based chocking assembly to hold the at least one of the wheels in place by engaging the braking hub extension to hold the braking hub extension in place when the relative distances between the one side of the dolly frame and the cargo loader meets the threshold alignment configuration for the dolly frame and the cargo loader.

51. The improved auto-chocking enabled cargo dolly of embodiment 30, wherein the electronic control module being operative to, in response to receiving a remote auto-chock message from an external transceiver, electronically actuate the hub-based chocking actuator and responsively cause the hub-based chocking assembly to hold the at least one of the wheels in place by engaging the braking hub extension to hold the braking hub extension in place.

52. The improved auto-chocking enabled cargo dolly of embodiment 51, wherein the transceiver being operative to electronically actuate the hub-based chocking actuator in response to receiving the remote auto-chock message from the external transceiver disposed on the ground support equipment.

53. The improved auto-chocking enabled cargo dolly of embodiment 51, wherein the transceiver being operative to electronically actuate the hub-based chocking actuator in response to receiving the remote auto-chock message from a mobile wireless user access device associated with an operator of the ground support equipment as the external transceiver.

54. The improved auto-chocking enabled cargo dolly of embodiment 30 further comprising location circuitry disposed on the dolly frame and operatively coupled to the electronic controller module, the location circuitry generating location data on a current location of the dolly frame and providing the location data to the electronic controller module;
wherein the hub-based chocking system further comprises a chocking sensor that monitors engagement of the braking hub extension to hold the braking hub extension in place as a chocking status of the hub-based chocking system, the chocking sensor being coupled to the electronic controller module to provide chock status sensor data indicating when the hub-based chocking system has engaged the braking hub extension to hold the braking hub extension in place;
wherein the electronic control module comprises a wireless transceiver, wherein the electronic controller module being further operative to transmit a dolly asset tracking message using the wireless transceiver to a hub manager server when the chock status sensor data indicates the hub-based chocking system has engaged the braking hub extension to hold the braking hub extension in place, wherein the dolly asset tracking message including the current location of the dolly frame based upon the location data, chock status information for the dolly frame based upon the chock status sensor data, and a reference identification for the dolly frame.

55. The improved auto-chocking enabled cargo dolly of embodiment 30 further comprising location circuitry disposed on the dolly frame and operatively coupled to the electronic controller module, the location circuitry generating location data on a current location of the dolly frame and providing the location data to the electronic controller module;
wherein the hub-based chocking system further comprises a chocking sensor that monitors engagement of the braking hub extension to hold the braking hub extension in place as a chocking status of the hub-based chocking system, the chocking sensor being coupled to the electronic controller module to provide chock status sensor data indicating when the hub-based chocking system has engaged the braking hub extension to hold the braking hub extension in place; and
wherein the electronic controller module comprises a wireless transceiver, wherein the electronic controller module being further operative to transmit a dolly asset tracking message using the wireless transceiver to an external transceiver disposed on the ground support equipment when the chock status sensor data indicates the hub-based chocking system has engaged the braking hub extension to hold the braking hub extension in place, the dolly asset tracking message including dolly asset tracking information related to the dolly frame for forwarding to a hub manager server, wherein the dolly asset tracking information to be forwarded to the hub manager server including the current location of the dolly frame based upon the location data, chock status information for the dolly frame based upon the chock status sensor data, and a reference identification for the dolly frame.

Further Embodiment (Set E)—Dolly Asset Tracking System for Auto-Chocking Enabled Cargo Dollies 1. A system for chocked status management of a logistics ground support equipment fleet, the system comprising:
a hub manager server;
a logistics ground support equipment cargo tractor having a transceiver-based control module with which to communicate wirelessly with the hub manager server;
a plurality of improved auto-chocking enabled cargo dollies, wherein each of the improved auto-chocking enabled cargo dollies comprises
a dolly frame,
a set of wheels attached to the dolly frame, wherein the set of wheels supports the dolly frame and rotates to allow movement of the dolly frame,
an electronic control module disposed on the dolly frame, the electronic control module including a transceiver operative to communicate wirelessly with the hub manager server,
location circuitry disposed on the dolly frame and operatively coupled to the electronic controller module, the location circuitry generating location data on a current location of the dolly frame of a respective one of the improved auto-chocking enabled cargo dollies and providing the location data to the electronic controller module,
a connection sensor disposed on the dolly frame and operatively coupled to the electronic control module, the connection sensor providing connection sensor data to the electronic control module indicating when the dolly frame is connected to the ground support equipment,
a chocking actuator disposed on the dolly frame and operatively coupled to the electronic control module, the chocking actuator being responsive to a control input generated by the electronic control module based on the connection sensor data,
an auto-chocking system fixed to the dolly frame and responsive to the chocking actuator to selectively deploy and prevent the dolly frame from moving in response to activation of the chocking actuator by the control signal, and
a chocking sensor that monitors deployment of the auto-chocking system, the chocking sensor being coupled to the electronic controller module to provide chock status sensor data indicating when the auto-chocking system has selectively deployed to prevent the dolly frame from moving;

wherein the electronic control module of a first of the improved auto-chocking enabled cargo dollies transmits a dolly asset tracking message to the hub manager server when the chock status sensor data indicates the auto-chocking system has selectively deployed to prevent the dolly frame from moving, the dolly asset tracking message including dolly asset tracking information on the first of the improved auto-chocking enabled cargo dollies including a current location of the dolly frame of the first of the improved auto-chocking enabled cargo dollies based upon the location data, chock status information for the dolly frame of the first of the improved auto-chocking enabled cargo dollies based upon the chock status sensor data, and a reference identification for the dolly frame of the first of the improved auto-chocking enabled cargo dollies; and wherein the hub manager server is operative to
receive the dolly asset tracking message from the first of the improved auto-chocking enabled cargo dollies,
updates fleet management information stored on the hub manager server to reflect the dolly asset tracking information on the first of the improved auto-chocking enabled cargo dollies, and
transmit a message to the logistics ground support equipment cargo tractor to initiate a responsive fleet operation action using the updated fleet management information.

2. The system of embodiment 1, wherein the message to the logistics ground support equipment cargo tractor comprises updated status information on the improved auto-chocking enabled cargo dollies including the first of the improved auto-chocking enabled cargo dollies.

3. The system of embodiment 2, wherein the updated status information comprises a current location of each of the improved auto-chocking enabled cargo dollies.

4. The system of embodiment 2, wherein the updated status information comprises which of the improved auto-chocking enabled cargo dollies are located within a predetermined distance relative to the logistics ground support equipment cargo tractor.

5. The system of embodiment 2, wherein the updated status information comprises which of the improved auto-chocking enabled cargo dollies are currently chocked.

6. The system of embodiment 2, wherein the updated status information comprises which of the improved auto-chocking enabled cargo dollies are available to be moved.

7. The system of embodiment 2, wherein the updated status information comprises which of the improved auto-chocking enabled cargo dollies are available to be moved to respond to a request sent by the logistics ground support equipment cargo tractor to the hub manager server.

8. The system of embodiment 2, wherein the updated status information comprises which of the improved auto-chocking enabled cargo dollies are available to be staged for use at an alternative staging location.

9. The system of embodiment 8, wherein the alternative staging location is a less congested operating area for the logistics ground support equipment fleet compared to a more congested operating area for the logistics ground support equipment fleet.

10. The system of embodiment 7, wherein at least one of the improved auto-chocking enabled cargo dollies available to be moved according to the updated status information is operative, after being moved by the logistics ground support equipment cargo tractor, to
re-engage the auto-chocking system on the at least one of the improved auto-chocking enabled cargo dollies, and
responsively transmit a post-move dolly asset tracking message to the hub manager server after re-engaging the auto-chocking system, the post-move dolly asset tracking message including updated dolly asset tracking information on the at least one of the improved auto-chocking enabled cargo dollies including a current location of the dolly frame of the at least one of the improved auto-chocking enabled cargo dollies based upon the location data, chock status information for the dolly frame of the at least one of the improved auto-chocking enabled cargo dollies based upon the chock status sensor data, and reference identification for the dolly frame of the at least one of the improved auto-chocking enabled cargo dollies.

11. The system of embodiment 1, wherein the auto-chocking system comprises a wheel engagement chocking assembly responsive to the chocking actuator, wherein the wheel engagement chocking assembly applies pressure directly to at least one of the wheels to hold the at least one of the wheels in place and prevent the dolly frame from moving when the chocking actuator is actuated by the control input from the electronic control module.

12. The system of embodiment 1, wherein the auto-chocking system comprises a friction brake chocking assembly fixed to the dolly frame and disposed to selectively engage the axle with a plurality of brake pads, the friction brake chocking assembly being responsive to the chocking actuator, wherein the friction brake chocking assembly applies pressure directly to at least one of the brake pads to cause the brake pads to collectively hold the axle in place when the chocking actuator is actuated by the control input from the electronic control module.

13. The system of embodiment 1, wherein the auto-chocking system comprises a skid brake chocking assembly fixed to the dolly frame and disposed to selectively and directly engage the ground below the dolly frame to hold the dolly frame in place, the skid brake chocking assembly being responsive to the chocking actuator, wherein the skid brake chocking assembly directly engages the ground below the dolly frame to hold the dolly frame in place when the chocking actuator is actuated by the control input from the electronic control module.

14. The system of embodiment 13, wherein the skid brake chocking assembly comprises:
a skid brake base fixed to a bottom of the dolly frame as an anchor point for the skid brake chocking assembly;
a set of skid brake linkages movably attached to the skid brake base;
a skid brake movably attached to each of the skid brake linkages; and
a skid brake actuator as the chocking actuator, the skid brake actuator having a first end attached to the skid brake base and a second end attached to the skid brake, wherein a position of the second end of the skid brake actuator being responsive to the control input from the electronic control module, wherein the skid brake is moved by the skid brake actuator relative to the skid brake base so that the skid brake extends relative to the bottom of the dolly frame to engage the ground below the dolly frame when the skid brake actuator is actuated by the control input from the electronic control module.

15. The system of embodiment 1, wherein the auto-chocking system comprises a hub-based chocking assembly comprising:
a braking hub extension removably attached to at least one of the wheels; and
a friction bracket having a first end responsively coupled to the chocking actuator and a second end engaging the braking hub extension to hold the braking hub extension in place when the chocking actuator is actuated by the control input from the electronic control module.

Those skilled in the art will appreciate that the embodiments disclosed and explained above using such an exemplary electronics control module onboard a cargo dolly may be implemented with an apparatus or system of sensors, actuators, feedback systems, communication interfaces, power supplies, and one or more software modules running on the processor of the electronics control module as described above. Such software modules may be stored on non-transitory computer-readable medium in the electronic control module. Thus, when executing such software modules, the electronics control module and any of its peripheral sensors, actuators, feedback systems, and communication interfaces may be operative to perform the operations or steps from the process embodiments disclosed above, including variations of those processes.

In summary, it should be emphasized that the sequence of operations to perform any of the processes/methods and variations of the methods described in the embodiments herein are merely exemplary, and that a variety of sequences of operations may be followed while still being true and in accordance with the principles of the present invention as understood by one skilled in the art.

At least some portions of exemplary embodiments outlined above may be used in association with portions of other exemplary embodiments to enhance and improve logistics operations (such as cargo and package loading, transport, and unloading) using dolly that may be enhanced or improved to allow for remote control of one or pins on the dolly so that they may be dropped/moved on one or more sides of the dolly from another side of the dolly at the same time while avoiding the need for human intervention between the dolly and the container loader and enhanced onboard electronics that further improved on use of such an improved dolly.

As noted above, the exemplary embodiments disclosed herein may be used independently from one another and/or in combination with one another and may have applications to devices and methods not disclosed herein. Further, those skilled in the art will appreciate that embodiments may provide one or more advantages, and not all embodiments necessarily provide all or more than one particular advantage as set forth here. Additionally, it will be apparent to those skilled in the art that various modifications and variations can be made to the structures and methodologies described herein. Thus, it should be understood that the invention is not limited to the subject matter discussed in the description. Rather, the present invention, as recited in the claims below, is intended to cover modifications and variations.

What is claimed is:

1. An improved auto-chocking enabled cargo dolly that is towable by ground support equipment, the cargo dolly comprising:
a dolly frame;
an axle disposed on the dolly frame;
a set of wheels attached to the axle, wherein the set of wheels supports at least a portion of the dolly frame, wherein each of the wheels contacts ground below the dolly frame and rotates to allow movement of the dolly frame;
a tow bar flexibly attached to the dolly frame, the tow bar having a first attached end movably attached to the dolly frame and a second distal end having a ground support equipment connector disposed on the second distal end, the tow bar having a raised position where the second distal end is raised and not connected to the ground support equipment and a lowered position where the second distal end is lowered in a configuration to be attachable to the ground support equipment;
a linkage in communication with the tow bar, wherein the linkage actuates from a first position when the tow bar is in the raised position to a second position when the tow bar is in the lowered position;
a hub-based chocking assembly comprising
a braking hub extension removably attached directly to at least one of the wheels, and
a friction bracket having a first end responsively coupled to the linkage and a second end engaging the braking hub extension to hold the braking hub extension in place when the linkage is actuated to the first position by the tow bar.

2. The improved auto-chocking enabled cargo dolly of claim 1, wherein the linkage comprises a mechanical switch responsive to actuate the hub extension friction chocking assembly and cause the hub extension friction chocking assembly to engage the hub extension to hold the dolly frame in place based upon whether the tow bar is in the raised position and whether the tow bar is in the lowered position.

3. The improved auto-chocking enabled cargo dolly of claim 2, wherein the mechanical switch comprises a strut movably fixed to the tow bar and a cable in communication with the strut, wherein the cable is further in responsive communication with the hub extension friction chocking assembly;
wherein movement of the tow bar from the lowered position to the raised position articulates the strut to cause the cable to move and actuate the skid brake chocking assembly.

4. The improved auto-chocking enabled cargo dolly of claim 1, wherein the braking hub extension comprises:
a braking hub extension base attached to the at least one of the wheels;
a braking hub spindle extending from the braking hub extension base, the braking hub spindle having a cylindrical contact surface that engages with the second end of the friction bracket.

5. The improved auto-chocking enabled cargo dolly of claim 4, wherein the braking hub spindle comprises:
a first cylindrical portion having the cylindrical contact surface that engages with the second end of the friction bracket; and
a second cylindrical portion having a second diameter larger than a first diameter of the first cylindrical portion.

6. The improved auto-chocking enabled cargo dolly of claim 1, wherein the friction bracket comprises:
a bracket extension coupled to the linkage at a first end of the bracket extension; and
a replaceable friction pad attached to a second end of the bracket extension, the replaceable friction pad engaging the braking hub extension to hold the braking hub extension in place when the linkage is actuated to the first position by the tow bar.

7. The improved auto-chocking enabled cargo dolly of claim 1, wherein the braking hub extension comprises:
a braking hub extension base attached to the at least one of the wheels;
a braking hub spindle extending from the braking hub extension base;
a braking hub spoked gear disposed on the braking hub spindle; and
wherein the second end of the friction bracket engaging a portion of the braking hub spoked gear disposed on the braking hub spindle to hold the braking hub extension in place when the linkage is actuated to the first position by the tow bar.

8. The improved auto-chocking enabled cargo dolly of claim 7, wherein the friction bracket comprises an extension bracket coupled to the linkage to engage the portion of the braking hub spoked gear to prevent rotation of the braking hub extension and hold the at least one of the wheels in place when the linkage is actuated to the first position by the tow bar.

9. The improved auto-chocking enabled cargo dolly of claim 1 further comprising an actuated feedback indicator mounted on the dolly frame, the actuated feedback indicator being responsively triggered when the when the linkage is actuated to the first position by the tow bar.

10. The improved auto-chocking enabled cargo dolly of claim 1, wherein the actuated feedback indicator comprises a flag movably disposed on the dolly frame and responsive to the linkage, wherein the flag actuates from a stowed position to a deployed position when the tow bar is moved from the lowered position to the raised position, the deployed position of the flag indicating the hub-based chocking assembly is holding the at least one of the wheels in place with the braking hub extension holding the braking hub extension in place.

11. The improved auto-chocking enabled cargo dolly of claim 1, wherein the actuated feedback indicator comprises a status light fixed to the dolly frame and responsive to movement of the linkage, wherein the status light activates when the tow bar is moved from the lowered position to the raised position, activation of the status light indicating the hub-based chocking assembly is holding the at least one of the wheels in place with the braking hub extension holding the braking hub extension in place.

12. The improved auto-chocking enabled cargo dolly of claim 11, wherein status light comprises an alarm light that rotates when activated, the rotating alarm light indicating a chocked state of the dolly frame.

13. The improved auto-chocking enabled cargo dolly of claim 11, wherein status light comprises a display panel disposed on the dolly frame that automatically displays a chocking status notification when activated, the chocking status notification indicating a chocked state of the dolly frame.

14. The improved auto-chocking enabled cargo dolly of claim 1, wherein the actuated feedback indicator comprises a speaker fixed to the dolly frame and responsive to movement of the linkage, wherein the speaker activates with an audible chocking status notification when the tow bar is moved from the lowered position to the raised position, the audible chocking status notification indicating the hub-based chocking assembly is holding the at least one of the wheels in place with the braking hub extension holding the braking hub extension in place.

15. The improved auto-chocking enabled cargo dolly of claim 1 further comprising a transceiver disposed on the dolly frame and a position sensor disposed on the dolly frame to detect when the tow bar is moved from the lowered position to the raised position, the position sensor being operatively coupled to the transceiver to provide position sensor data indicating when the tow bar is moved from the lowered position to the raised position; and
wherein the transceiver being operative to receive the position sensor data from the position sensor when the tow bar is moved from the lowered position to the raised position and responsively transmit a chocking status message to an external transceiver associated with the ground support equipment.

16. The improved auto-chocking enabled cargo dolly of claim 15, wherein the transceiver being operative to responsively transmit the chocking status message to the external transceiver disposed on the ground support equipment.

17. The improved auto-chocking enabled cargo dolly of claim 15, wherein the transceiver being operative to responsively transmit the chocking status message to a mobile wireless user access device associated with an operator of the ground support equipment as the external transceiver.

18. The improved auto-chocking enabled cargo dolly of claim 15 further comprising a tow bar connection pin sensor disposed on the tow bar and operatively coupled to the transceiver to provide connection pin sensor data indicating when the tow bar is connected to the ground support equipment; and
wherein the transceiver being further operative to receive the connection pin sensor data from the tow bar connection pin sensor when the tow bar is connected to the ground support equipment and responsively transmit a connection status message to the external transceiver associated with the ground support equipment, the connection status message including connection related information indicating a connection status between the tow bar and the ground support equipment.

19. The improved auto-chocking enabled cargo dolly of claim 18, wherein the transceiver being operative to responsively transmit the connection status message to the external transceiver associated with the ground support equipment to initiate an interrupt of operations on the ground support equipment based upon the connection status message and the chocking status message.

20. The improved auto-chocking enabled cargo dolly of claim 1 further comprising a transceiver disposed on the dolly frame and a motion sensor disposed on the dolly frame to detect when the dolly frame is not moving, the motion sensor being operatively coupled to the transceiver to provide motion sensor data indicating when the dolly frame is not moving; and
wherein the transceiver being further operative to receive the motion sensor data from the motion sensor when the dolly frame is not moving and responsively cause the hub-based chocking assembly to hold the at least one of the wheels in place by engaging the braking hub extension to hold the braking hub extension in place when the motion sensor data indicates the dolly frame is not moving.

21. The improved auto-chocking enabled cargo dolly of claim 1 further comprising a transceiver disposed on the dolly frame and a cargo weight sensor disposed on the dolly frame to detect a weight level of cargo supported on the dolly frame, the weight sensor being operatively coupled to the transceiver to provide weight sensor data indicating the weight level of the cargo supported on the dolly frame; and wherein the transceiver being further operative to
receive the weight sensor data from the weight sensor over a period of time,
determine when a change in weight of the cargo supported on the dolly frame exceeds a threshold cargo weight change based upon the weight sensor data over the period of time, and
responsively cause the hub-based chocking assembly to hold the at least one of the wheels in place by engaging the braking hub extension to hold the braking hub extension in place when the change in weight of the cargo supported on the dolly frame exceeds the threshold cargo weight change.

22. The improved auto-chocking enabled cargo dolly of claim 1 further comprising a transceiver disposed on the dolly frame and a proximity sensor disposed on one side of the dolly frame to detect a distance between the one side of the dolly frame and a cargo loader external to the dolly frame, the proximity sensor being operatively coupled to the transceiver to provide proximity sensor data indicating the distance between the one side of the dolly frame and the cargo loader; and
wherein the transceiver being further operative to
receive the proximity sensor data from the proximity sensor over a period of time,
determine when a distance between the one side of the dolly frame and the cargo loader is below a threshold cargo loader distance based upon the proximity sensor data over the period of time, and
responsively cause the hub-based chocking assembly to hold the at least one of the wheels in place by engaging the braking hub extension to hold the braking hub extension in place when the distance between the one side of the dolly frame and the cargo loader is below the threshold cargo loader distance.

23. The improved auto-chocking enabled cargo dolly of claim 22, wherein the threshold cargo loader distance represents a predetermined alignment distance for transfer of cargo between the dolly frame and the cargo loader.

24. The improved auto-chocking enabled cargo dolly of claim 1 further comprising a transceiver disposed on the dolly frame and a plurality of proximity sensors disposed on one side of the dolly frame, wherein each of the proximity sensors being operative to detect a relative distance between the one side of the dolly frame where the each of the proximity sensors is disposed and a cargo loader external to the dolly frame, wherein the proximity sensors being operatively coupled to the transceiver to provide proximity sensor data indicating the relative distances between the one side of the dolly frame and the cargo loader as detected by each of the proximity sensors; and
wherein the transceiver being further operative to
receive the proximity sensor data from each of the proximity sensors over a period of time,
determine when the relative distances between the one side of the dolly frame and the cargo loader meets a threshold alignment configuration for the dolly frame and the cargo loader based upon the proximity sensor data over the period of time, and
responsively cause the hub-based chocking assembly to hold the at least one of the wheels in place by engaging the braking hub extension to hold the braking hub extension in place when the relative distances between the one side of the dolly frame and the cargo loader meets the threshold alignment configuration for the dolly frame and the cargo loader.

25. The improved auto-chocking enabled cargo dolly of claim 1 further comprising a transceiver disposed on the dolly frame, the transceiver being operatively coupled to the linkage and operative to, in response to receiving a remote auto-chock message from an external transceiver, electronically actuate the linkage and responsively cause the hub-based chocking assembly to hold the at least one of the wheels in place by engaging the braking hub extension to hold the braking hub extension in place.

26. The improved auto-chocking enabled cargo dolly of claim 25, wherein the transceiver being operative to electronically actuate the linkage in response to receiving the remote auto-chock message from the external transceiver disposed on the ground support equipment.

27. The improved auto-chocking enabled cargo dolly of claim 25, wherein the transceiver being operative to electronically actuate the linkage in response to receiving the remote auto-chock message from a mobile wireless user access device associated with an operator of the ground support equipment as the external transceiver.

28. The improved auto-chocking enabled cargo dolly of claim 1 further comprising:
a transceiver-based controller module disposed on the dolly frame;
location circuitry disposed on the dolly frame and operatively coupled to the transceiver-based controller module, the location circuitry generating location data on a current location of the dolly frame and providing the location data to the transceiver-based controller module;
wherein the hub-based chocking system further comprises a chocking sensor that monitors engagement of the braking hub extension to hold the braking hub extension in place as a chocking status of the hub-based chocking system, the chocking sensor being coupled to the transceiver-based controller module to provide chock status sensor data indicating when the hub-based chocking system has engaged the braking hub extension to hold the braking hub extension in place; and
wherein the transceiver-based controller module being further operative to transmit a dolly asset tracking message to a hub manager server when the chock status sensor data indicates the hub-based chocking system has engaged the braking hub extension to hold the braking hub extension in place, wherein the dolly asset tracking message including the current location of the dolly frame based upon the location data, chock status information for the dolly frame based upon the chock status sensor data, and a reference identification for the dolly frame.

29. The improved auto-chocking enabled cargo dolly of claim 1 further comprising:
a transceiver-based controller module disposed on the dolly frame;
location circuitry disposed on the dolly frame and operatively coupled to the transceiver-based controller module, the location circuitry generating location data on a current location of the dolly frame and providing the location data to the transceiver-based controller module;
wherein the hub-based chocking system further comprises a chocking sensor that monitors engagement of the braking hub extension to hold the braking hub extension in place as a chocking status of the hub-based chocking system, the chocking sensor being coupled to the transceiver-based controller module to provide chock status sensor data indicating when the hub-based chocking system has engaged the braking hub extension to hold the braking hub extension in place; and wherein the transceiver-based controller module being further operative to transmit a dolly asset tracking message to an external transceiver disposed on the ground support equipment when the chock status sensor data indicates the hub-based chocking system has engaged the braking hub extension to hold the braking hub extension in place, the dolly asset tracking message including dolly asset tracking information related to the dolly frame for forwarding to a hub manager server, wherein the dolly asset tracking information to be forwarded to the hub manager server including the current location of the dolly frame based upon the location data, chock status information for the dolly frame based upon the chock status sensor data, and a reference identification for the dolly frame.

30. An improved auto-chocking enabled cargo dolly that is towable by ground support equipment, the cargo dolly comprising:

a dolly frame, an axle disposed on the dolly frame;

a set of wheels attached to the axle, wherein the set of wheels supports at least a portion of the dolly frame, wherein each of the wheels contacts ground below the dolly frame and rotates to allow movement of the dolly frame;

an electronic control module disposed on the dolly frame;

a connection sensor disposed on the dolly frame and operatively coupled to the electronic control module, the connection sensor providing connection sensor data to the electronic control module indicating when the dolly frame is connected to the ground support equipment;

a hub-based chocking actuator disposed on the dolly frame and operatively coupled to the electronic control module, the hub-based chocking actuator being responsive to a control input generated by the electronic control module based on the connection sensor data; and a hub-based chocking assembly comprising a braking hub extension removably attached directly to at least one of the wheels, and a friction bracket having a first end responsively coupled to the hub-based chocking actuator and a second end engaging the braking hub extension to hold the braking hub extension in place when the hub-based chocking actuator is actuated by the control signal.

31. The improved auto-chocking enabled cargo dolly of claim 30, wherein the braking hub extension comprises:

a braking hub extension base attached to the at least one of the wheels;

a braking hub spindle extending from the braking hub extension base, the braking hub spindle having a cylindrical contact surface that engages with the second end of the friction bracket.

32. The improved auto-chocking enabled cargo dolly of claim 31, wherein the braking hub spindle comprises:

a first cylindrical portion having the cylindrical contact surface that engages with the second end of the friction bracket; and a second cylindrical portion having a second diameter larger than a first diameter of the first cylindrical portion.

33. The improved auto-chocking enabled cargo dolly of claim 30, wherein the friction bracket comprises:

a bracket extension coupled to the hub-based chocking actuator at a first end of the bracket extension; and a replaceable friction pad attached to a second end of the bracket extension, the replaceable friction pad engaging the braking hub extension to hold the braking hub extension in place when the hub-based chocking actuator is actuated by the control signal.

34. The improved auto-chocking enabled cargo dolly of claim 30, wherein the braking hub extension comprises:

a braking hub extension base attached to the at least one of the wheels;

a braking hub spindle extending from the braking hub extension base;

a braking hub spoked gear disposed on the braking hub spindle; and wherein the second end of the friction bracket engaging a portion of the braking hub spoked gear disposed on the braking hub spindle to hold the braking hub extension in place when the hub-based chocking actuator is actuated by the control signal.

35. The improved auto-chocking enabled cargo dolly of claim 34, wherein the friction bracket comprises an extension bracket coupled to the hub-based chocking actuator to engage the portion of the braking hub spoked gear to prevent rotation of the braking hub extension and hold the at least one of the wheels in place when the hub-based chocking actuator is actuated by the control signal.

36. The improved auto-chocking enabled cargo dolly of claim 30 further comprising an actuated feedback indicator mounted on the dolly frame and operatively coupled to the electronic control module, the actuated feedback indicator being responsively triggered by the electronic control module based upon the control signal that actuates the hub-based chocking actuator.

37. The improved auto-chocking enabled cargo dolly of claim 30, wherein the actuated feedback indicator comprises an actuated flag movably disposed on the dolly frame and operatively coupled to the electronic control module, the actuated flag actuates from a stowed position to a deployed position based upon the control signal that actuates the skid brake chocking actuator, the deployed position of the actuated flag the hub-based chocking assembly is holding the at least one of the wheels in place with the braking hub extension holding the braking hub extension in place.

38. The improved auto-chocking enabled cargo dolly of claim 30, wherein the actuated feedback indicator comprises a status light fixed to the dolly frame and operatively coupled to the electronic control module, wherein the status light activates based upon the control signal that actuates the skid brake chocking actuator, activation of the status light indicating the hub-based chocking assembly is holding the at least one of the wheels in place with the braking hub extension holding the braking hub extension in place.

39. The improved auto-chocking enabled cargo dolly of claim 38, wherein status light comprises an alarm light that rotates when activated, the rotating alarm light indicating a chocked state of the dolly frame.

40. The improved auto-chocking enabled cargo dolly of claim 38, wherein status light comprises a display panel disposed on the dolly frame that automatically displays a chocking status notification when activated, the chocking status notification indicating a chocked state of the dolly frame.

41. The improved auto-chocking enabled cargo dolly of claim 30, wherein the actuated feedback indicator comprises a speaker fixed to the dolly frame and operatively coupled to the electronic control module, wherein the speaker activates with an audible chocking status notification based upon the control signal that actuates the skid brake chocking actuator, the audible chocking status notification indicating the hub-based chocking assembly is holding the at least one of the wheels in place with the braking hub extension holding the braking hub extension in place.

42. The improved auto-chocking enabled cargo dolly of claim 30, wherein the electronic control module including a transceiver that is operative to responsively transmit a chocking status message to an external transceiver associated with the ground support equipment based upon the control signal that actuates the hub-based chocking actuator.

43. The improved auto-chocking enabled cargo dolly of claim 42, wherein the transceiver being operative to responsively transmit the chocking status message to the external transceiver disposed on the ground support equipment.

44. The improved auto-chocking enabled cargo dolly of claim 42, wherein the transceiver being operative to responsively transmit the chocking status message to a mobile wireless user access device associated with an operator of the ground support equipment as the external transceiver.

45. The improved auto-chocking enabled cargo dolly of claim 30, wherein the electronic control module including a transceiver that is operative to responsively transmit a connection status message to an external transceiver associated with the ground support equipment, the connection status message indicating a connection status between the dolly frame and the ground support equipment based upon the connection sensor data.

46. The improved auto-chocking enabled cargo dolly of claim 30 further comprising a motion sensor disposed on the dolly frame to detect when the dolly frame is not moving, the motion sensor being operatively coupled to the electronic control module to provide motion sensor data indicating when the dolly frame is not moving; and
wherein the electronic control module is operative to receive the motion sensor data from the motion sensor when the dolly frame is not moving and generate the control signal to trigger the hub-based chocking actuator to responsively cause the hub-based chocking assembly to hold the at least one of the wheels in place by engaging the braking hub extension to hold the braking hub extension in place when the motion sensor data indicates the dolly frame is not moving.

47. The improved auto-chocking enabled cargo dolly of claim 30 further comprising a cargo weight sensor disposed on the dolly frame to detect a weight level of cargo supported on the dolly frame, the weight sensor being operatively coupled to the electronic control module to provide weight sensor data indicating the weight level of the cargo supported on the dolly frame; and
wherein the electronic control module being further operative to
receive the weight sensor data from the weight sensor over a period of time,
determine when a change in weight of the cargo supported on the dolly frame exceeds a threshold cargo weight change based upon the weight sensor data over the period of time, and
responsively trigger the hub-based chocking actuator to cause the hub-based chocking assembly to hold the at least one of the wheels in place by engaging the braking hub extension to hold the braking hub extension in place when the change in weight of the cargo supported on the dolly frame exceeds the threshold cargo weight change.

48. The improved auto-chocking enabled cargo dolly of claim 30 further comprising a proximity sensor disposed on one side of the dolly frame to detect a distance between the one side of the dolly frame and a cargo loader external to the dolly frame, the proximity sensor being operatively coupled to the electronic control module to provide proximity sensor data indicating the distance between the one side of the dolly frame and the cargo loader; and
wherein the electronic control module being further operative to
receive the proximity sensor data from the proximity sensor over a period of time,
determine when a distance between the one side of the dolly frame and the cargo loader is below a threshold cargo loader distance based upon the proximity sensor data over the period of time, and
responsively trigger the hub-based chocking actuator to cause the hub-based chocking assembly to hold the at least one of the wheels in place by engaging the braking hub extension to hold the braking hub extension in place when the distance between the one side of the dolly frame and the cargo loader is below the threshold cargo loader distance.

49. The improved auto-chocking enabled cargo dolly of claim 48, wherein the threshold cargo loader distance represents a predetermined alignment distance for transfer of cargo between the dolly frame and the cargo loader.

50. The improved auto-chocking enabled cargo dolly of claim 30 further comprising a plurality of proximity sensors disposed on one side of the dolly frame, wherein each of the proximity sensors being operative to detect a relative distance between the one side of the dolly frame where the each of the proximity sensors is disposed and a cargo loader external to the dolly frame, wherein the proximity sensors being operatively coupled to the electronic control module to provide proximity sensor data indicating the relative distances between the one side of the dolly frame and the cargo loader as detected by each of the proximity sensors; and
wherein the electronic control module being further operative to
receive the proximity sensor data from each of the proximity sensors over a period of time,
determine when the relative distances between the one side of the dolly frame and the cargo loader meets a threshold alignment configuration for the dolly frame and the cargo loader based upon the proximity sensor data over the period of time, and
responsively trigger the hub-based chocking actuator to cause the hub-based chocking assembly to hold the at least one of the wheels in place by engaging the braking hub extension to hold the braking hub extension in place when the relative distances between the one side of the dolly frame and the cargo loader meets the threshold alignment configuration for the dolly frame and the cargo loader.

51. The improved auto-chocking enabled cargo dolly of claim 30, wherein the electronic control module being operative to, in response to receiving a remote auto-chock message from an external transceiver, electronically actuate the hub-based chocking actuator and responsively cause the hub-based chocking assembly to hold the at least one of the wheels in place by engaging the braking hub extension to hold the braking hub extension in place.

52. The improved auto-chocking enabled cargo dolly of claim 51, wherein the transceiver being operative to electronically actuate the hub-based chocking actuator in response to receiving the remote auto-chock message from the external transceiver disposed on the ground support equipment.

53. The improved auto-chocking enabled cargo dolly of claim 51, wherein the transceiver being operative to electronically actuate the hub-based chocking actuator in response to receiving the remote auto-chock message from a mobile wireless user access device associated with an operator of the ground support equipment as the external transceiver.

54. The improved auto-chocking enabled cargo dolly of claim 30 further comprising location circuitry disposed on the dolly frame and operatively coupled to the electronic controller module, the location circuitry generating location data on a current location of the dolly frame and providing the location data to the electronic controller module;
   wherein the hub-based chocking system further comprises a chocking sensor that monitors engagement of the braking hub extension to hold the braking hub extension in place as a chocking status of the hub-based chocking system, the chocking sensor being coupled to the electronic controller module to provide chock status sensor data indicating when the hub-based chocking system has engaged the braking hub extension to hold the braking hub extension in place;
   wherein the electronic control module comprises a wireless transceiver, wherein the electronic controller module being further operative to transmit a dolly asset tracking message using the wireless transceiver to a hub manager server when the chock status sensor data indicates the hub-based chocking system has engaged the braking hub extension to hold the braking hub extension in place, wherein the dolly asset tracking message including the current location of the dolly frame based upon the location data, chock status information for the dolly frame based upon the chock status sensor data, and a reference identification for the dolly frame.

55. The improved auto-chocking enabled cargo dolly of claim 30 further comprising location circuitry disposed on the dolly frame and operatively coupled to the electronic controller module, the location circuitry generating location data on a current location of the dolly frame and providing the location data to the electronic controller module;
   wherein the hub-based chocking system further comprises a chocking sensor that monitors engagement of the braking hub extension to hold the braking hub extension in place as a chocking status of the hub-based chocking system, the chocking sensor being coupled to the electronic controller module to provide chock status sensor data indicating when the hub-based chocking system has engaged the braking hub extension to hold the braking hub extension in place; and
   wherein the electronic controller module comprises a wireless transceiver, wherein the electronic controller module being further operative to transmit a dolly asset tracking message using the wireless transceiver to an external transceiver disposed on the ground support equipment when the chock status sensor data indicates the hub-based chocking system has engaged the braking hub extension to hold the braking hub extension in place, the dolly asset tracking message including dolly asset tracking information related to the dolly frame for forwarding to a hub manager server, wherein the dolly asset tracking information to be forwarded to the hub manager server including the current location of the dolly frame based upon the location data, chock status information for the dolly frame based upon the chock status sensor data, and a reference identification for the dolly frame.

* * * * *